(12) United States Patent
Yamaguchi et al.

(10) Patent No.: US 9,189,070 B2
(45) Date of Patent: Nov. 17, 2015

(54) CONTENT DISPLAY DEVICE, CONTENT DISPLAY METHOD, PORTABLE TERMINAL, PROGRAM, AND RECORDING MEDIUM

(75) Inventors: Sunao Yamaguchi, Osaka (JP); Shinichiro Ota, Osaka (JP); Yu Matsumoto, Osaka (JP); Hironori Inoue, Osaka (JP); Masayuki Nakazawa, Osaka (JP); Toshiroh Mukai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 306 days.

(21) Appl. No.: 13/819,441

(22) PCT Filed: Sep. 21, 2011

(86) PCT No.: PCT/JP2011/071524
§ 371 (c)(1),
(2), (4) Date: Feb. 27, 2013

(87) PCT Pub. No.: WO2012/039441
PCT Pub. Date: Mar. 29, 2012

(65) Prior Publication Data
US 2013/0159936 A1    Jun. 20, 2013

(30) Foreign Application Priority Data

Sep. 24, 2010 (JP) ................................ 2010-214512
Sep. 24, 2010 (JP) ................................ 2010-214513
Sep. 24, 2010 (JP) ................................ 2010-214514

(51) Int. Cl.
*G06F 3/048* (2013.01)
*G06F 3/01* (2006.01)
(Continued)

(52) U.S. Cl.
CPC .............. *G06F 3/017* (2013.01); *G06F 3/0485* (2013.01); *G09G 5/34* (2013.01)

(58) Field of Classification Search
CPC ........................................................ G06F 3/017
USPC ........................................................ 715/850
See application file for complete search history.

(56) References Cited

U.S. PATENT DOCUMENTS

| 5,524,195 A | 6/1996 | Clanton, III et al. |
| 5,745,710 A | 4/1998 | Clanton, III et al. |

(Continued)

FOREIGN PATENT DOCUMENTS

| CN | 1177406 A | 3/1998 |
| JP | 4-23123 A | 1/1992 |

(Continued)

OTHER PUBLICATIONS

PCT/ISA/210—International Search Report mailed on Dec. 27, 2011, issued in PCT/JP2011/071524.

*Primary Examiner* — Omar Abdul-Ali
(74) *Attorney, Agent, or Firm* — Birch, Stewart, Kolasch & Birch, LLP

(57) ABSTRACT

In a content display device (1) of the present invention, a scrolling processing section (107) causes a scrolling movement of a currently-displayed shelf face (11) in a lengthwise direction to be displayed in a case where a second input operation instructing display of the currently-displayed shelf face (11) in a different position in the lengthwise direction is carried out via an input operation section (111). A rotation processing section (106) causes rotation of a bookshelf object (10) on a central axis of the bookshelf object (10) to be displayed in a case where a first input operation instructing display of a shelf face (11) different from the currently-displayed shelf face (11) is carried out via the input operation section (111).

14 Claims, 45 Drawing Sheets

(51) Int. Cl.
*G06F 3/0485* (2013.01)
*G09G 5/34* (2006.01)

(56) References Cited

U.S. PATENT DOCUMENTS

| | | | |
|---|---|---|---|
| 5,847,709 A * | 12/1998 | Card et al. | 715/850 |
| 5,886,697 A | 3/1999 | Naughton et al. | |
| 5,995,106 A | 11/1999 | Naughton et al. | |
| 6,020,881 A | 2/2000 | Naughton et al. | |
| 6,101,506 A | 8/2000 | Ukai et al. | |
| 6,154,209 A | 11/2000 | Naughton et al. | |
| 6,160,551 A | 12/2000 | Naughton et al. | |
| 6,344,861 B1 | 2/2002 | Naughton et al. | |
| 6,765,570 B1 * | 7/2004 | Cheung et al. | 345/420 |
| 8,271,898 B1 * | 9/2012 | Mattos et al. | 715/784 |
| 2002/0054164 A1 | 5/2002 | Uemura | |
| 2002/0060701 A1 | 5/2002 | Naughton et al. | |
| 2003/0167466 A1 | 9/2003 | Nakamura et al. | |
| 2005/0034084 A1 | 2/2005 | Ohtsuki et al. | |
| 2005/0039136 A1 * | 2/2005 | Othmer | 715/774 |
| 2006/0101338 A1 | 5/2006 | Kates | |
| 2006/0236251 A1 | 10/2006 | Kataoka et al. | |
| 2006/0274060 A1 | 12/2006 | Ni et al. | |
| 2007/0261001 A1 * | 11/2007 | Nagiyama et al. | 715/810 |
| 2009/0066647 A1 * | 3/2009 | Kerr et al. | 345/158 |
| 2009/0184926 A1 | 7/2009 | Kates | |
| 2009/0249393 A1 * | 10/2009 | Shelton et al. | 725/39 |
| 2009/0309899 A1 | 12/2009 | Tytgat | |
| 2010/0050129 A1 * | 2/2010 | Li et al. | 715/849 |

FOREIGN PATENT DOCUMENTS

| | | |
|---|---|---|
| JP | 7-98640 A | 4/1995 |
| JP | 9-134269 A | 5/1997 |
| JP | 10-93880 A | 4/1998 |
| JP | 10093880 A * | 4/1998 |
| JP | 11-15709 A | 1/1999 |
| JP | 2002-82745 A | 3/2002 |
| JP | 2002-288690 A | 10/2002 |
| JP | 2005-53287 A | 3/2005 |
| JP | 2005-71332 A | 3/2005 |
| JP | 2006-244402 A | 9/2006 |
| JP | 2006-301872 A | 11/2006 |
| JP | 2006-338599 A | 12/2006 |
| JP | 2008-519550 A | 6/2008 |
| JP | 2011-525732 A | 9/2011 |
| WO | WO 97/17650 A1 | 5/1997 |
| WO | WO 99/57890 A1 | 11/1999 |
| WO | WO 02/071743 A1 | 9/2002 |
| WO | WO 2008/085877 A1 | 7/2008 |

* cited by examiner

CONTENT DISPLAY DEVICE, CONTENT DISPLAY METHOD, PORTABLE TERMINAL, PROGRAM, AND RECORDING MEDIUM

TECHNICAL FIELD

The present invention relates to a content display device, a content display method, a portable terminal, a program, and a recording medium. More specifically, the present invention relates to a content display device, a content display method, and a portable terminal, a program, each of which is for displaying a thumbnail image corresponding to content, and a recording medium in which the program is stored.

BACKGROUND ART

Terminals having a browser function of displaying images representing respective pieces of content side-by-side are conventionally known. Such a browser function is achieved, for example, by a method (adopted in Apple's iPhone) of arranging icons in a grid manner, a method (adopted in Apple's iPad and in general digital cameras) of two-dimensionally arranging a small number of high-quality images, or the like. That is, in many of the conventional terminals, a plurality of thumbnail images are displayed on a two-dimensional plane. Accordingly, the number of thumbnail images that can be displayed within 1 screen is restricted by a screen size.

In view of this, a method of attaching an image to each side face of a three-dimensional object and rotating the three-dimensional object is proposed (see Patent Literature 1). Further, a method is proposed in which a plurality of images are presented to a user in an easily viewable way for the user by changing a three-dimensional shape of a three-dimensional object depending on how the plurality of images are presented (see Patent Literature 2).

As described above, the number of thumbnail images that can be displayed within 1 screen is restricted by a screen size. In view of this, a technique of attaching thumbnail images to each side face of a cube which is a three-dimensional object and rotating the cube has been developed (see, for example, Patent Literature 2). According to such a technique, a large number of thumbnail images can be displayed in an easily viewable way.

In recent years, various devices, such as portable devices and handheld devices, having a touch panel function have been developed. A user can change animation displayed on a display of such a device by touching (e.g., scrolling) the display.

The scrolling is an operation for sliding content such as texts, a drawing, or an image in a horizontal or vertical direction throughout a screen or a display window. A technique is proposed which slows down scrolling until the scrolling stops by applying a predetermined slow-down rate to a user's input speed of a dragging operation after the user's input for the scrolling operation stops (see Patent Literature 3).

CITATION LISt

Patent Literature 1
Japanese Patent Application Publication, Tokukai, No. 2002-288690 A (Publication Date: Oct. 4, 2002)
Patent Literature 2
Japanese Patent Application Publication, Tokukai, No. 2006-338599 A (Publication Date: Dec. 14, 2006)
Patent Literature 3
WO 2008/085877 (Publication Date: Jul. 17, 2008)

SUMMARY OF INVENTION

Technical Problem

However, according to the method of Patent Literature 1, only a single image can be attached to each side face. This makes it necessary to rotate the three-dimensional object until a desired image can be found, and is therefore inconvenient in a case where the number of images is large. According to the method of Patent Literature 2, a plurality of images are attached to each surface of the cube. However, since the cube can be rotated in every direction (360-degree rotation), it is hard to use for a user who is unfamiliar with the operation.

The present invention was accomplished in view of the above problems, and an object of the present invention is to provide a content display device that has a user interface that is easy to operate for a user.

In general, in a case where a CPU or a GPU carries out processing for displaying thumbnail images, it is desirable that (i) the thumbnail images are read into a memory (e.g., cache) capable of high-speed processing and (ii) data is exchanged between the memory and the CPU or the GPU. This makes it possible to achieve real-time processing.

However, in a case where a large number of high-quality thumbnail images are read into the memory, it takes a long time to read them. As a result, overall processing speed for displaying the thumbnail images declines. In addition, since the memory capable of high-speed processing is generally not large in capacity, there is high-quality images.

In view of this, another object of the present invention is to provide a content display device that is capable of suitably displaying a large number of images while suppressing a decline in display processing speed.

According to Patent Literature 3, a position at which the scrolling stops is determined on the basis of a user's input speed and the slow-down rate. Accordingly, the position at which the scrolling stops is not fixed. Consequently, in a case where a user scrolls a screen in search of an image corresponding to a desired piece of content, an image displayed on the screen sometimes has a missing part when the scrolling stops. In this case, in order to view the image having the missing part, the user must scroll the screen again so that the whole of the image is displayed. This is troublesome for the user.

In view of this, another object of the present invention is to provide a content display device that has improved operability for a user.

Solution to Problem

A content display device of the present invention includes: a screen; display processing means for causing a part of a virtual three-dimensional object to be displayed on the screen, the virtual three-dimensional object being a polygonal column having side faces on each of which a plurality of images representing respective pieces of content are arranged; an input section; rotation processing means for controlling, in a case where a first input operation instructing a display of a side face different from a currently-displayed side face is carried out via the input section, the display processing means to display (i) rotation of the virtual three-dimensional object on a central axis of the polygonal column and (ii) the side face to be displayed as a result of the rotation; and s crolling processing means for controlling, in a case where a second input operation instructing a display of the currently-displayed side face in a different position in a direction parallel to the central axis is carried out via the input section, the display processing means to display (i) a scrolling movement of the currently-displayed side face in the direction and (ii) a part of the currently-displayed side face which part is to be displayed as a result of the scrolling movement.

According to the arrangement, the content display device displays, on the screen, (i) the virtual three-dimensional object which is a polygonal column and (ii) the plurality of images arranged on each side face of the polygonal column. The first input operation or the second input operation is carried out via the input section. The first input operation is an input operation for displaying another side face different from a side face that is currently displayed on the screen. The second input operation is an input operation for displaying a different portion of the currently-displayed side face in a direction parallel to a central axis of the polygonal column. The central axis of the polygonal column in this specification refers to an axis which passes through the barycenter of the bottom face of the polygonal column and which is orthogonal to the bottom face of the polygonal column. Hereinafter, this direction is referred to as a lengthwise direction.

In a case where the first input operation is carried out, processing for displaying rotation of the virtual three-dimensional object on the central axis of the polygonal column is carried out. As a result, a sight of the virtual three-dimensional object being rotated is displayed on the screen. In addition, processing for displaying a side face to be displayed as a result of the rotation is carried out. As a result, another side face different from the originally-displayed side face is displayed on the screen. As such, the first input operation allows images arranged on another side face different from the currently-displayed side face to be displayed, provided that images are arranged on each of the side faces.

In a case where the second input operation is carried out, processing for displaying a scrolling movement of the currently-displayed side face in the lengthwise direction is carried out. As a result, a sight of the currently-displayed side face being scrolled in the lengthwise direction is displayed on the screen. In addition, processing for displaying a part to be displayed as a result of the scrolling movement is carried out. As a result, another part of the originally-displayed side face which part is different from an originally-display part is displayed on the screen. As such, in a case where a large number of images are arranged on a side face and only some of the images are displayed on the screen, the second input operation makes it possible to display other images on the side face that were not displayed.

Even in a case where a large number of images are managed by arranging them on a virtual three-dimensional object, it is thus possible to display a target image on a screen by rotating the virtual three-dimensional object in a virtual space within the screen or by scrolling a side face in a lengthwise direction.

Such an action of rotating a polygonal column object and an action of changing a viewable part of a side face of the polygonal column object remind a user of an action of operating a revolving bookshelf placed at a bookstore or the like. This allows a person who makes the first contact with the content display device or a person unaccustomed to operating equipment to easily understand how to operate the content display device.

In order to attain the above object, a content display method of the present invention for displaying a part of a virtual three-dimensional object which is a polygonal column on a screen of a content display device including an input section, the polygonal column having side faces on each of which a plurality of images representing respective pieces of content are arranged, the content display method comprising the step of (a) changing a display part of the virtual three-dimensional object which display part is displayed on the screen, in the step (a), in a case where a first input operation instructing a display of a side face different from a currently-displayed side face is carried out via the input section, processing for displaying (i) rotation of the virtual three-dimensional object on a central axis of the polygonal column and (ii) the side face to be displayed as a result of the rotation is carried out, and in the step (a), in a case where a second input operation instructing a display of the currently-displayed side face in a different position in a direction parallel to the central axis is carried out via the input section, processing for displaying (i) a scrolling movement of the currently-displayed side face in the direction and (ii) a part of the currently-displayed side face which part is to be displayed as a result of the scrolling movement is carried out.

According to the arrangement, the content display method of the present invention can produce similar effects to those produced by the content display device of the present invention.

In order to attain the above object, a content display device of the present invention includes: display control means for causing a part of a three-dimensional object on which a plurality of images representing respective pieces of content to be displayed on a screen; determining means for determining a display part of the three-dimensional object which display part is displayed on the screen and determining priorities of the plurality of images in accordance with a position of the display part thus determined; image reading means for reading an image from a first memory so that the image is allowed to be displayed by the display control means, the first memory storing therein the plurality of images; a second memory in which the image thus read by the image reading means is stored; and deleting means for deleting the image from the second memory, every time the determining means determines the display part and the priorities, the image reading means reading an image that is given a highest priority and that is not stored in the second memory, and every time the determining means determines the display part and the priorities, the deleting means deleting, from the second memory, an image that is given a lowest priority and that is stored in the second memory.

In the arrangement, it is assumed that the second memory is capable of higher-speed processing than the first memory. That is, the content display device of the present invention can carry out image display processing at high speed by using data of thumbnail images stored in the second memory, not the first memory.

According to the arrangement, the content display device of the present invention can dynamically change priorities of the images in consideration of a structure of the three-dimensional object every time a display part of the three-dimensional object is determined. The "priorities of the images" refers to priorities used to determine whether or not the images are to be stored in the second memory. For example, the content display device of the present invention reads, into the second memory, images that are given the highest priority and that are not stored in the second memory. Further, the content display device of the present invention deletes (releases), from the second memory, images that are given the lowest priority and that are stored in the second memory.

According to the arrangement, images to be read are sorted out. Accordingly, even in a case where a large number of images are arranged on the three-dimensional object, overall processing speed for displaying the images improves. Further, since the images given the lowest priority are deleted from the second memory, capacity of the second memory capable of high-speed processing can be efficiently used without incurring a capacity shortage.

Therefore, the content display device of the present invention is capable of suitably displaying a large number of images while suppressing a decline in display processing speed.

In order to attain the above object, a content display method of the present invention for displaying, on a screen, a part of a three-dimensional object which is a polygonal column having side faces on each of which a plurality of images representing respective pieces of content are arranged, the content display method comprising the steps of: (a) determining a display part of the three-dimensional object which display part is displayed on the screen and determining priorities of the plurality of images in accordance with a position of the display part thus determined; (b) after the step (a), reading, from a first memory in which the plurality of images are stored, an image that is given a highest priority and that is not stored in a second memory so that the image is allowed to be displayed; (c) causing the image thus read in the step (b) to be stored in the second memory; and (d) after the step (a), deleting, from the second memory, an image that is given a lowest priority and that is stored in the second memory.

The content display method can produce similar effects to those produced by the content display device of the present invention.

In order to attain the above object, a content display device of the present invention includes: a display section which displays a part of a three-dimensional object which is a polygonal column having side faces on each of which a plurality of images representing respective pieces of content are arranged; an input section which is provided on the display section and receives a user input made by contact; contact detecting means for detecting a motion of a position of the contact; first display control means for, in a case where the contact detecting means detects a motion in a longitudinal direction of the polygonal column during display of a currently-displayed screen image, moving a display region of the three-dimensional object by scrolling in the longitudinal direction so that another screen image different from the currently-displayed screen image is displayed; second display control means for, in a case where the contact detecting means detects a motion in a direction orthogonal to the longitudinal direction of the polygonal column during display of the currently-displayed screen image, moving the display region by rotating the three-dimensional object on a longitudinal axis of the polygonal column so that another screen image different from the currently-displayed screen image is displayed; and mobility determining means for determining mobility of the display region to be moved by the first display control means and the second display control means so that images displayed on the another screen image have no missing part.

In order to attain the above object, a content display method of the present invention for a content display device including (i) a display section which displays a part of a three-dimensional object which is a polygonal column having side faces on each of which a plurality of images representing respective pieces of content are arranged and (ii) an input section which is provided on the display section and receives a user input made by contact, includes the steps of: (a) detecting a motion of a position of the contact; (b) in a case where a motion in a longitudinal direction of the polygonal column is detected during display of a currently-displayed screen image in the step (a), moving a display region of the three-dimensional object by scrolling in the longitudinal direction so that another screen image different from the currently-displayed screen image is displayed; (c) in a case where a motion in a direction orthogonal to the longitudinal direction of the polygonal column is detected during display of the currently-displayed screen image in the step (a), moving the display region by rotating the three-dimensional object on a longitudinal axis of the polygonal column so that another screen image different from the currently-displayed screen image is displayed; and (d) determining mobility of the display region to be moved in the step (a) and the step (b) so that images displayed on the another screen image have no missing part.

According to the arrangement, the content display device of the present invention displays, on the screen, (i) the virtual three-dimensional object which is the polygonal column and (ii) the plurality of images arranged on each of the side faces. The input section receives a user input by contact, and the contact detecting means detects a motion of a position of the contact made by the user input.

In the content display device, in a case where a motion in the longitudinal direction (hereinafter referred to also as a lengthwise direction) of the polygonal column has been detected during display of a screen image, the display region of the three-dimensional object is scrolled in the longitudinal direction so that another screen image is displayed. The term "another screen image" used herein refers to a different region in the side face displayed before the scrolling. That is, in the present invention, not whole of the three-dimensional object is displayed on the display section, but only part of the three-dimensional object is displayed on the display section.

In a case where a motion in the direction orthogonal to the longitudinal axis of the polygonal column has been detected during display of a screen image, the display region is moved by rotation on the longitudinal axis of the three-dimensional object so that another screen image is displayed. The term "another screen image" used herein refers to a different side face from the side face displayed before the rotation. Note, however, that it is possible that the original side face is displayed again after the rotation.

The central axis of the polygonal column in this specification refers to an axis which passes through the barycenter of the bottom face of the polygonal column and which is orthogonal to the bottom face of the polygonal column.

As described above, in the present invention, the three-dimensional object whose whole view is not displayed dimensional space so that content images that are arranged on a region that was not displayed on the screen can be displayed.

Such an action of rotating a polygonal column object and an action of changing a viewable part of a side face of the polygonal column object remind a user of an action of operating a revolving bookshelf placed at a bookstore or the like. This allows a person who makes the first contact with the content display device or a person unaccustomed to operating equipment to easily understand how to operate the content display device.

In the present invention, in a case where the display region of the three-dimensional object is moved by scrolling in the lengthwise direction within a single side face or moved by rotation so that another side face is displayed, images displayed on the screen have no missing part as a result of such movement by scrolling or rotation.

For example, in a case where a user carries out a flicking operation of hitting the screen with a sudden quick movement using a finger so as to scroll the display region, the scrolling continues for a certain period of time even after the user moves the finger away from the screen. When the scrolling stops, parts of content images displayed on the screen are sometimes missing. This necessitates the user to carry out an operation of scrolling the screen again so that the entire images are displayed. Such an operation is sometimes troublesome for the user.

According to the present invention, mobility of scrolling or rotation is determined so that images displayed after movement have no missing part. Since there is no part missing from the images, it is possible to improve operability for the user.

In order to attain the above object, a portable terminal of the present invention includes any of the above content display devices of the present invention.

According to the arrangement, a user can visually search for various books as if the user is at a bookstore.

Note that the content display device may be realized by a computer. In this case, (i) a program for causing the computer to operate as each means of the content display device and (ii) a computer readable recording medium in which the program is stored are also encompassed within the scope of the present invention.

Additional objects, advantages and novel features of the invention will be set forth in part in the description which follows, and in part will become apparent to those skilled in the art upon examination of the following or may be learned by practice of the invention.

Advantageous Effects of Invention

A content display device of the present invention includes: a screen; display processing means for causing a part of a virtual three-dimensional object to be displayed on the screen, the virtual three-dimensional object being a polygonal column having side faces on each of which a plurality of images representing respective pieces of content are arranged; an input section; rotation processing means for controlling, in a case where a first input operation instructing a display of a side face different from a currently-displayed side face is carried out via the input section, the display processing means to display (i) rotation of the virtual three-dimensional object on a central axis of the polygonal column and (ii) the side face to be displayed as a result of the rotation; and s crolling processing means for controlling, in a case where a second input operation instructing a display of the currently-displayed side face in a different position in a direction parallel to the central axis is carried out via the input section, the display processing means to display (i) a scrolling movement of the currently-displayed side face in the direction and (ii) a part of the currently-displayed side face which part is to be displayed as a result of the scrolling movement. According to the arrangement, an operation for searching for an image corresponding to a desired piece of content is similar to an action of operating an actual revolving bookshelf, and therefore is easy to understand and easy to use for a user.

A content display device of the present invention includes: display control means for causing a part of a three-dimensional object on which a plurality of images representing respective pieces of content to be displayed on a screen; determining means for determining a display part of the three-dimensional object which display part is displayed on the screen and determining priorities of the plurality of images in accordance with a position of the display part thus determined; image reading means for reading an image from a first memory so that the image is allowed to be displayed by the display control means, the first memory storing therein the plurality of images; a second memory in which the image thus read by the image reading means is stored; a nd deleting means for deleting the image from the second memory, every time the determining means determines the display part and the priorities, the image reading means reading an image that is given a highest priority and that is not stored in the second memory, and every time the determining means determines the display part and the priorities, the deleting means deleting, from the second memory, an image that is given a lowest priority and that is stored in the second memory. According to the arrangement, it is possible to suitably display a large number of images while suppressing a decline in display processing speed.

A content display device of the present invention includes: a display section which displays a part of a three-dimensional object which is a polygonal column having side faces on each of which a plurality of images representing respective pieces of content are arranged; an input section which is provided on the display section and receives a user input made by contact; contact detecting means for detecting a motion of a position of the contact;

first display control means for, in a case where the contact detecting means detects a motion in a longitudinal direction of the polygonal column during display of a currently-displayed screen image , moving a display region of the three-dimensional object by scrolling in the longitudinal direction so that another screen image different from the currently-displayed screen image is displayed; second display control means for, in a case where the contact detecting means detects a motion in a direction orthogonal to the longitudinal direction of the polygonal column during display of the currently-displayed screen image, moving the display region by rotating the three-dimensional object on a longitudinal axis of the polygonal column so that another screen image different from the currently-displayed screen image is displayed; and mobility determining means for determining mobility of the display region to be moved by the first display control means and the second display control means so that images displayed on the another screen image have no missing part. According to the arrangement, mobility of a display region is determined so that images displayed on the screen after movement have no missing part. It is therefore possible to improve operability for a user.

DESCRIPTION OF EMBODIMENTS

[First Embodiment]

The following description will discuss, with reference to FIGS. 1 to 13, a first embodiment of a content display device in accordance with the present invention.

(Content Display Device)

According to the present embodiment, the content display device is configured to display, on a screen, a part of a bookshelf object in the shape of a rectangular parallelepiped. The bookshelf object has four shelf faces, and is placed in a virtual three-dimensional space. On each of the shelf faces of the bookshelf object, thumbnail images of a plurality of electronic books (pieces of content) are arranged in a grid manner. A user selects, on a display screen, a thumbnail image corresponding to an electronic book that the user wants to read, thereby the contents of the electronic book are displayed on the display screen. In this way, the user can view the electronic books. Specific configurations of the content display device are described later.

(Bookshelf Object)

First, the following description discusses a bookshelf object (three-dimensional object) to be displayed on the display screen.

Figure 1:
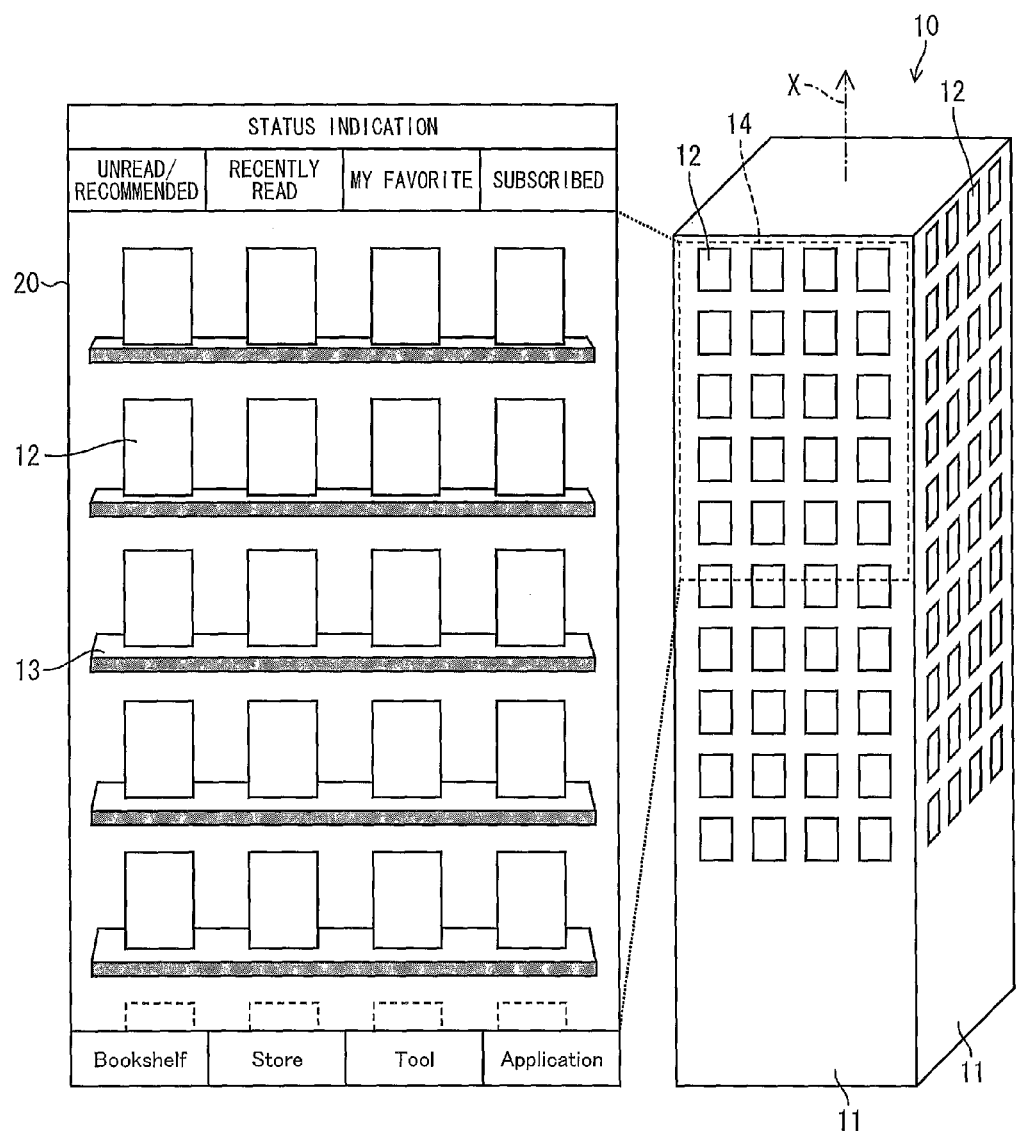
FIG. 1 is a view showing an example of (i) a bookshelf object and (ii) a display screen of a content display device in the present embodiment.

FIG. 1 is a view showing (i) a bookshelf object in the shape of a rectangular parallelepiped having four shelf faces and (ii) a screen, of a content display device, which displays thereon a part of the bookshelf object. The right-hand part of FIG. 1 shows a bookshelf object 10, and the left-hand part of FIG. 1 shows a screen 20 of the content display device on which a part of the bookshelf object 10 is displayed. In FIG. 1, a region enclosed by a dotted line, which region is part of the bookshelf object 10, is a region 14 which is actually displayed on the screen 20.

As shown in FIG. 1, the bookshelf object 10 has four shelf faces 11. Each of the shelf faces 11 is provided with a plurality of shelves. On each of the plurality of shelves, thumbnail images 12 of a plurality of electronic books (pieces of content) are displayed as if they are placed on a shelf. A user carries out an operation, such as a tapping operation, on the display screen to select any of the thumbnail images, thereby the user can view an electronic book corresponding to a selected thumbnail image. The four shelf faces 11 are assigned respectively different categories. On each of the shelf faces, thumbnail images 12 of electronic books that belong to a category assigned to that shelf face are arranged. The categories to be assigned are not limited. In the present embodiment, categories are divided into the following four categories:

"Unread/Recommended", "Recently read", "My favorite" and "Subscribed", and the four categories are assigned to the respective four shelf faces 11. Although the bookshelf object 10 of the present embodiment is constituted by the four shelf faces, this does not imply any limitation. The bookshelf object 10 can have more shelf face(s) depending on the number of categories.

There are no particular limitations on the number of shelves 13 on each of the shelf faces 11 and the number of thumbnail images 12 to be displayed on each of the shelves 13. These numbers can be set by a manufacturer as appropriate depending on the performance of the content display device. In the preset embodiment, five consecutive shelves 13 out of all the shelves are displayed under normal conditions. On each of the shelves 13, four thumbnail images 12 can be displayed.

The thumbnail images 12 to be displayed on each of the shelves 13, i.e., electronic books to be arranged on each of the shelf faces 11, can be changed as needed by operation by a user.

(Displaying Bookshelf Object)

The following description discusses how to display the bookshelf object 10 on the screen 20 of the content display device.

The bookshelf object 10 can be displayed in either of the following two different display modes: a standard mode and an active mode. Either in the standard mode or in the active mode, the screen 20 displays the bookshelf object 10 as viewed from a virtual viewpoint in a direction orthogonal to a central axis X of the bookshelf object 10. In this Description, a face facing this virtual viewpoint is referred to as a front face. Accordingly, the front face of the bookshelf object 10 is to be displayed on the screen 20 of the content display device. When a different region of the bookshelf object 10 is to be displayed on the screen 20, the virtual viewpoint is neither moved in a direction parallel to the central axis X nor rotated on the central axis X; instead the bookshelf 10 is rotated or the shelf faces 11 of the bookshelf object 10 are moved without moving the virtual viewpoint (this is described later in detail). This causes a different region to be seen from the virtual viewpoint, thereby the position of the region 14 to be displayed on the screen 20 is changed. In another embodiment, a different region of the bookshelf object 10 can be displayed on the screen 20 by rotating the virtual viewpoint about the central axis X around the bookshelf object 10. However, even in this case, the virtual viewpoint is not moved in a direction parallel to the central axis X. In addition, in order that the user can view the bookshelf object 10 from a far distance, processing for moving the viewpoint away from the bookshelf object 10 can be executed or processing for moving the bookshelf object 10 away from the viewpoint while the viewpoint remains unchanged can be executed. This enables change of a region of the bookshelf object 10 to be displayed on the screen 20. Further, by changing a field angle of the viewpoint while the viewpoint remains unchanged, it is possible to change a size of the region of the bookshelf object 10 to be displayed on the screen 20.

The standard mode is a mode in which, while no operation is carried out, only a front shelf face 11 is displayed and shelf faces 11 adjacent to the front shelf face 11 thus displayed are not displayed. While no operation is carried out with respect to the bookshelf object 10, only the shelves 13 and the thumbnail images 12 are displayed on the screen 20 among the constituents of the bookshelf object 10.

On the other hand, the active mode is a mode in which, while no operation is carried out, a front shelf face 11 and shelf faces 11 adjacent to the front shelf face 11 are displayed together. In the active mode, the bookshelf object 10 is displayed as if it is viewed from a longer distance than in the standard mode. Apart from display of the front shelf face 11 and the adjacent shelf faces 11 on the both sides of the front shelf face 11, display of the front shelf face 11 and only a shelf face 11 subsequent to the front shelf face 11 may be adopted. In the active mode, opacity of each of the shelf faces 11 is decreased so that shelf faces 11 on the right and left sides of the front shelf face 11 and thumbnail images on the shelf faces 11 on the right and left sides are displayed. In the active mode, a user can more intuitively know that the bookshelf object 10 is a rectangular parallelepiped placed in a virtual three-dimensional space. Note that states of the shelf face 11 at opacity of 100% and at opacity other than 0% are referred herein to as "being semitransparent". In the present embodiment, a shelf face on the opposite side of the front shelf face is not displayed, but may be optionally displayed at a low opacity (at a high transparency).

The standard mode and the active mode can be switched by input operation by a user.

The following description discusses a display screen in the standard mode.

Figure 2:
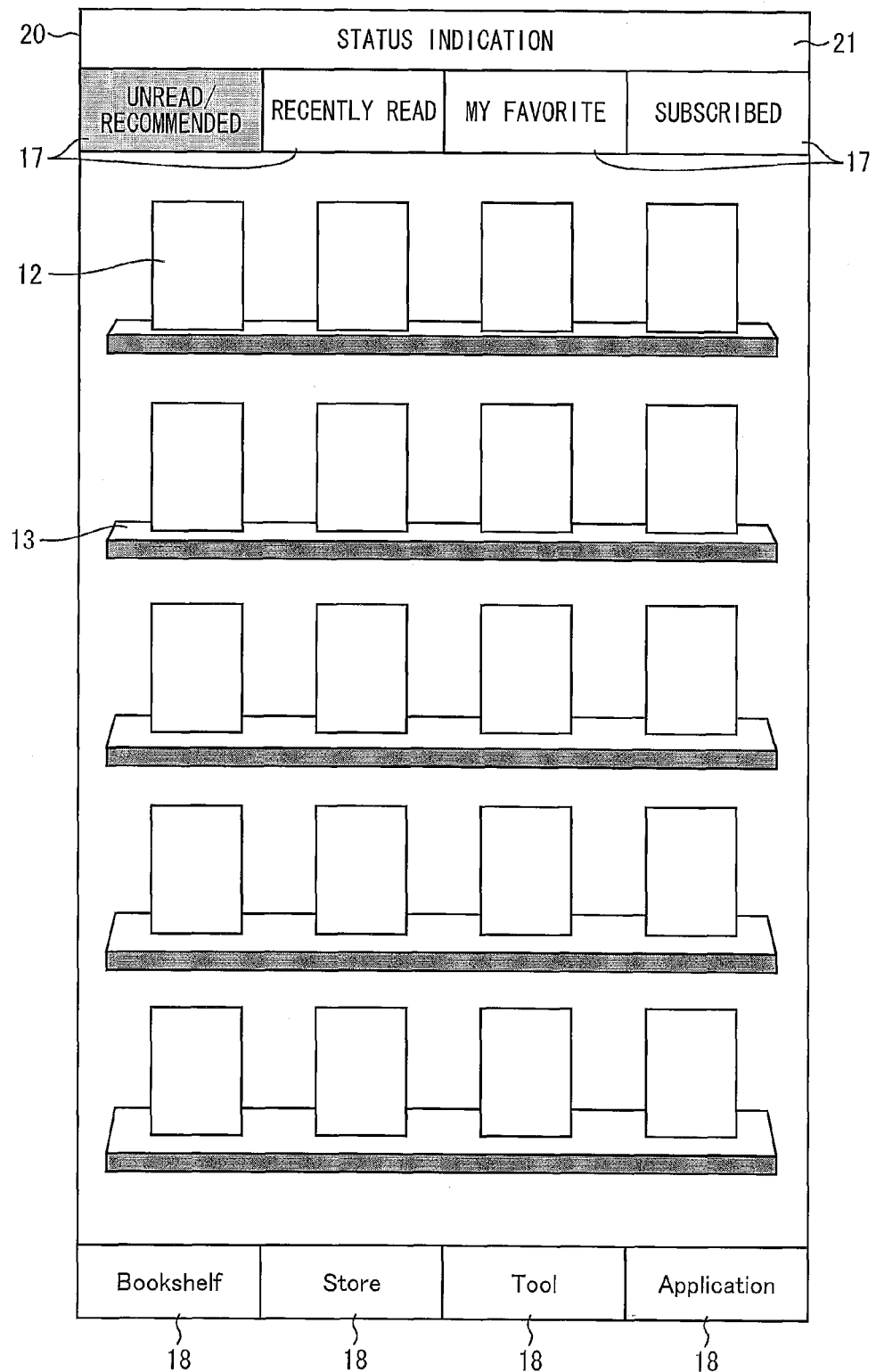
FIG. 2 is a view showing an example of a display screen displaying a shelf face of the bookshelf object in the present embodiment.

FIG. 2 is a view showing what is displayed on the screen 20 in the standard mode.

As shown in FIG. 2, shelves 13 and thumbnail images of books are displayed on the screen 20 as if the thumbnail images 12 are placed on the shelves 13. At the top of the screen 20, there are indicators which indicate categories of the respective shelf faces 11 of the bookshelf object 10. The way in which the indicators are displayed (illumination, highlighting, etc.) allows a user to recognize the category of a currently-displayed shelf face 11. For example, in FIG. 2, an indicator of "Unread/Recommended" to the "Unread/Recommended" is selected and displayed. It should be noted that the indicators also serve as shelf face selecting buttons 17 (described later). Furthermore, at the bottom of the screen 20, operation input buttons 18 for carrying out the functions of the content display device are displayed. In a status indication part 21 at a topmost region of the screen 20, a date and time, a battery indicator, a reception state of a network, and settings of the content display device are displayed. A scroll bar is configured to be displayed, when a scrolling operation (described later) is carried out, and then hidden from display after a lapse of a given period of time. In the present embodiment, in a case where a recommended book has been newly delivered, a balloon icon appears in a "Unread/Recommended" indicator.

Note that in the present embodiment, in a case where a thumbnail image(s) 12 is/are split at the end of the region 14 to be displayed on the screen 20 as shown in FIG. 1, the split thumbnail image(s) 12 is/are not displayed on the screen 20. Therefore, the thumbnail images 12 on the display screen are all displayed in their entirety. However, this is not intended to limit the present invention. For example, the split thumbnail image(s) 12 may be displayed once after a rotation process and a scrolling process (both described later), and after a lapse of a given period of time, the thumbnail image(s) 12 may be made transparent so as to be hidden from display. Alternatively, the split thumbnail images 12 may be displayed in a semitransparent manner, instead of being hidden from display. In this case, transparency (opacity) of the thumbnail image(s) 12 can be set to be proportional to a ratio between a region of the thumbnail image 12 off the screen 20 and the other region of the thumbnail image 12 on the screen 20. Furthermore, the split thumbnail image(s) 12 may be displayed once after the rotation process and the scrolling process, and after a lapse of a given period of time, the thumbnail image(s) 12 may be displayed in a semitransparent manner in accordance with the above ratio.

In the standard mode, a front shelf face 11 is displayed as if it is viewed from slightly above. Therefore, as shown in FIG. 2, top surfaces of the shelves 13 on the front shelf face 11 are displayed on the screen 20. Further, in a case where the front shelf face 11 is viewed from slightly above, top surfaces of shelves 13 at lower positions are more visible. Therefore, the top surfaces of the shelves 13 displayed on the screen 20 increase in size from top to bottom of the screen 20. Furthermore, when the shelf 13 is viewed from above, the thumbnail images 12 are not hidden by the shelf 13, and it is therefore easy to identify a desired target thumbnail image 12.

FIG. 2 shows the thumbnail images 12 arranged along longitudinal and lateral directions of the shelf face 11. This is how a shelf face that corresponds to the category "Unread/ Recommended", "Recently read" or "My favorite" is displayed.

Figure 3:
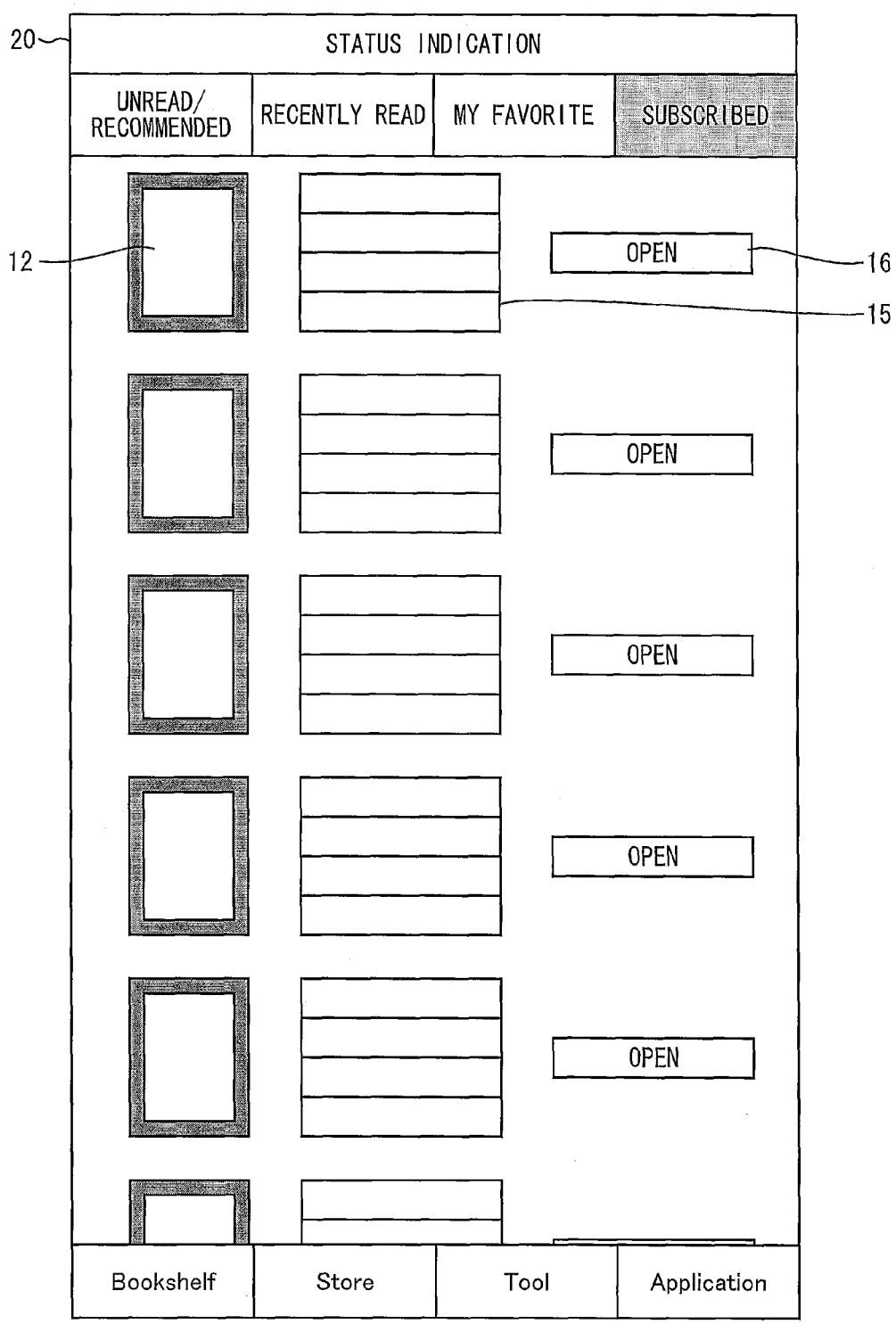
FIG. 3 is a view showing an example of a display screen displaying another shelf face of the bookshelf object in the present embodiment.
Figure 5:
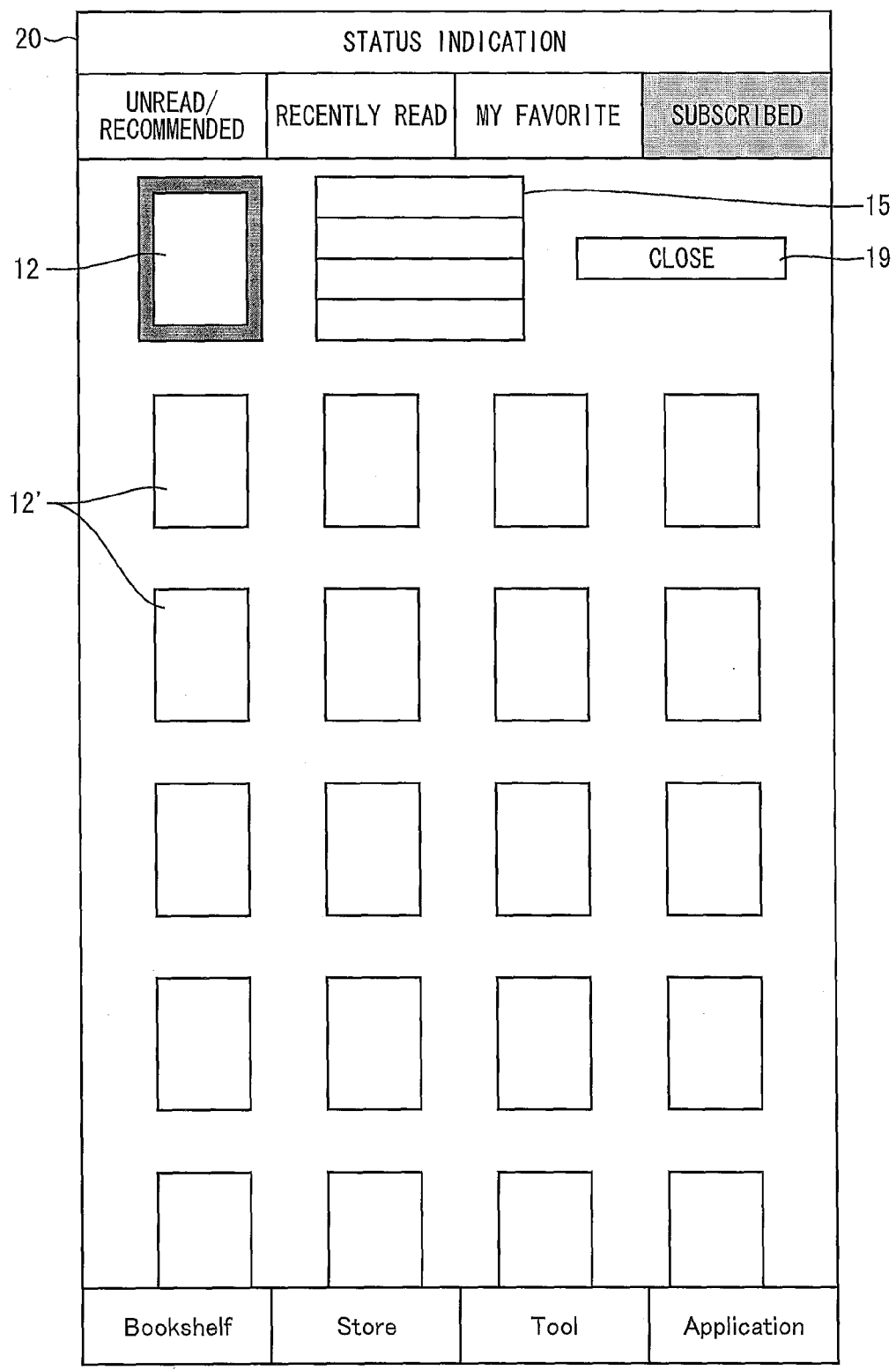
FIG. 5 is a view showing a display screen which appears after an operation of the display screen shown in FIG. 3.

The following description discusses, with reference to FIG. 3 and FIG. 5, how a shelf face 11 corresponding to the category "Subscribed" is displayed.

FIG. 3 is a view illustrating the screen 20, which displays the shelf face 11 that corresponds to the category "Subscribed" in the standard mode. The shelf face 11 corresponding to the category "Subscribed" is a shelf face that manages a periodical publication(s), such as a weekly magazine and a monthly magazine, including its/their back number(s). The shelf face 11 serving as a subscription shelf automatically classifies a book(s) delivered by subscription delivery into its/their corresponding magazine rack(s) for each delivered publication for subscription, so that the delivered book(s) can be viewed. As shown in FIG. 3, the subscribed shelf face 11 has a column of thumbnail images 12 arranged in a lengthwise direction on the left side of the shelf face 11. This is different from how they are arranged in FIG. 2. These thumbnail images 12 are thumbnail images 12 of respective current issues of subscribed books, and are displayed as if the current issues are placed on magazine racks. That is, it looks as if, in an actual bookshelf, magazine racks of the respective books are arranged in a lengthwise direction. Displayed beside to each of the thumbnails 12 is a text display of information 15 of a corresponding subscribed book, such as a series name of the book, a title, a publisher, an issue number of a current issue, and a commentary, are displayed. Provided beside the information 15 is a select button 16 for displaying back numbers of the magazine is provided. The back number(s) of the magazine can be displayed not only by an operation to select the select button 16 is carried out, but also by a flicking operation or a dragging operation which is carried out, with respect to a starting point that is an image of a magazine rack on which a book (a front cover of a thumbnail image) is placed, in an upward direction of the screen 20. Note, here, that the flicking operation is made by a gesture such that a user's finger touches the touch panel and then quickly flicks the touch panel in a desired direction. Further, the dragging operation is made by a gesture such that a user's finger touches the touch panel and moves in a desired direction while in contact with the touch panel.

Figure 4:
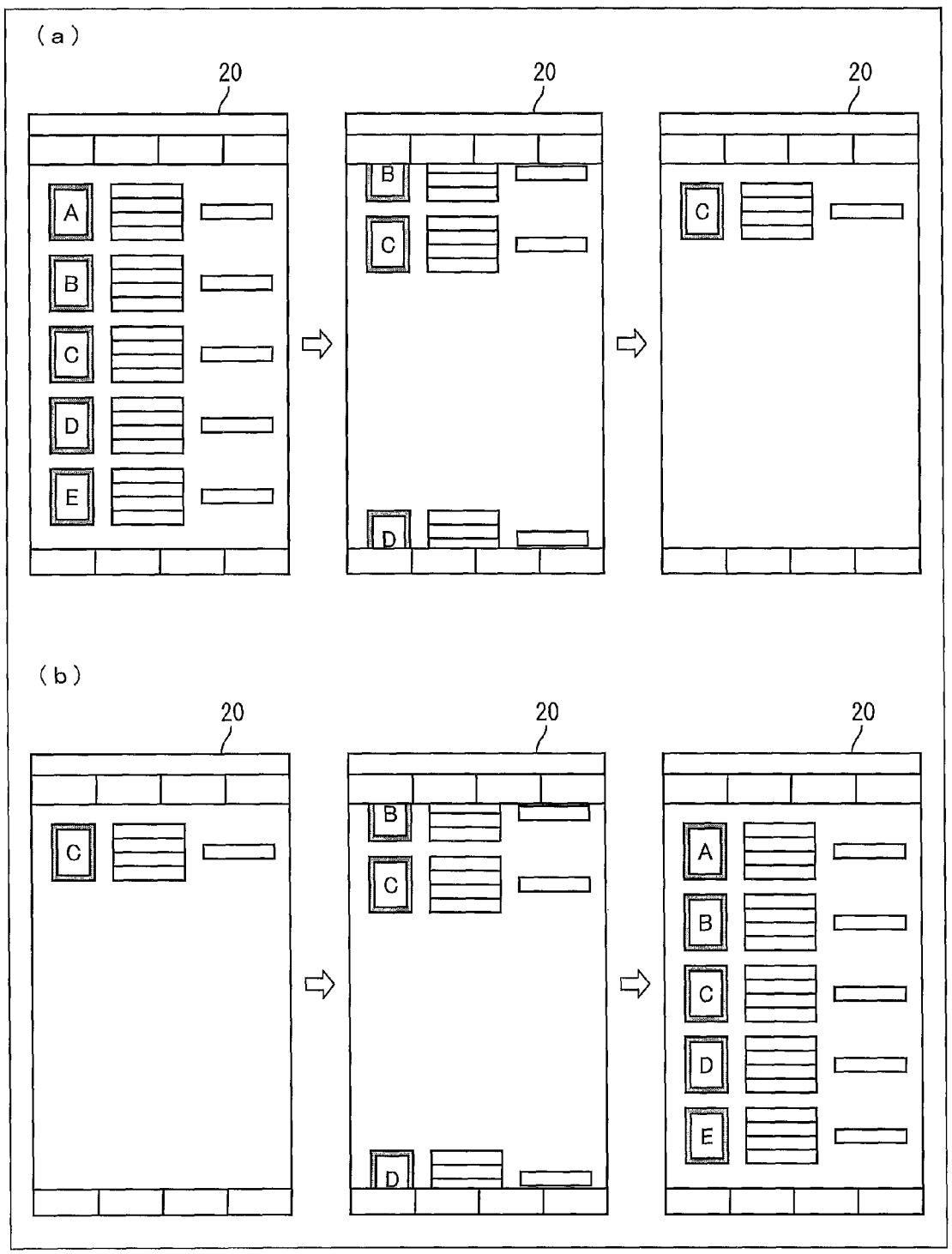
FIG. 4 is a view showing a display screen which appears as a result of an operation of the display screen shown in FIG. 3. (a) of FIG. 4 is a view showing what is to be displayed when a magazine rack is opened, and (b) of FIG. 4 is a view showing what is to be displayed when the magazine rack is closed.

In FIG. 4, (a) is a view illustrating an animation shown to open a magazine rack and display a list of back numbers in the magazine rack by the flicking operation or the dragging operation, and (b) is a view illustrating an animation shown to close the magazine rack and return to display of a list of current issues by the flicking operation or the dragging operation. By a touch of an image of a magazine rack selected on the touch panel and the flicking operation or the dragging operation carried out in an upward direction of the screen 20, an animation such that while a stage corresponding to the selected magazine rack (indicated by "C" in (a) and (b) of FIG. 4) moves above, a flap of the magazine rack C is opened is displayed, as shown in (a) of FIG. 4. Also, stages of other magazine racks A, B, D, and E are scrolled up and down so that they are off the screen. Then, thumbnail images of respective back numbers in the magazine rack C sequentially appear and are arranged under the stage of the magazine rack C so that a list of the back numbers are displayed (see FIG. 5). On the other hand, by the flicking operation or the dragging operation carried out with respect to the displayed magazine rack C in a downward direction of the screen 20 on the touch panel in such a state that the back number is displayed, an animation such that while the stage corresponding to the selected magazine rack C moves so as to return to its original position, the flap of the magazine rack C is closed is displayed, as shown in (b) of FIG. 4. Also, the stages of the other magazine racks A, B, D, and E are scrolled up and down so that they move back to the outside of the screen.

Displaying a back number and hiding it from display by the flicking operation or the dragging operation carried out with respect to an image of a magazine rack as the starting point in upward/ downward direction is similar to a movement of a real-world magazine rack when the magazine rack is opened and closed, respectively. Therefore, the flicking operation or the dragging operation is an easy operation method for a user.

FIG. 5 is a view showing the screen 20 on which a list of back numbers of a certain subscribed magazine are displayed by the above-described operation carried out with respect to the screen shown in FIG. 3. When an input operation for displaying back numbers is carried out, the display of those magazine racks other than a selected magazine rack disappear, and a transition to a state occurs in which (i) the selected magazine rack moves so as to be displayed at the upper part of the screen 20 and (ii) thumbnail images 12' of the respective back numbers are arranged below the selected magazine rack in a grid manner so that the backnumbers of the magazine are displayed in list view. In the configuration of the screen according to the present embodiment, a selected magazine rack and a thumbnail image 12 of a front cover of a current issue of a journal corresponding to the selected magazine rack are displayed at an uppermost stage of the screen 20. Next to the selected magazine rack, information 15 of a book is also displayed. Further, next to the information 15, a close button 19, instead of the select button 16 for displaying back numbers of the magazine, is displayed. The close button 19 is a button for returning to display of the list of the current issues of the respective subscribed books from display of the list of the back numbers. It should be noted that, as described previously, return to display of a list of current issues can be realized by the flicking operation or the dragging operation carried out with respect to a magazine rack.

This allows the user to select his/her desired back number from the list. This action is similar to an actual action of opening a magazine rack on a bookshelf, taking out back numbers, and selecting the desired back number from among them. This allows the user to easily select his/her desired magazine even if the total number of magazines reaches into several hundreds. In a case where there are a large number of back numbers, the back numbers can be displayed by scrolling.

The following description discusses how to change contents displayed on the screen 20 by moving the bookshelf object 10 or shelf faces 11 of the bookshelf object 10 in a virtual three-dimensional space.

(Rotating Bookshelf Object)

The following description discusses how shelf faces 11 to be displayed on the screen 20 are changed by rotating, in a virtual three-dimensional space in the display screen, the bookshelf object 10 on a central axis X (rotary axis, see FIG. 1) of the rectangular parallelepiped (polygonal column) constituting the bookshelf object 10.

It is possible to rotate, by input operation by a user, the bookshelf object 10 on the central axis X (rotary axis) in the virtual three-dimensional space in the screen 20. By rotating the bookshelf object 10, it is possible to bring a different shelf face 11 to the front, and thus possible to display the different shelf face 11 on the screen 20. Alternatively, by stopping the rotation in the middle of it, it is possible to view a plurality of shelf faces 11 at the same time.

According to the present embodiment, the bookshelf object 10 is rotated by a flicking operation which is carried out, on a touch panel provided so as to be superimposed on the screen 20, in a direction substantially orthogonal to the rotary axis (sideways of the screen). Specifically, by the flicking operation, the bookshelf object 10 is rotated in the same direction as that of the flicking operation, so that an adjacent shelf face 11 or a shelf face 11 next to the adjacent shelf face 11 comes to the front and is displayed on the screen 20.

Figure 6:
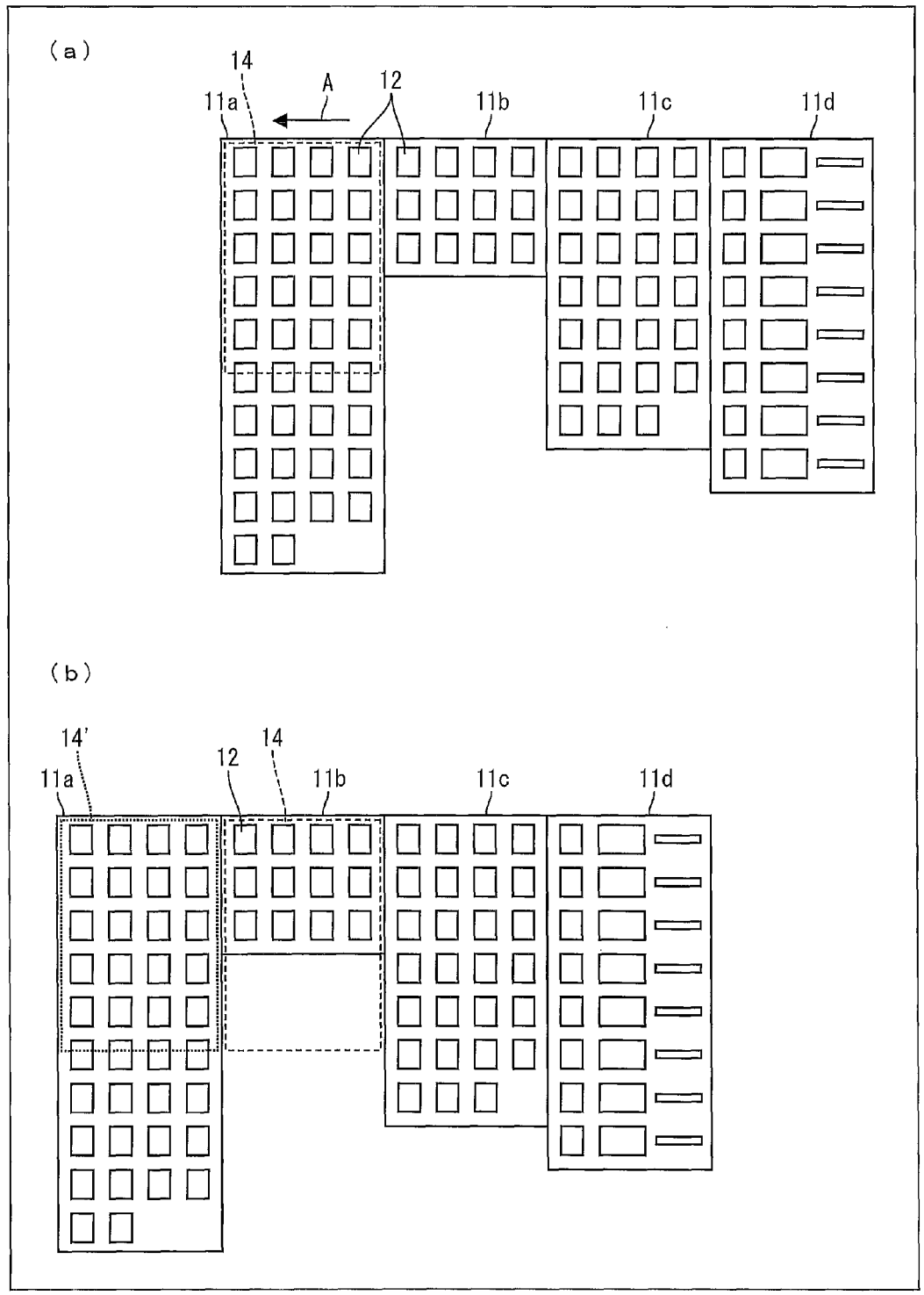
FIG. 6 is a view showing a part of a development view of the bookshelf object, which view is for explaining how a display screen changes as a result of a rotating operation in the present embodiment.

FIG. 6 is an exploded view, for the description purposes, illustrating the shelf faces 11 of the bookshelf object 10. Note, however, that FIG. 6 omits to illustrate the top and bottom surfaces. A region 14 enclosed by a dotted line is actually displayed on the screen 20. (a) of FIG. 6 shows the display region before the rotation. That is, a shelf face 11a, which corresponds to the category "Unread/Recommended", is on the front side and is displayed on the screen 20. In this situation, if it is desired to display a shelf face 11b which is adjacent to the shelf face 11a and corresponds to the category "Recently read", a flicking operation is carried out in a direction toward a side of the shelf face 11a which side is opposite to the shelf face 11b (i.e., a direction indicated by arrow A in FIG. 6). This rotates the bookshelf object 10 in such a manner that the shelf face 11a moves in a direction indicated by the arrow A on the screen and then brings the shelf face 11b to the front, and a region 14 of the shelf face 11b is displayed on the screen (see (b) of FIG. 6). The rotation does not involve lengthwise movement. Therefore, in the exploded view, the region 14 displayed on the screen 20 is shifted just laterally relative to a region 14'.

It should be noted that whether a flicking operation causes the adjacent shelf face 11 to be displayed or the shelf face 11 next to the adjacent shelf face 11 to be displayed depends on the speed of the flicking operation. For example, in a case where the flicking operation is carried out slowly, the adjacent shelf face 11 is displayed (rotate by one face), whereas, in a case where the flick operation is carried out quickly, the shelf face 11 next to the adjacent shelf face 11, i.e., a shelf face 11 opposite to the shelf face 11 which is displayed before the rotation, is displayed (rotate by two faces). What speed of flicking operation causes which shelf face 11 to be displayed can be determined by a manufacturer as appropriate.

It is also possible to rotate the bookshelf object 10 by carrying out, on the touch panel, a dragging operation in a direction substantially orthogonal to the rotary axis. Specifically, by the dragging operation, the bookshelf object 10 rotates in the same direction as that of the dragging operation, so that an adjacent shelf face 11 comes to the front and is displayed. By rotating the bookshelf object 10 by a dragging operation and releasing a finger from the touch panel when a desired shelf face 11 has substantially come to the front, it is possible to display a different shelf face 11. According to the present embodiment, when a dragging operation for displaying the adjacent shelf face 11 is stopped in the middle of it, whether the rotation is to be continued further or is to be canceled is determined depending on a rotation angle at the time when the dragging operation is stopped, and either of the currently displayed shelf face 11 or the adjacent shelf face 11 is displayed. Until the finger is released from the touch panel, the rotational movement follows the movement of the finger. Accordingly, by rotating the bookshelf object 10 a little by a dragging operation and keeping the finger in contact with the touch panel, it is possible to keep a state in which the adjacent shelf face 11 is partly displayed.

A displayed shelf face 11 can be changed not only by the above methods, but also by pressing a shelf face selecting button 17 which allows direct selection of a shelf face 11 to be displayed. The shelf face selecting button 17 is displayed as an object at the upper part of the screen 20, and enables an input which is made by a button selection operation carried out via a touch panel. Also in this case, the rotation of the bookshelf object 10 is displayed on the screen until a selected shelf face 11 is displayed. A direction in which the bookshelf object 10 rotates in this case can be determined depending on a previous operation by a user, previous rotation angle, setting by a manufacturer and/or the like. In a case where a shelf face 11 to be displayed is selected by the shelf face selecting button 17, the bookshelf object 10 automatically rotates until the selected shelf face 11 is displayed. This makes it possible to realize switching to a desired shelf face 11 more quickly than a case where bookshelf object 10 is rotated by a flicking operation so that a desired shelf face 11 is displayed.

According to the present embodiment, when an input operation for rotating the bookshelf object 10 is carried out in such a state that a list of back numbers of a certain subscribed book on the shelf face 11 that corresponds to the category "Subscribed", a current display screen automatically returns to the display screen on which a list of current issues are displayed, while the bookshelf object 10 rotates.

Since each of the shelf faces includes a book(s) of a predetermined category, a user can move to a desired shelf face by rotating the bookshelf object. The user can manipulate to display a shelf face 11 corresponding to a category to which a target book belongs and then choose the desired book from the shelf face 11. As such, the user can easily access a desired book.

(Lengthwise Scrolling of Shelf Face)

By moving a certain shelf face 11 of the bookshelf object 10 in a lengthwise direction in the virtual three-dimensional space in the display screen, a different region of a currently displayed shelf face is displayed. The following description discusses how this is carried out.

The length of each of the shelf faces 11 in the lengthwise direction of the bookshelf object 10 is greater than a length that can be displayed at one time on the screen 20 of the content display device. Therefore, regarding a shelf face 11 displayed on the screen 20, only part of the shelf face 11 is actually displayed (see FIG. 1). In the case of FIG. 1, the region 14 enclosed by a dotted line is actually displayed on the screen 20. Therefore, the other part of the shelf face 11 is not displayed on the screen 20. In view of this, the content display device is configured such that, by moving the shelf face 11 displayed on the screen 20 in the lengthwise direction, the position of the region 14 to be displayed on the screen 20 is changed so that a region which was not displayed is displayed on the screen 20. The shelf face 11 can be moved in the lengthwise direction by input operation by a user.

According to the present embodiment, by carrying out a scrolling operation on the touch panel in a desired direction, a shelf face 11 is moved in the same direction as that of the scrolling operation and a region which was not displayed is displayed. The scrolling operation is for example a flicking operation in the lengthwise direction or a dragging operation in the lengthwise direction. In a case where the flicking operation is carried out, to what extent the shelf face 11 is to be moved is determined depending on the speed of the flicking operation, and the shelf face 11 is moved according to the determination. What speed of flicking operation causes what degree of movement of a shelf face can be determined as appropriate by a manufacturer. In a case where a dragging operation is carried out, the movement of the shelf face follows the dragging operation, and the shelf face stops moving when a finger is released from the touch panel.

Figure 7:
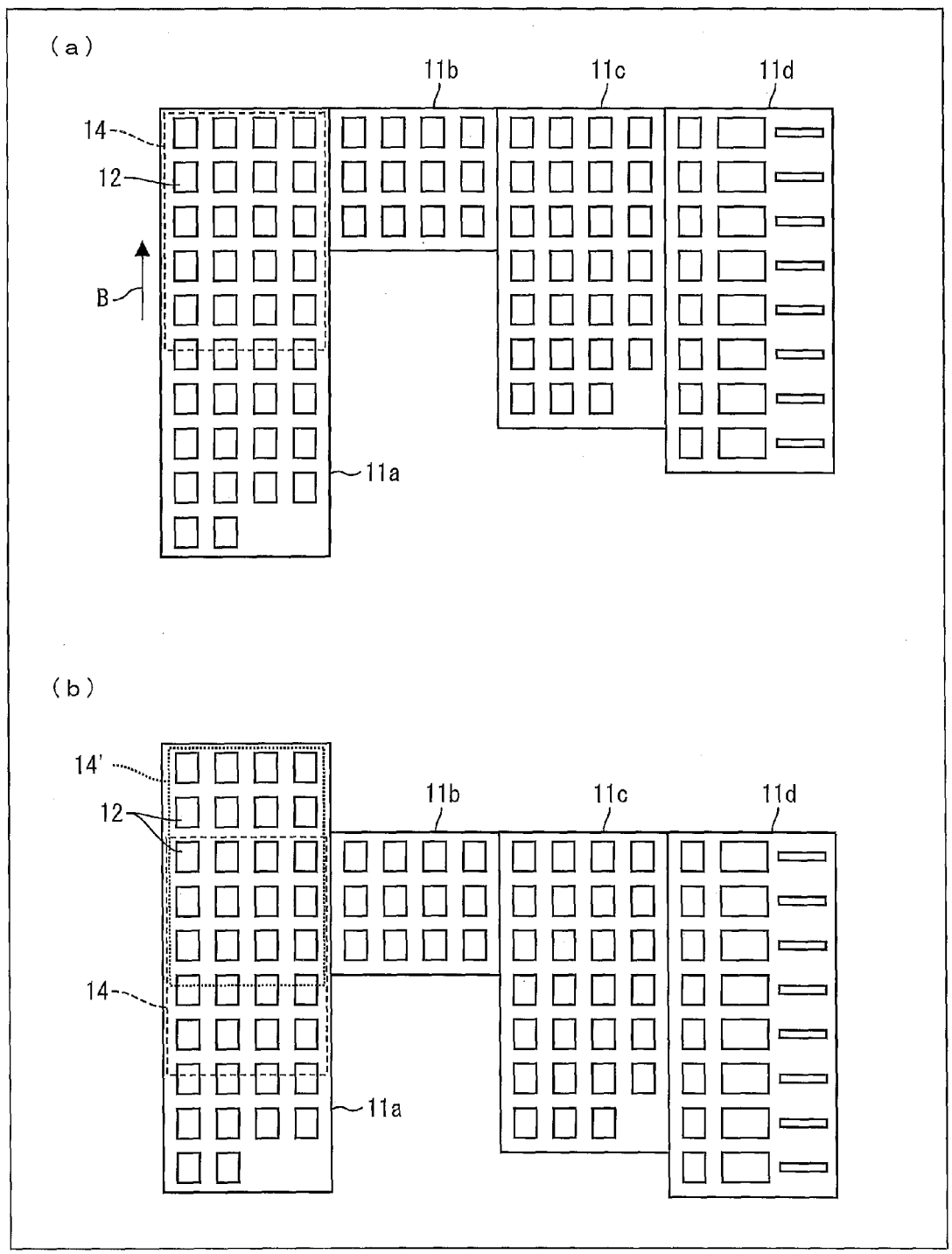
FIG. 7 is a view showing a part of a development view of the bookshelf object, which view is for explaining how a display screen changes as a result of a scrolling operation in the present embodiment.

FIG. 7 is an exploded view, for the description purposes, illustrating the shelf faces 11 of the bookshelf object 10. A region 14 enclosed by a dotted line is actually displayed on the screen 20. (a) of FIG. 7 shows a state before a scrolling operation is carried out, in which state the uppermost part of the shelf face 11a is displayed. In a case where it is desired to display a lower part of the shelf face 11a, a scrolling operation is carried out in an upward direction (in the direction indicated by arrow B in FIG. 7) with respect to the shelf face 11a. This causes the shelf face 11a to move in the upward direction. As a result, the position of the region 14 displayed on the screen 20 moves downward relative to a region 14' which was displayed before the movement (see (b) of FIG. 7).

It should be noted that the movement in the lengthwise direction of each of the shelf faces 11 is controlled independently of the other shelf faces 11. That is, when a scrolling operation is carried out in the lengthwise direction, only a shelf face 11 that is on the front side and displayed on the screen 20 at that time is moved in the lengthwise direction. For example, assume that, under a condition where an uppermost part of the shelf face 11a, 11b, 11c or 11d is to be displayed when display of that shelf face is carried out (see (a) of FIG. 7), a scrolling operation is carried out with respect to the shelf face 11a to cause the shelf face 11a to move in the upward direction and thereby a display region of the shelf face 11a moves to a lower part of the shelf face 11a. In this case, only the shelf face 11a of the shelf faces 11 is moved in the upward direction, and the other shelf faces 11b to 11d are not moved in the lengthwise direction (see (b) of FIG. 7). Therefore, if a rotation operation is carried out here with respect to the bookshelf object 10 to display any of the other shelf faces 11b to 11d, the uppermost part of that shelf face is displayed as before. As such, even in a case where the shelf face 11a is moved in the lengthwise direction by a scrolling operation, the other shelf faces 11b to 11d remain unchanged from the last time they were viewed.

For example, assume that in a case where a few thumbnail images 12 arranged on the shelf face 11b corresponding to the category "Recently read" are arranged only at an upper part of the shelf face 11b, a user (i) rotates the bookshelf object 10, in such a state that the uppermost part of the shelf face 11b is displayed, to move to the shelf face 11a corresponding to the category "Unread/Recommended" and (ii) carries out a scrolling operation to thereby display a lowermost part of the shelf face 11a. Here, if a lowermost part of the shelf face 11b is displayed in the same manner as the shelf face 11a when the user rotates the bookshelf object 10 again to move back to the shelf face 11b, no thumbnail images 12 are displayed on the shelf face 11b. This appears for the user as if the books has disappeared and is therefore not preferable. Further, the user has to carry out a scrolling operation again to cause the uppermost part of the shelf face 11b to be displayed. This is not user-friendly. In this regard, according to the content display device of the present embodiment, when a user rotates the bookshelf object 10 again and goes back to the shelf face 11c, the shelf face 11c is displayed as it was previously viewed, i.e., the uppermost part of the shelf face 11c is displayed. Accordingly, the user does not have to carry out additional a lengthwise position of the shelf face 11a is kept at a position that lies after the scrolling.

Such an action of o perating the screen display and the bookshelf object and shelf face being displayed on the screen reminds a user of an action of operating a revolving bookshelf placed in a bookstore or the like. This allows a person who makes the first contact with the content display device according to the present invention or a person unaccustomed to operating equipment to easily understand how to operate the content display device. That is, the content display device can be said to have a user interface that is easy for the user to operate.

Unlike a revolving bookshelf placed in a bookstore or the like, for example when the user would like to see a lower part of the shelf face, the user can move, in an upward direction, only the shelf face that he/she is looking at. Furthermore, the user can rotate the bookshelf object with the shelf face moved in the upward direction. Therefore, without bringing the viewpoint back to a former height when having rotated the bookshelf object after looking a shelf face at a different height, the user can see any of the other shelf faces at the height at which the user previously saw the shelf faces.

(Process of Rendering Images Transparent)

In displaying on the screen 20 a rotation of the bookshelf object 10 and a scrolling of a shelf face 11, the content display device can carry out a process of rendering a shelf face 11 and a thumbnail image 12 partially semitransparent. The following description refers to FIGS. 8 and 9.

Figure 8:
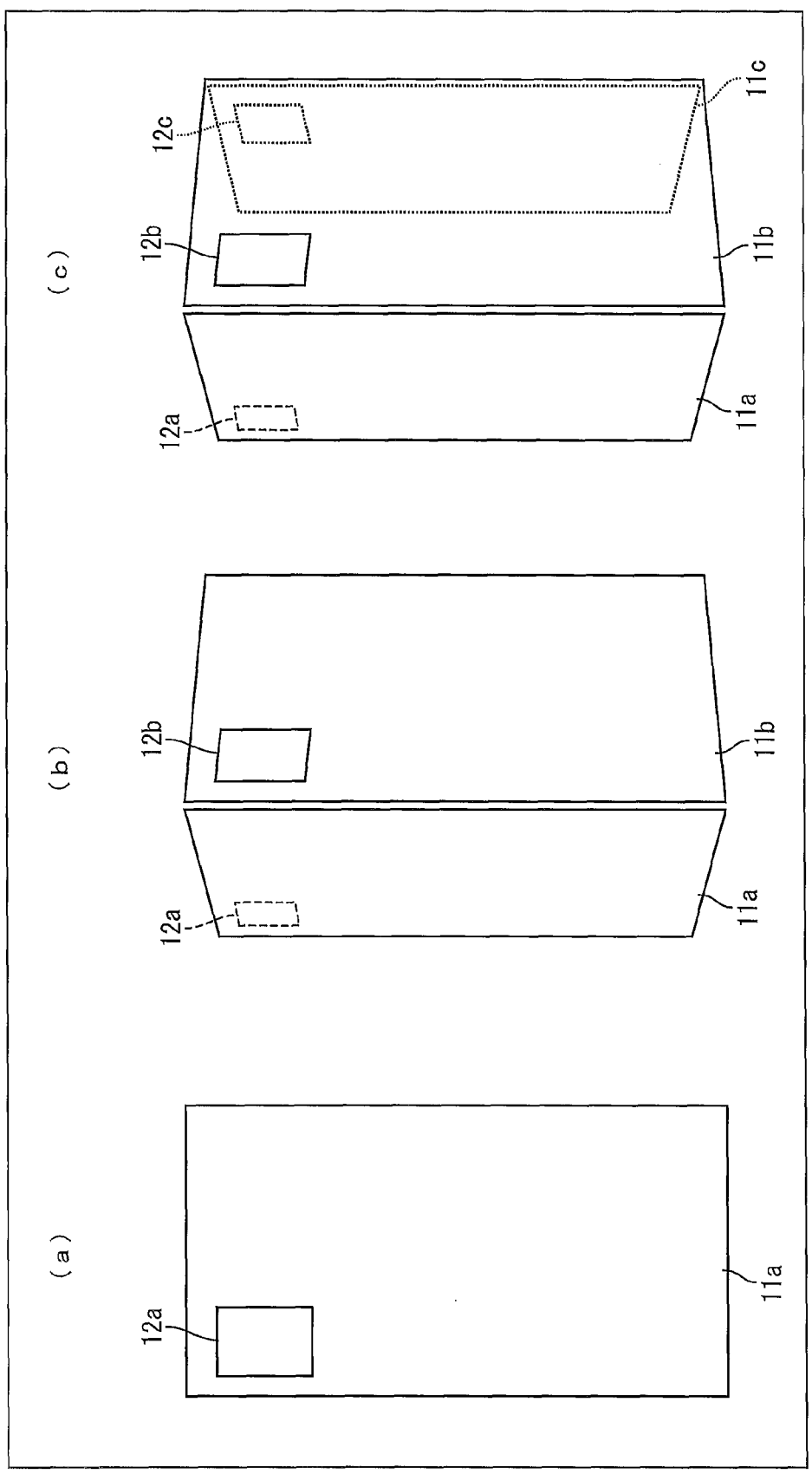
FIG. 8 is a view showing a bookshelf object, which view is for explaining how a shelf face and a thumbnail image become semi-transparent as a result of a rotating operation in the present embodiment.

FIG. 8 is a view illustrating how images are rendered semitransparent in displaying the rotation of the bookshelf object 10. For convenience of description, only a single thumbnail image 12 is shown in FIG. 8. (a) of FIG. 8 shows a state of display before a rotation process, and the opacity of shelf face 11a and thumbnail image 12a placed on the shelf face 11a both of which are being displayed is 100%. Therefore, (i) shelf face 11*b* and shelf face 11*d* both of which are adjacent to the shelf face 11*a* and (ii) thumbnail images attached to the shelf face 11*b* and shelf face 11*d* are not displayed on the screen 20.

(b) of FIG. 8 is a view illustrating the bookshelf object 10 being rotated, in the standard mode, in response to an input operation for changing a shelf face 11 to be displayed on the screen 20 from the shelf face 11*a* to the shelf face 11*b*. (b) of FIG. 8 shows a case where, under the situation where the bookshelf object 10 is rotated at an angle equal to or greater than 45 degrees, the shelf face 11*b* to be displayed subsequently to the shelf face 11*a* is greater in display area on the screen 20 than the shelf face 11*a* having been displayed before the rotation process. At this time, the previously displayed shelf face 11*a* and thumbnail image 12*a* placed on the shelf face 11*a* are displayed in a semitransparent manner. Meanwhile, the shelf face 11*b* and thumbnail image 12*b* placed on the shelf face 11*b*, both of which are to be displayed subsequently to the shelf face 11*a* and the thumbnail image 12*a*, are displayed at opacity remained unchanged. However, this is not the only possibility. Alternatively, the shelf face 11*b* and thumbnail image 12*b* placed on the shelf face 11*b*, both of which are to be displayed subsequently to the shelf face 11*a* and the thumbnail image 12*a*, may be also displayed in a semitransparent manner. In this case, an adjacent face (shelf face 11*c*) adjacent to the shelf face 11*b*, which adjacent face is not the shelf face 11*a*, is hidden from display. In a case where two faces being displayed during the rotation are both semitransparent, it is preferable that a value obtained by addition of opacities (%) of these two faces is 100.

It should be noted that in a case where, under the situation where the bookshelf object 10 is rotated at an angle less than 45 degrees, the shelf face 11*a* having been displayed before the rotation process is greater in display area on the screen 20 than the shelf face 11*b* to be displayed subsequently to the shelf face 11*a*, the previously displayed shelf face 11*a* and thumbnail image 12*a* placed on the shelf face 11*a* are displayed at opacity remained unchanged while the shelf face 11*b* and thumbnail image 12*b* placed on the shelf face 11*b*, both of which are to be displayed subsequently to the shelf face 11*a* and the thumbnail image 12*a*, are displayed in a semitransparent manner (not shown). Alternatively, in a case where the bookshelf object 10 is rotated at an angle less than 45 degrees, the previously displayed shelf face 11*a* and thumbnail image 12*a* placed on the shelf face 11*a* may also be displayed in a semitransparent manner.

(c) of FIG. 8 is a view illustrating the bookshelf object 10 being rotated, in the active mode, in response to an input operation for changing a shelf face 11 to be displayed on the screen 20 from the shelf face 11*a* to the shelf face 11*b*. (c) of FIG. 8 shows a case where, under the situation where the bookshelf object 10 is rotated at an angle equal to or greater than 45 degrees, the shelf face 11*b* to be displayed subsequently to the shelf face 11*a* is greater in display area on the screen 20 than the shelf face 11*a* having been displayed before the rotation process.

In a case where the shelf face 11*a* is on the front side, the shelf face 11*a* is also displayed in a semitransparent manner in the active mode. Therefore, (i) the shelf face 11*d* adjacent to the shelf face 11*a* and (ii) a thumbnail image 12*d* placed on the shelf face 11*d* are displayed together with the shelf face 11*a*. When the rotation is made at a rotation angle less than 45 degrees to display the shelf face 11*b*, which is opposite to the shelf face 11*d* and adjacent to the shelf face 11*a*, the shelf face 11*d* and the thumbnail image 12*d* still remain displayed together with the shelf face 11*b*. However, when the rotation angle becomes equal to or greater than 45 degrees, the shelf face 11*d* and shelf face 11*d* are hidden from display. Meanwhile, the shelf face 11*c* adjacent to the shelf face 11*b*, which is to be displayed subsequently, and (ii) the shelf face 11*c* are displayed in a semitransparent manner on the screen 20 ((c) of FIG. 8).

In the active mode, during the rotation, three shelf faces 11 are all displayed in a semitransparent manner on the screen 20, and the opacity of a shelf face having the largest display area on the screen 20 among these three shelf faces 11 is the highest among opacities of these three shelf faces 11. That is, when the rotation angle is less than 45 degrees, the opacity of the shelf face 11*a* previously displayed on the front side is the highest among the opacities of these three shelf faces 11. When the rotation angle is 45 degrees, the opacities of the shelf face 11*a* previously displayed on the front side and the shelf face 11*b* to be subsequently displayed on the front side are the highest among the opacities of these three shelf faces 11. When the rotation angle is greater than 45 degrees, the opacity of the shelf face 11*b* to be subsequently displayed on the front side is the highest among the opacities of these three shelf faces 11.

Figure 9:
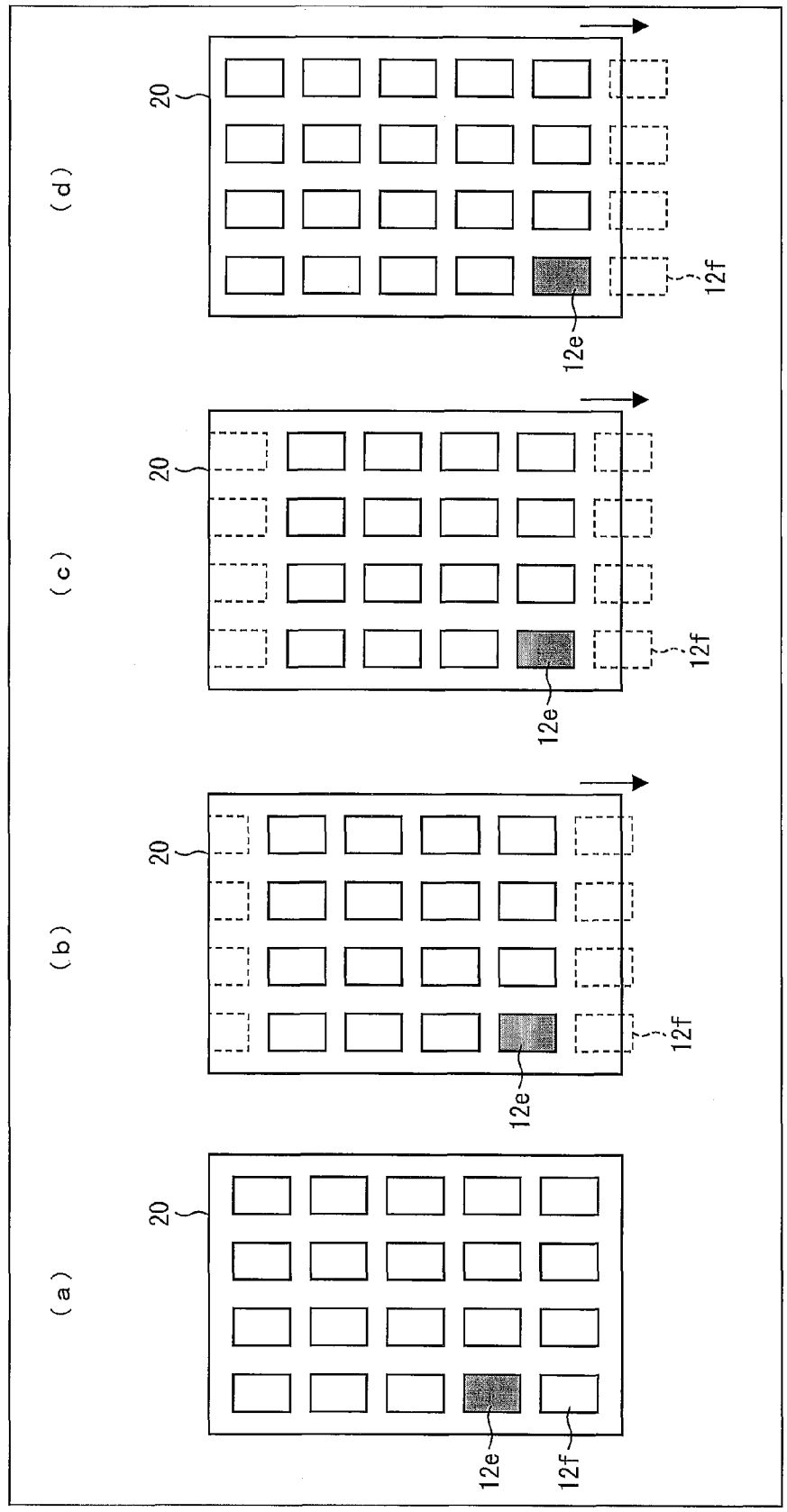
FIG. 9 is a view showing a display screen, which view is for explaining how a thumbnail image becomes semi-transparent as a result of a scrolling operation in the present embodiment.

FIG. 9 is a view illustrating how images are rendered semitransparent in displaying scrolling of the shelf face 11. The content display device is configured such that, in displaying scrolling of the shelf face 11, a thumbnail image 12 to be off the screen 20 is displayed in a semitransparent manner. Further, the degree of opacity of the thumbnail image 12 to be off the screen 20 is varied according to how large a visible part of the thumbnail image 12 which is going to be off the screen 20 is. Here, the smaller the visible part is, the lower the opacity of the thumbnail image 12 is (the higher the transparency of the thumbnail image 12 is).

(a) of FIG. 9 shows images displayed on the screen 20 before the scrolling is carried out. For convenience of description, FIG. 9 omits images other than thumbnail images 12. In this state, it is assumed that an input operation for scrolling the shelf face 11 in the downward direction of the screen, such as a flicking operation of flicking down the screen, has been carried out to cause a thumbnail image 12 placed more above to be displayed. In response to this input operation, part of a thumbnail image 12*f* having been displayed at the lowermost part of the screen 20 before the input operation becomes off the screen 20. This causes the thumbnail image 12*f* to be displayed in a semitransparent manner. Here, when the part off the screen is about 20% of an entire area of the thumbnail image 12*f* as shown in (b) of FIG. 9, the opacity of the thumbnail image 12*f* can be set to, for example, 50% (transparency of 50%). In this case, a thumbnail image 12 not being lowered in opacity and placed at a lowermost stage is a thumbnail image 12*e* which is at a stage higher by one shelf 13 than the thumbnail image 12*f*. Further, when the part off the screen is about 50% of the entire area of the thumbnail image 12*f* as shown in (c) of FIG. 9, the opacity of the thumbnail image 12*f* can be set to, for example, 20% (transparency of 80%). Still further, when the part off the screen is about 80% of the entire area of the thumbnail image 12*f* as shown in (d) of FIG. 9, the thumbnail image 12*f* can be, for example, made completely transparent to be hidden from display.

The present embodiment describes a thumbnail image 12 which is going to disappear from the bottom of the screen 20 to the outside of the screen 20 by downward scrolling of the screen. Such a process is carried out in a similar manner with respect to a thumbnail image 12 which is going to be shown up to the screen from the top of the screen 20. That is, when the thumbnail image 12 is shown up to the screen 20 from the top of the screen 20, opacity of such a thumbnail image 12 is varied according to a ratio between a visible part of the thumbnail image 12 on the screen 20 and an invisible part of the thumbnail image 12 off the screen 20.

By thus rendering a shelf face 11 partially semitransparent or changing its semitransparency, the user can obtain an actual feeling of operating a three-dimensional object. Further, displaying an adjacent shelf face 11 allows the user to know what category the adjacent shelf face 11 is assigned or what books (thumbnail images) are placed on that shelf face 11, thus allowing the user to more easily find his/her desired book.

In addition, the variation in transparence (opacity) may also be carried out during the upward/downward scrolling of a magazine rack in making a transition from screen display of current issues on a shelf face 11 that corresponds to the category "Subscribed" to display of a list of back numbers. Moreover, the variation in transparence (opacity) may also be carried out during an image enlarging and an image reduction carried out, respectively, by a pinch-in operation and a pinch-out operation, which will be described later.

(Displaying Enlarged/Reduced Images)

Figure 10:
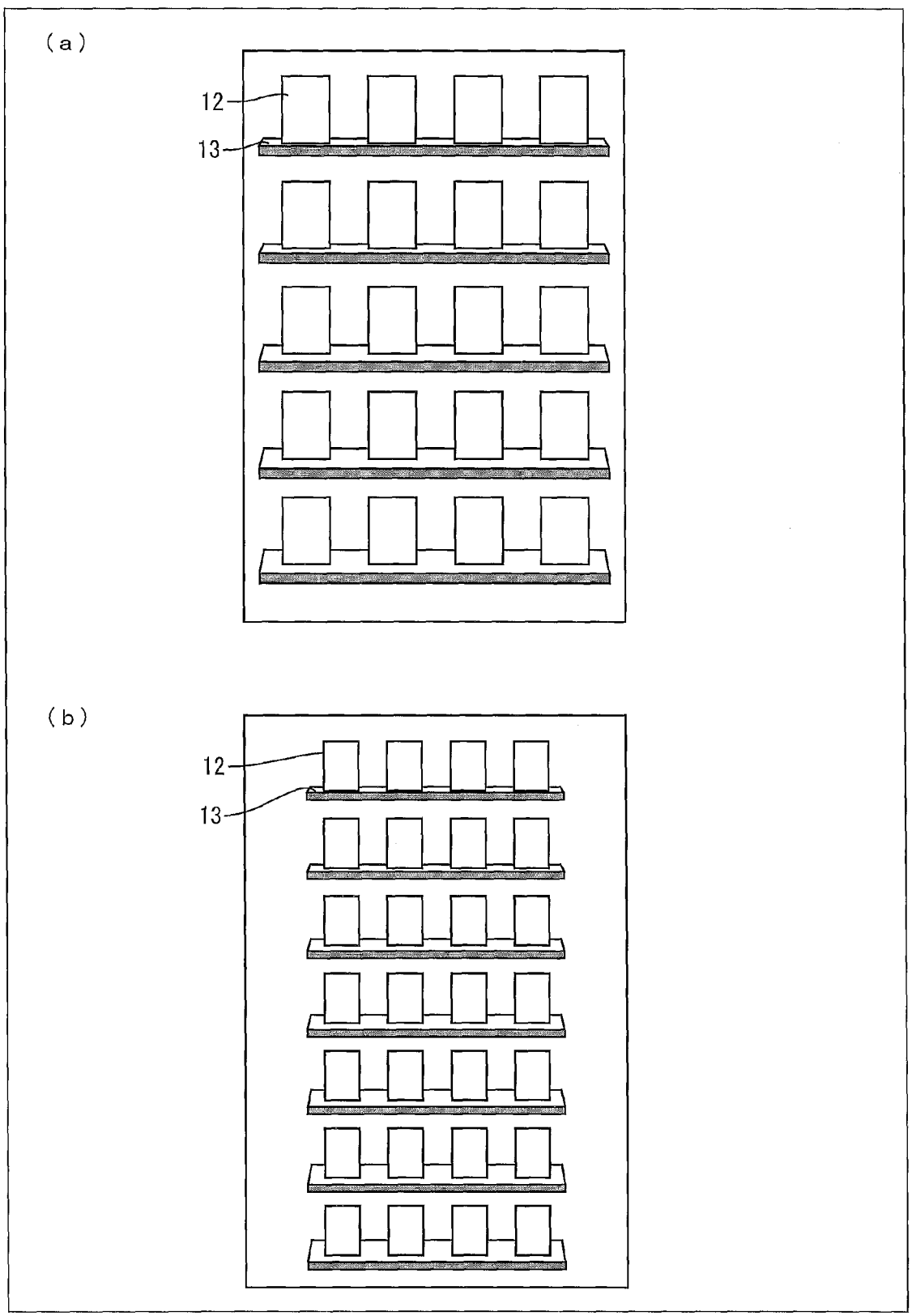
FIG. 10 is a view showing a display screen, which view is for explaining how a screen image is enlarged or reduced in the present embodiment.

The number of thumbnail images 12 to be displayed on one screen under a condition where a front shelf face 11 is displayed on the screen 20 is changeable. FIG. 10 is a view showing an example of how thumbnail images are displayed on the screen 20. (a) of FIG. 10 shows how twenty thumbnail images 12 are displayed. (b) of FIG. 10 shows how twenty-eight thumbnail images 12 are displayed. When enlarged thumbnail images 12 are displayed, each of the thumbnail images 12 is easy to view. However, the number of thumbnail images 12 that can be displayed on the screen 20 at a time (such number is related to the number of shelves 13 that can be displayed at a time) is small. On the other hand, displaying reduced thumbnail images 12 makes it possible to display many thumbnail images 12 at a time.

The number of thumbnail images 12 to be displayed on the screen 20 can be changed by input operation by a user. Specifically, a pinch-out operation on the touch panel enlarges a displayed shelf face 11 so that displayed thumbnail images 12 are enlarged. On the other hand, a pinch-in operation on the touch panel reduces the displayed shelf face 11 so that the displayed thumbnail images 12 are reduced. Note here that the "pinch-out operation" is made by a gesture such that two fingers of a user etc. simultaneously touch an operation surface and the two fingers open while in contact with the operation surface. Further, the "pinch-in operation" is made by a gesture such that two fingers of a user etc. simultaneously touch the operation surface and the two fingers close while in contact with the operation surface.

Figure 11:
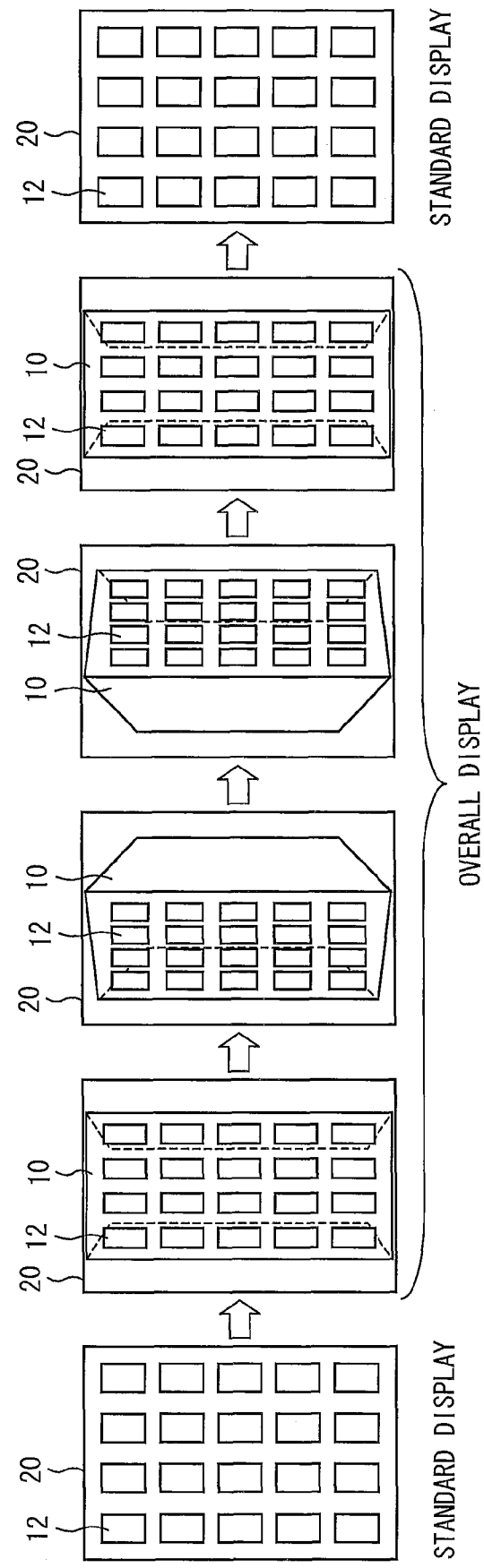
FIG. 11 is a view showing another display screen, which view is for explaining how a screen image is enlarged or reduced in the present embodiment.

FIG. 11 is a view showing a screen display flow of a procedure for displaying a rotating bookshelf object 10 by tapping the shelf face selecting button 17 in the standard mode. For convenience of description, thumbnail images 12 are placed only on one shelf face 11 in FIG. 11.

As shown in FIG. 11, when the shelf face selecting button 17 is tapped, in a display state provided in the standard mode (standard view), so that the bookshelf object 10 is rotated, an animation may be displayed with a combination of the followings: (i) the view of the bookshelf object 10 is reduced in size in real time so that the bookshelf object 10 can be displayed in a wider view, (ii) switching is done to a view from which the bookshelf object 10 can be recognized as being a rectangular parallelepiped object in a virtual three-dimensional space; (iii) the bookshelf object 10 is rotated in the state where the view (ii) is shown; and (iv) after the rotation, the view of the bookshelf object 10 is enlarged to return to the standard view.

(Configuration of Content Display Device)

Figure 12:
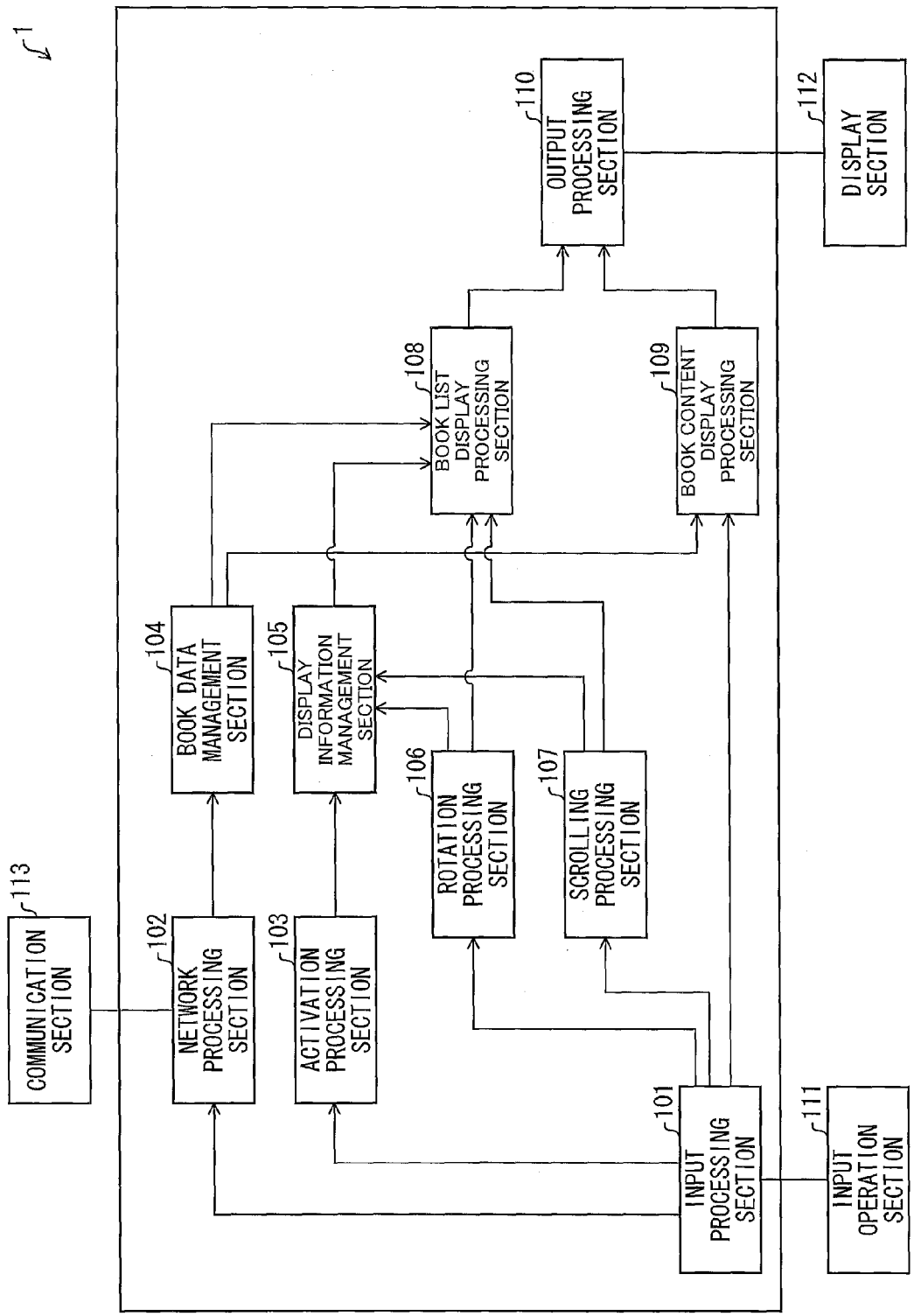
FIG. 12 is a block diagram showing a configuration of a content display device of the present embodiment.

The following description discusses, with reference to FIG. 12, a configuration and function of a content display device which realizes the display as described above. FIG. 12 is a block diagram showing an essential configuration of a content display device 1 according to an embodiment of the present invention.

As shown in FIG. 12, the content display device 1 includes: an input processing section 101; a network processing section 102; an activation processing section 103; a book data management section 104; a display information management section 105; a rotation processing section (rotation processing means) 106; a scrolling processing section (scrolling processing means) 107; a book list display processing section (display processing means) 108; a book content display processing section 109; an output processing section (display processing means) 110; an input operation section (input section) 111; a display section (screen) 112; and a communication section 113.

The input processing section 101 obtains input operation information detected by the input operation section 111 and then instructs the rotation processing section 106 and the scrolling processing section 107 on the basis of the input operation information thus obtained to execute processing. Alternatively, the input processing section 101 instructs the book content display processing section 109 to execute processing.

The network processing section 102 obtains book data as content data from a server on a network through the communication section 113. The book data includes a book image, book information, and a book content. According to the present embodiment, the pieces of book data obtained are stored in the content display device 1. However, this is not the only possibility. Alternatively, a (cloud) configuration in which the pieces of book data are sequentially obtained from the server may be adopted.

The book data management section 104 causes the book data obtained by the network processing section 102 to be stored in a storage device, and the book data management section 104 also manages the book data thus obtained. Further, the book data management section 104 transmits the book data in response to requests from the book list display processing section 108 and the book content display processing section 109.

The activation processing section 103, when an activation operation is carried out with respect to the content display device 1, instructs the display information management section 105 to execute processing so that an image is displayed on the display section.

The display information management section 105 manages an image to be displayed on the display section 112, and the display information management section 105, when an activation processing is carried out, instructs the book list display processing section 108 to generate an image to be displayed. Further, when rotation or scrolling has been done, the display information management section 105 stores, in the storage device such as memory, the following pieces of information: positional information of a front shelf changed by rotation, scrolling positional information changed by scrolling; a value changed by enlargement or reduction; book information at the display of the book content; page information on a displayed book; and information indicating whether a list of current issues or a list of back numbers is displayed at the display of the shelf corresponding to the category "Subscribed".

The rotation processing section 106, when the input operation section 111 detects an input operation for rotating the bookshelf object 10 displayed on the display section 112, and its corresponding operation information is accepted by the input processing section 101, performs processing for an animation and an image both to be displayed on the display section 112 on the basis of the operation information.

Similarly, the scrolling processing section 107, when the input operation section 111 has detected an input operation for scrolling a shelf face 11 displayed on the display section 112, and the input processing section 101 has then accepted operation information concerning the input operation, performs processing for an animation and an image to be displayed on the display section 112, on the basis of the operation information.

The book list display processing section 108 obtains book data to be displayed from the book data management section 104 and obtains an image to be displayed from the display information management section 105. The book list display processing section 108 also obtains information processed by the rotation processing section 106 or the scrolling processing section 107, generates an image and an animation both used at the display of a list of books on the display section 112, and transmits the image and the animation to the output processing section 110.

The book content display processing section 109 accepts information of a book selected by the user through the input operation section 111 from the input processing section 101. Then, the book content display processing section 109 obtains, on the basis of the information thus accepted, data of the selected book from the book data management section 104, and then transmits data containing the content of the selected book to the output processing section 110. When a thumbnail image 12 of a book is tapped, and such an input operation is accepted by the input processing section 101, its corresponding operation information is transmitted to the book content display processing section 109, and the book content display processing section 109 performs processing for display the content (text) of the book. Further, when an input operation of long-tapping (pressing and holding) a thumbnail image 12 of a book is accepted by the input processing section 101, its corresponding operation information is transmitted to the book content display processing section 109, the book content display processing section 109 performs processing for displaying book information of the book, such as a book title, a publisher, an author, a commentary of the book, and month and year of publication.

The output processing section 110 receives a display content having been generated by and transmitted from the book list display processing section 108 or the book content display processing section 109, converts the display content into data for display, and then causes the data for display to be displayed on the display section 112.

At the activation of the content display device 1, each of the foregoing processing sections obtains, within the bounds of not exceeding their roles, (i) book data such as types of shelf faces 11, a thumbnail image(s) 12 of a book(s), and information of a book(s) and (ii) display information such as a type of a previously displayed shelf face 11 and a scrolling position of the previously displayed shelf face 11, all of which are stored in the memory. Further, at the operation processing as well as at the activation, thumbnail images 12 of books to be displayed in list form are obtained among from the display information and the book data, and the thumbnail images 12 thus obtained are converted into texture data for use in virtual three-dimensional display. From the display information, a parameter such as a viewpoint for providing virtual three-dimensional display is calculated. The book data is subjected to three-dimensional computation by three-dimensional processing, and display is provided by display processing. On the other hand, at the viewing of a book, a book content of book data corresponding to the book is obtained so that a two-dimensional display of the book content is provided. Further, at the purchase of a book, its corresponding book data is purchased over a network and is then managed by the book data management section. In a case where a thumbnail image 12 of the purchased book is to be displayed, virtual three-dimensional display of the thumbnail image 12 is provided by the book list display processing section.

It should be noted that, those skilled in the art who have understood the foregoing content displayed on the screen 20 of the content display device 1 can realize display of a bookshelf object 10 and of each shelf face 11, rotation of the bookshelf object 10 and display of the rotation, movement of a shelf face 11 by scrolling and display of the movement, and the like, by employing a known technique such as OpenGL (Open Graphics Library). Therefore, descriptions of specifically how data are processed and managed by each processing section and each management section for realizing these displays are omitted here.

As the input operation section 111, a touch panel is used.

The display section 112 can be constituted by a display device including a liquid crystal panel or the like.

Figure 13:
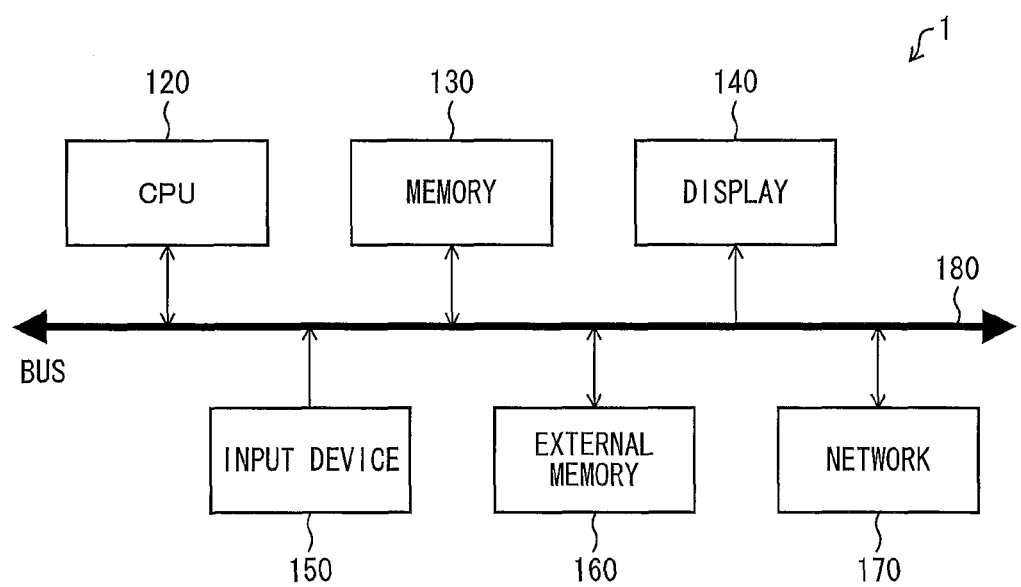
FIG. 13 is a block diagram showing a hardware configuration of the content display device of the present embodiment which is realized by a computer.

The foregoing processing sections and management sections can be realized by using, for example, a computer (electronic computer). FIG. 13 is a block diagram illustrating a hardware configuration of the content display device 1 realized by a computer.

As shown in FIG. 13, the content display device 1 includes: a central processing unit (CPU) 120 interconnected via a bus 180; an internal storage device (memory) 130; a display 140; and an input device 150. In addition, the content display device 1 can be connected to an external storage device (external memory) 160 via an input/output interface. Further, the content display device 1 can be connected to an external network 170 such as Internet via a network communication device.

The memory 130 stores therein (i) various programs for causing a computer to operate as the foregoing processing sections and management sections and (ii) electronic book data obtained. p The input device 150 is means for accepting an input operation carried out by a user and is, for example, a trackball and a touch panel provided on a display.

The book data can be obtained via the external memory 160 and the communication network 170.

As described previously, the content display device of the present embodiment is intended to be realized as an electronic book terminal with which an electronic book can be viewed. Note, however, that the content display device of the present embodiment is not limited to this. For example, the content display device of the present embodiment can be a portable terminal (such as a mobile phone, a smart phone, and an electronic dictionary), or a terminal device (such as a personal computer having a monitor).

(Summary of Embodiment)

As described above, the content display device of the present invention is preferably arranged such that the scrolling processing means controls a display position of each of the side faces in the direction independently of the other side faces.

Since a display position of each side face in the lengthwise direction is controlled independently of the other side faces, only a display position of a side face on which the second input operation has been carried out can be changed in the lengthwise direction. Accordingly, display positions of the other side faces in the lengthwise direction are not changed.

Consequently, in a case where the first input operation is carried out thereafter so that another side face is displayed on the screen, a previously-displayed position of the another side face in the lengthwise direction is displayed without being affected by the change of the display position of the side face on which the second input operation has been carried out. It is therefore possible to save the trouble of, after movement to another side face, scrolling the screen again so that an originally-displayed position of the another side face is displayed.

The content display device of the present invention is preferably arranged such that respective different categories are assigned to the side faces, and the respective pieces of content represented by the plurality of images arranged on each of the side faces belong to a category assigned to the each of the side faces.

According to the arrangement, each of the side faces contains pieces of content classified to the same category assigned to the side face. This makes it easy to manage the content and to search for a desired piece of content.

The content display device of the present invention is preferably arranged such that at least one of the side face is provided with a shelf, and the display processing means (i) causes the plurality of images on said at least one of the side face to be displayed so as to be placed on the shelf and (ii) changes a display angle of the shelf in accordance with a display position of the shelf on the screen.

According to the arrangement, even in a case where only a part of a side face is displayed on the screen, a user can intuitively perceive that he or she is watching a three-dimensional object.

The content display device of the present invention is preferably arranged such that the display processing means decreases opacity of at least one of the side faces and at least one of the plurality of images so that the side faces other than the currently-displayed side face and the plurality of images arranged on the side faces are also allowed to be displayed.

According to the arrangement, a user can recognize images arranged in another side face. In addition, the user can intuitively perceive that he or she is watching a three-dimensional object.

The content display device of the present invention is preferably arranged such that the display processing means changes opacity of the at least one of the side faces in accordance with a rotation angle of the polygonal column.

The content display device of the present invention is preferably arranged such that the input section is a touch panel superimposed on the screen.

According to the arrangement, a user has a sense of directly operating the three-dimensional object, and therefore can intuitively operate the three-dimensional object. This allows a person who makes the first contact with the content display device or a person unaccustomed to operating equipment to easily understand how to operate the content display device.

The content display device of the present invention is preferably arranged such that the rotation processing means determines, in accordance with speed of the first input operation on the touch panel, the side face to be displayed after the rotation.

According to the arrangement, by changing speed of the first input operation on the touch panel, an angle by which the three-dimensional object is rotated can be changed. Therefore, even with a single operation, it is possible to display, for example, an adjacent side face or a side face next to the adjacent side face, in accordance with the speed of the input operation.

The content display device of the present invention is preferably arranged such that the scrolling processing means determines, in accordance with speed of the second input operation on the touch panel, a display part to be displayed after the scrolling.

According to the arrangement, by changing the speed of the second input operation on the touch panel, the distance by which the display region is moved by scrolling can be changed. Therefore, even with a single operation, it is possible to move through one, two or more, for example, rows of images in accordance with the speed of the input operation.

The content display device of the present invention is preferably arranged such that the first input operation is an operation of selecting the side face to be displayed, and the rotation processing means rotates the polygonal column in accordance with the selection made by the first input operation on the touch panel so that the side face thus selected is displayed.

According to the arrangement, a desired side face can be displayed by a single input operation. It is therefore possible to promptly switch display to the desired side face.

The content display device of the present invention is preferably arranged such that at least one of the side faces has a column of images arranged along the direction, and in a case where an input operation for moving one of the images in an upward direction on the screen is carried out on the touch panel while the at least one of the side faces which has the column of images arranged along the direction is being displayed, a list of images representing respective pieces of content relevant to a piece of content represented by the one of the images is displayed on the screen.

According to the arrangement, the operation is similar to an action of opening a flap of a place in which an image corresponding to a piece of content is placed, taking out pieces of content relevant to the piece of content, and viewing the pieces of content as a list. For example, the operation is similar to an action of opening a flap of a magazine rack, taking out back numbers stored in the magazine rack, and viewing the back numbers as a list. Therefore, the operation is easy to understand for a user.

The content display device of the present invention is preferably arranged such that the pieces of content are electronic books and the plurality of images are thumbnail images of the electronic books.

[Second Embodiment]

The following description will discuss, with reference to FIGS. 14 to 28, a second embodiment of a content display device in accordance with the present invention.

According to the present embodiment, the content display device is configured to display, on a screen, a part of a bookshelf object in the shape of a rectangular parallelepiped. The bookshelf object has four shelf faces, and is placed in a virtual three-dimensional space. On each of the shelf faces of the bookshelf object, thumbnail images of a plurality of electronic books (pieces of content) are arranged. A user selects, on a display screen, a thumbnail image corresponding to an electronic book that the user wants to read, thereby the contents of the electronic book are displayed on the display screen. In this way, the user can view the electronic books. Specific configurations of the content display device are described later.

[Bookshelf Object]

First, the following description discusses a bookshelf object (three-dimensional object) to be displayed on the screen of the content display device.

Figure 14:
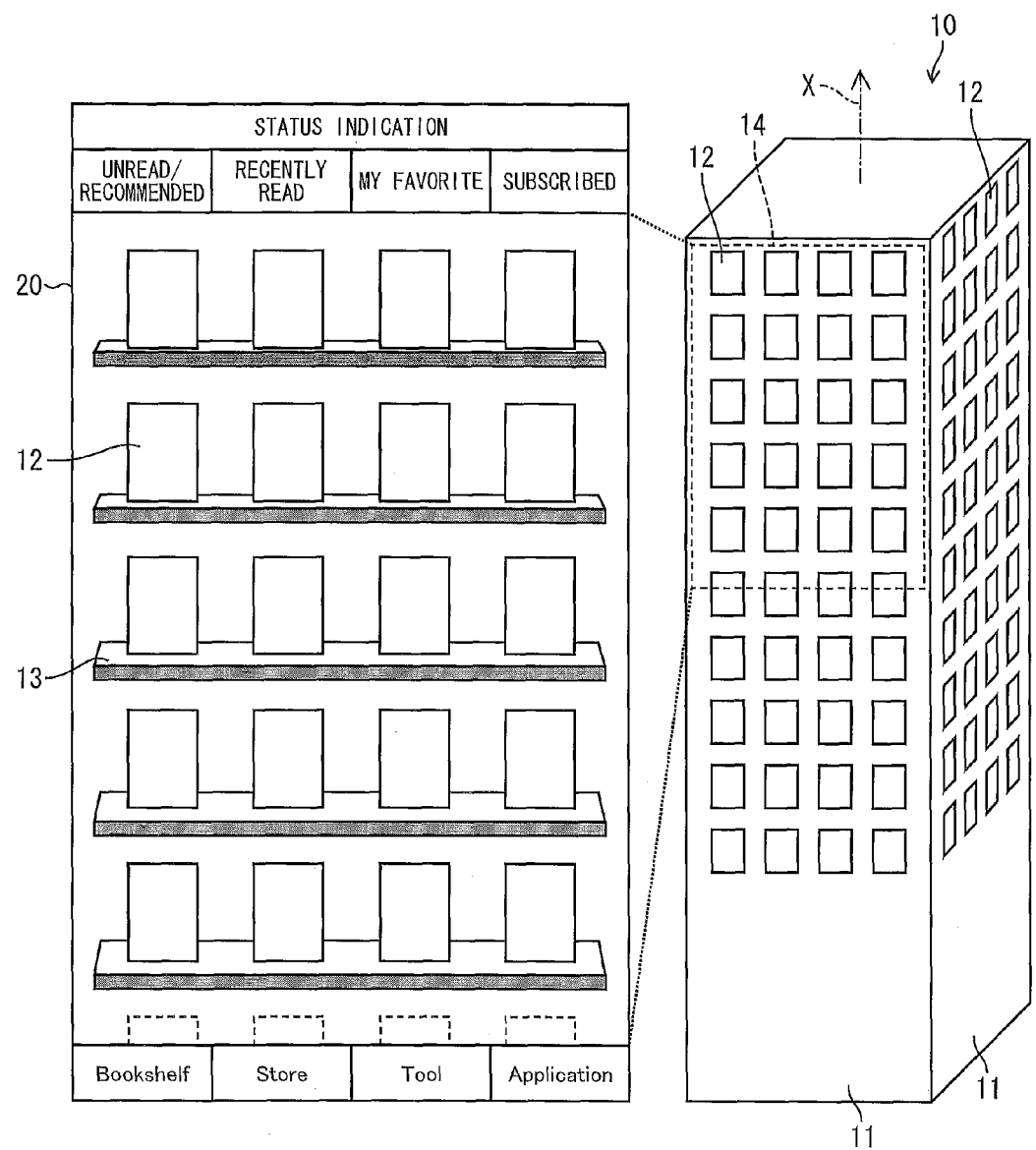
FIG. 14 is a view showing (i) a bookshelf object in the shape of a rectangular parallelepiped having four shelf faces and (ii) a screen, of a content display device, which displays thereon a part of the bookshelf object.

FIG. 14 is a view showing (i) a bookshelf object in the shape of a rectangular parallelepiped having four shelf faces and (ii) a screen, of a content display device, which displays thereon a part of the bookshelf object. The right-hand part of FIG. 14 shows a bookshelf object 10, and the left-hand part of FIG. 14 shows a screen 20 of the content display device on which a part of the bookshelf object 10 is displayed. In FIG. 14, a region enclosed by a dotted line, which region is part of the bookshelf object 10, is a region 14 which is actually displayed on the screen 20.

As shown in FIG. 14, the bookshelf object 10 has four shelf faces 11. Each of the shelf faces 11 is provided with a plurality of shelves. On each of the plurality of shelves, thumbnail images 12 of a plurality of electronic books (pieces of content) are displayed as if they are placed on a shelf. A user carries out an operation on the display screen to select any of the thumbnail images, thereby the user can view an electronic book corresponding to a selected thumbnail image. The four shelf faces 11 are assigned respectively different categories. On each of the shelf faces, thumbnail images 12 of electronic books that belong to a category assigned to that shelf face are arranged. The categories to be assigned are not limited. In the present embodiment, categories are divided into the following four categories: "Unread/Recommended", "Recently read", "My favorite" and "Subscribed", and the four categories are assigned to the respective four shelf faces 11. Although the bookshelf object 10 of the present embodiment is constituted by the four shelf faces, this does not imply any limitation. The bookshelf object 10 can have more shelf facets) depending on the number of categories.

There are no particular limitations on the number of shelves 13 on each of the shelf faces 11 and the number of thumbnail images 12 to be displayed on each of the shelves 13. These numbers can be set by a manufacturer as appropriate depending on the performance of the content display device. In the preset embodiment, each of the shelf faces 11 has five shelves 13. On each of the shelves 13, four thumbnail images 12 can be displayed.

The thumbnail images 12 to be displayed on each of the shelves 13, i.e., electronic books to be arranged on each of the shelf faces 11, can be changed as needed by operation by a user.

[Displaying Bookshelf Object]

The following description discusses how to display the bookshelf object 10 on the screen 20 of the content display device.

The bookshelf object 10 can be displayed in either of the following two different display modes: a standard mode and an active mode. Either in the standard mode or in the active mode, the screen 20 displays the bookshelf object 10 as viewed from a virtual viewpoint in a direction orthogonal to a central axis in a longitudinal direction of the bookshelf object 10. In this Description, a face facing this virtual viewpoint is referred to as a front face. Accordingly, the front face of the bookshelf object 10 is to be displayed on the screen 20 of the content display device. When a different region of the bookshelf object 10 is to be displayed on the screen 20, the virtual viewpoint is not moved; instead the bookshelf 10 is rotated or the shelf faces 11 of the bookshelf object 10 are moved without moving the virtual viewpoint (this is described later in detail). This causes a different region to be seen from the virtual viewpoint, thereby the position of the region 14 to be displayed on the screen 20 is changed.

The standard mode is a mode in which, while no operation is carried out, only a front shelf face 11 is displayed and shelf faces 11 adjacent to the front shelf face 11 thus displayed and borders between these shelf faces (sides of the rectangular parallelepiped) are not displayed. While no operation is carried out with respect to the bookshelf object 10, only the shelves 13 and the thumbnail images 12 are displayed on the screen 20 among the constituents of the bookshelf object 10.

On the other hand, the active mode is a mode in which, while no operation is carried out, a front shelf face 11 and shelf faces 11 adjacent to the front shelf face 11 are displayed together. In the active mode, the bookshelf object 10 is displayed as if it is viewed from a longer distance than in the standard mode. In the active mode, opacity of each of the shelf faces 11 is decreased so that shelf faces 11 on the right and left sides of the front shelf face 11 and thumbnail images on the shelf faces 11 on the right and left sides are displayed. In the active mode, a user can more intuitively know that the bookshelf object 10 is a rectangular parallelepiped placed in a virtual three-dimensional space.

The standard mode and the active mode can be switched by an input operation by a user.

The following description discusses a display screen in the standard mode.

Figure 15:
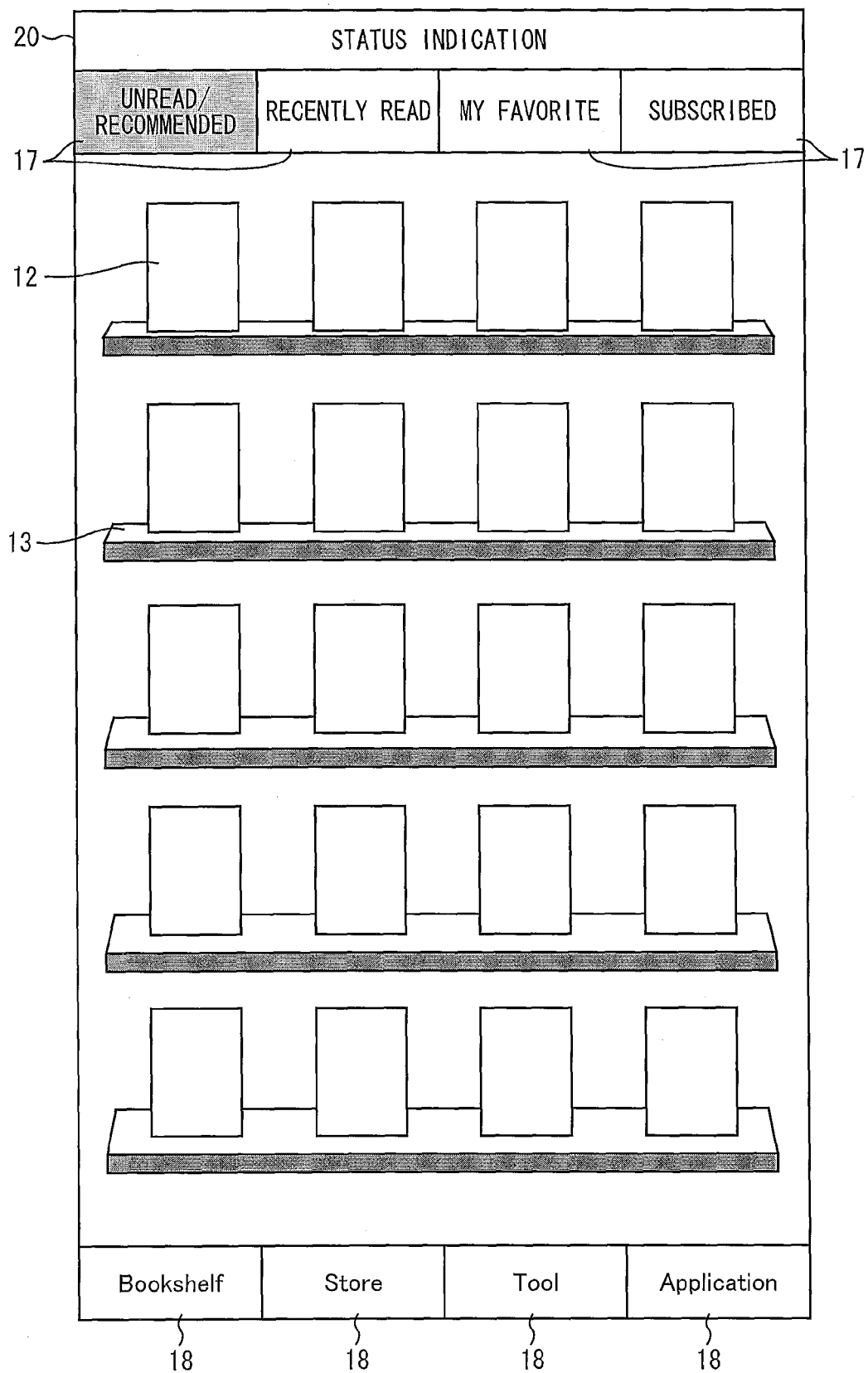
FIG. 15 is a view showing a screen in a standard mode in the content display device.

FIG. 15 is a view showing what is displayed on the screen 20 in the standard mode.

As shown in FIG. 15, shelves 13 and thumbnail images 12 of books are displayed on the screen 20 as if the thumbnail images 12 are placed on the shelves 13. At the top of the screen 20, there are indicators which indicate categories of the respective shelf faces 11 of the bookshelf object 10. The way in which the indicators a re displayed allows a user to recognize the category of a currently-displayed shelf face 11. For example, in FIG. 15, an indicator of "Unread/Recommended" is illuminated. This means that a shelf face 11 that belongs to the "Unread/Recommended" is selected and displayed. It should be noted that the indicators also serve as shelf face selecting buttons 17 (described later). Furthermore, at the bottom of the screen 20, operation input buttons 18 for carrying out the functions of the content display device are displayed.

Note that, in a case where a thumbnail image(s) 12 is/are split at the end of the region 14 to be displayed on the screen 20 as shown in FIG. 14, the split thumbnail image(s) 12 is/are not displayed on the screen 20. Therefore, the thumbnail images 12 on the display screen are all displayed in their entirety.

In the standard mode, a front shelf face 11 is displayed as if it is viewed from slightly above. Therefore, top surfaces of the shelves 13 on the front shelf face 11 are displayed on the screen 20. The top surfaces of the shelves 13 displayed on the screen 20 increase in size from top to bottom of the screen 20.

FIG. 15 shows the thumbnail images 12 arranged along longitudinal and lateral directions of the shelf face 11. This is how a shelf face that corresponds to the category "Unread/Recommended", "Recently read" or "My favorite" is displayed.

Figure 16:
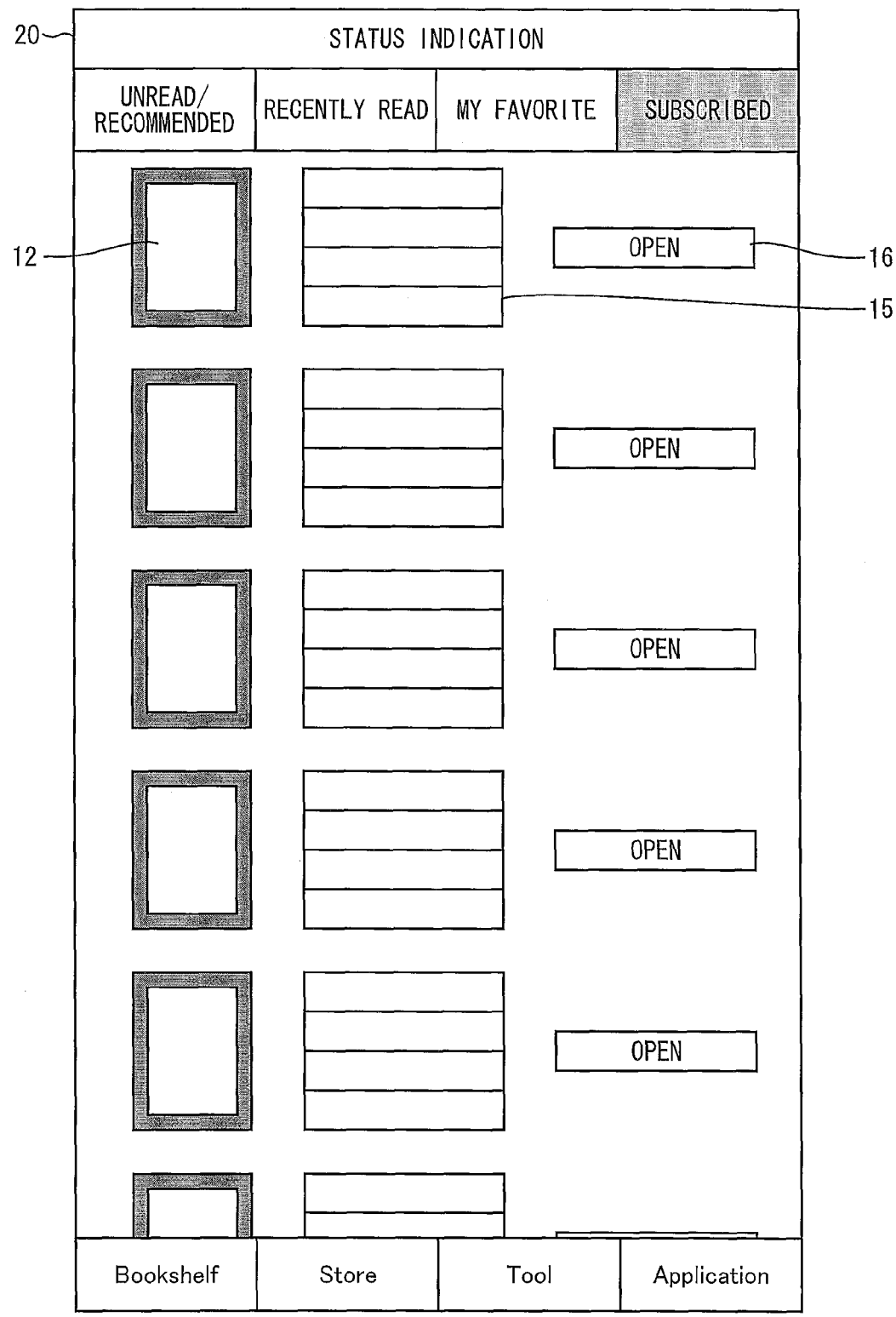
FIG. 16 is a view showing a screen, which displays a shelf face that corresponds to a category "Subscribed".
Figure 17:
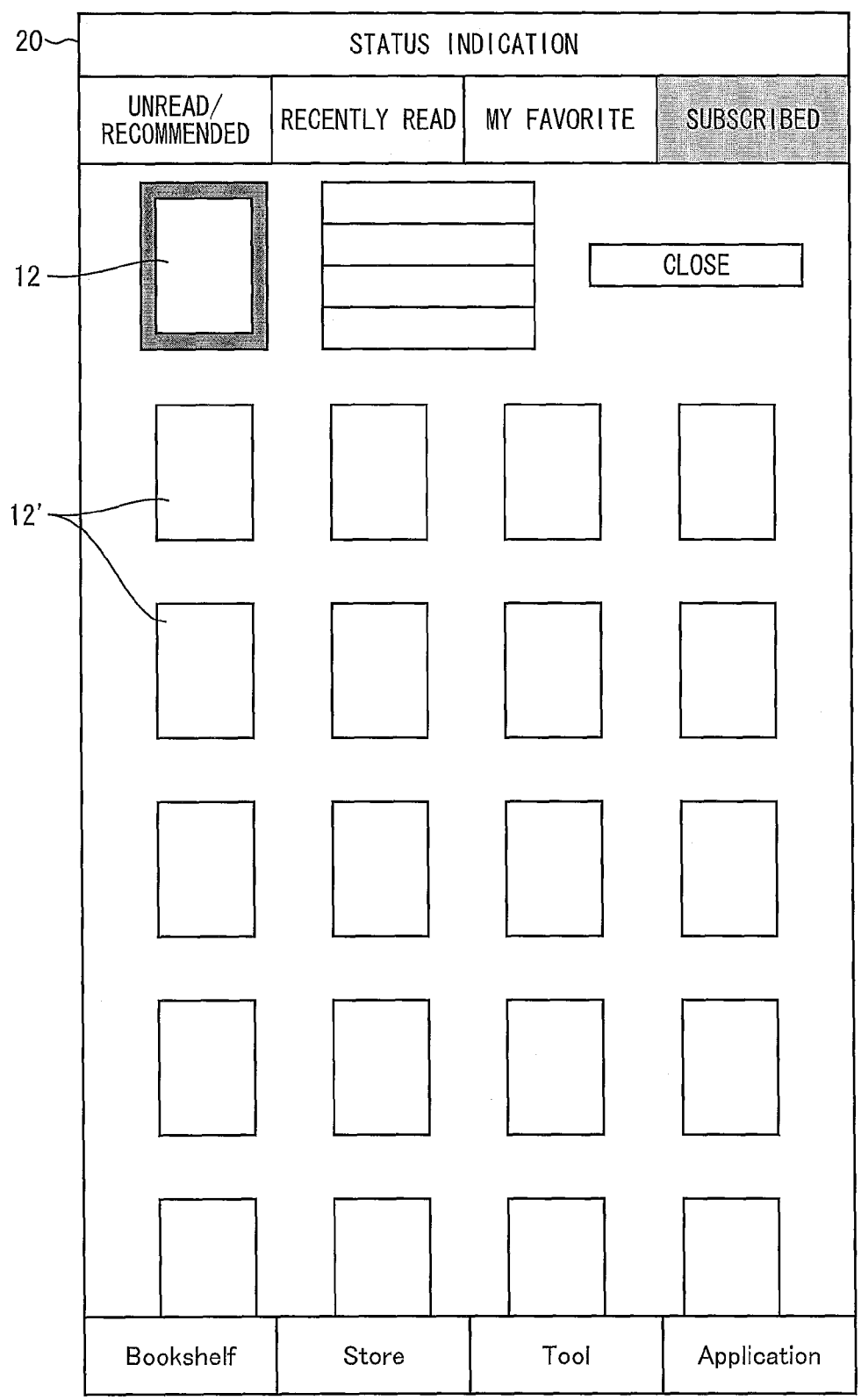
FIG. 17 is a view showing a screen which displays back numbers of a certain subscribed journal.

The following description discusses, with reference to FIG. 16 and FIG. 17, how a shelf face 11 that corresponds to the category "Subscribed" is displayed.

FIG. 16 is a view illustrating the screen 20, which displays the shelf face 11 that corresponds to the category "Subscribed" in the standard mode. As shown in FIG. 16, the subscribed shelf face 11 has a column of thumbnail images 12 arranged in a lengthwise direction on the left side of the shelf face 11. This is different from how they are arranged in FIG. 15. These thumbnail images 12 are thumbnail images 12 of the current numbers of subscribed magazines as if the latest issues were placed in a magazine rack. Displayed beside each of the thumbnail images 12 is a text display of information 15 on the corresponding subscribed magazine, such as the title of the magazine and the number of the latest issue. Provided beside the information 15 is a select button 16 for displaying back numbers of the magazine.

FIG. 17 is a view illustrating the screen 20, which displays back numbers of a certain subscribed journal. When an input operation is carried out with respect to the select button 16 for displaying back numbers, a transition to a state occurs in which (i) a selected magazine rack moves so as to be displayed at the top of the screen 20 and (ii) thumbnail images 12' of the respective back numbers of the journal are arranged so as to be displayed in list view.

The following description discusses how to change the contents displayed on the screen by moving the bookshelf object 10 or shelf faces of the bookshelf object 10 in a virtual three-dimensional space.

(Rotating Bookshelf Object)

The following description discusses how shelf faces to be displayed on the screen 20 are changed by rotating, in a virtual three-dimensional space in the display screen, the bookshelf object 10 on a central axis X (rotary axis, see FIG. 14) which extends along a longitudinal direction of the rectangular parallelepiped.

It is possible to rotate, by input operation by a user, the bookshelf object 10 on the central axis X in the virtual three-dimensional space in the screen 20. By rotating the bookshelf object 10, it is possible to bring a different shelf face 11 to the front, and thus possible to display the different shelf face 11 on the screen 20. Alternatively, by stopping the rotation in the middle of it, it is possible to view a plurality of shelf faces 11 at the same time.

According to the present embodiment, the bookshelf object 10 is rotated by a flicking operation which is carried out, on a touch panel on the display screen, in a direction substantially orthogonal to the rotary axis. Specifically, by the flicking operation, the bookshelf object 10 is rotated in the same direction as that of the flicking operation, so that an adjacent shelf face 11 or a shelf face 11 next to the adjacent shelf face 11 comes to the front and is displayed on the screen 20. Note, here, that the flicking operation is made by a gesture such that a user's finger touches the touch panel and then quickly flicks the touch panel in a desired direction.

Figure 18:
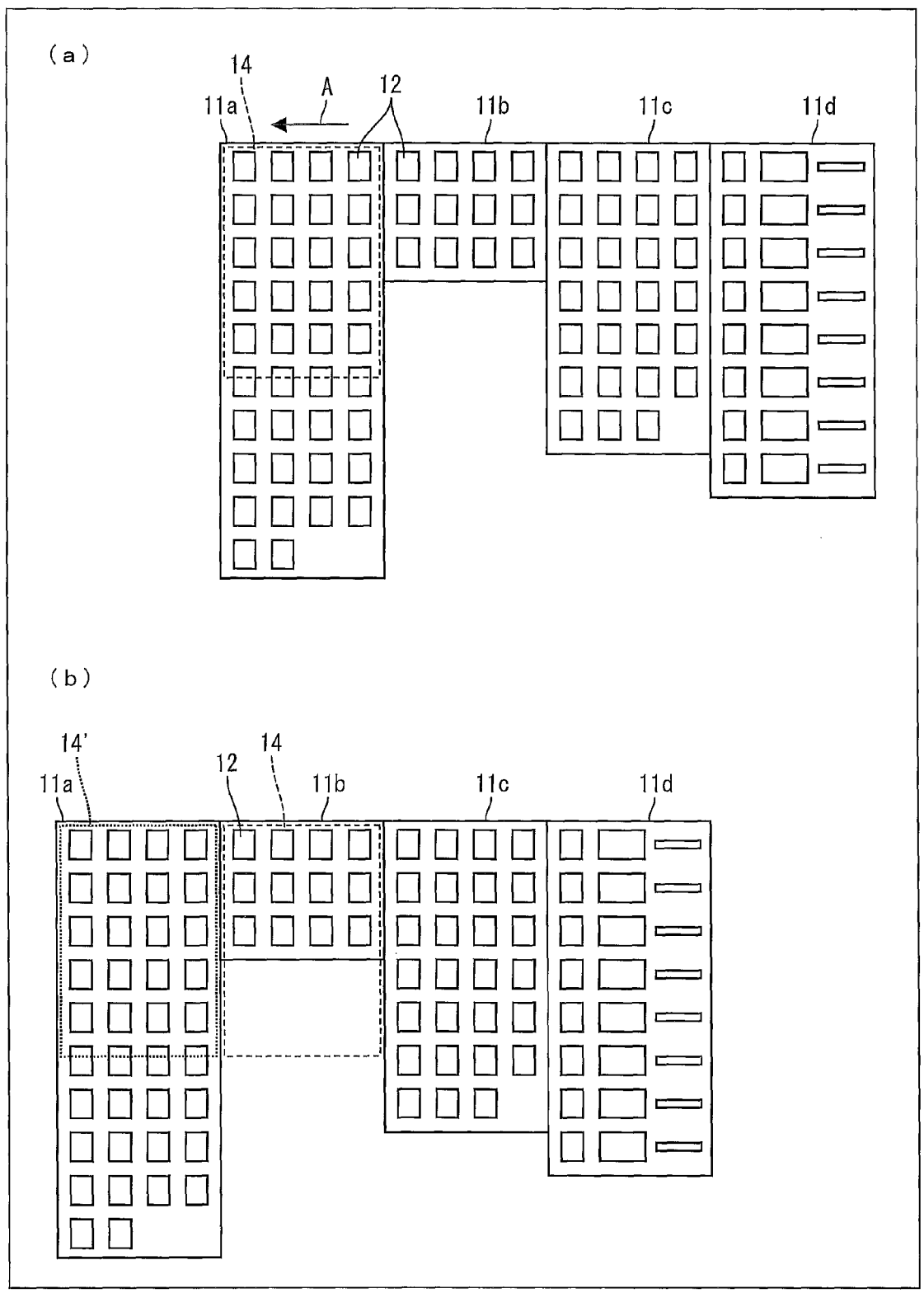
FIG. 18 is an exploded view, for the description purposes, illustrating shelf faces of the bookshelf object.

FIG. 18 is an exploded view, for the description purposes, illustrating the shelf faces 11 of the bookshelf object 10. A region 14 enclosed by a dotted line is actually displayed on the screen 20. (a) of FIG. 18 shows the display region before the rotation. That is, a shelf face 11a, which corresponds to the category "Unread/Recommended", is on the front side and is displayed on the screen 20. In this situation, if it is desired to display a shelf face 11b which is adjacent to the shelf face 11a and corresponds to the category "Recently read", a flicking operation is carried out in a direction toward a side of the shelf face 11a which side is opposite to the shelf face 11b (i.e., a direction indicated by arrow A in FIG. 18). This brings the shelf face 11b to the front, and the shelf face 11b is displayed on the screen (see (b) of FIG. 18). The rotation does not involve upward/downward movement. Therefore, in the exploded view, the region 14 displayed on the screen 20 is shifted just laterally relative to a region 14'.

It should be noted that whether a flicking operation causes the adjacent shelf face 11 to be displayed or the shelf face 11 next to the adjacent shelf face 11 to be displayed depends on the speed of the flicking operation. For example, in a case where the flicking operation is carried out slowly, the adjacent shelf face 11 is displayed (rotate by one face), whereas, in a case where the flick operation is carried out quickly, the shelf face 11 next to the adjacent shelf face 11, i.e., a shelf face 11 opposite to the shelf face 11 which is displayed before the rotation, is displayed (rotate by two faces). What speed of flicking operation causes which shelf face 11 to be displayed can be determined by a manufacturer as appropriate.

It is also possible to rotate the bookshelf object 10 by carrying out, on the touch panel, a dragging operation in a direction substantially orthogonal to the rotary axis. Specifically, by the dragging operation, the bookshelf object 10 rotates in the same direction as that of the dragging operation, so that an adjacent shelf face 11 comes to the front and is displayed. Note here that the dragging operation is made by a gesture such that a user's finger touches the touch panel and moves in a desired direction while in contact with the touch panel. By rotating the bookshelf object 10 by a dragging operation and releasing a finger from the touch panel when a desired shelf face 11 has substantially come to the front, it is possible to display a different shelf face 11. According to the present embodiment, when a dragging operation for displaying the adjacent shelf face 11 is stopped in the middle of it, whether the rotation is to be continued further or is to be canceled is determined depending on a rotation angle at the time when the dragging operation is stopped, and either of the currently displayed shelf face 11 or the adjacent shelf face 11 is displayed. Until the finger is released from the touch panel, the rotational movement follows the movement of the finger. Accordingly, by rotating the bookshelf object 10 a little by a dragging operation and keeping the finger in contact with the touch panel, it is possible to keep a state in which the adjacent shelf face 11 is partly displayed.

A displayed shelf face 11 can be changed not only by the above methods, but also by pressing a shelf face selecting button 17 which allows direct selection of a shelf face 11 to be displayed. The shelf face selecting button 17 is displayed as an object on the screen, and is to be selected by an operation via a touch panel. Also in this case, the rotation of the bookshelf object 10 is displayed on the screen until a selected shelf face is displayed. A direction in which the bookshelf object 10 rotates in this case can be determined depending on a previous operation by a user, previous rotation angle, setting by a manufacturer and/or the like.

Since each of the shelf faces includes a book(s) of a predetermined category and a user can move to a desired shelf face by rotating the bookshelf, this configuration is very user-friendly. As such, the user can easily access a desired book.

[Upward/Downward Scrolling of Shelf Face]

By moving a certain shelf face 11 of the bookshelf object 10 in the longitudinal direction of the rectangular parallelepiped in the virtual three-dimensional space in the display screen, a different region of a currently displayed shelf face is displayed. The following description discusses how this is carried out.

The length of each of the shelf faces 11 in the longitudinal direction (hereinafter referred to as an upward/downward direction) of the bookshelf object 10 is greater than a length that can be displayed at one time on the screen of the content display device. Therefore, regarding a shelf face 11 displayed on the screen, only part of the shelf face 11 is actually displayed (see FIG. 14). In the case of FIG. 14, the region 14 enclosed by a dotted line is actually displayed on the screen 20. Therefore, the other part of the shelf face 11 is not displayed on the screen. In view of this, the content display device is configured such that, by moving the shelf face 11 displayed on the screen 20 in the upward/downward direction, the position of the region 14 to be displayed on the screen 20 is changed so that a region which was not displayed is displayed on the screen 20. The shelf face 11 can be moved in the upward/downward direction by input operation by a user.

According to the present embodiment, by carrying out a scrolling operation on the touch panel in a desired direction, a shelf face is moved in the same direction as that of the scrolling operation and a region which was not displayed is displayed. The scrolling operation is for example a flicking operation in the upward/downward direction or a dragging operation in the upward/downward direction. In a case where the flicking operation is carried out, to what extent the shelf face is to be moved is determined depending on the speed of the flicking operation, and the shelf face is moved according to the determination. What speed of flicking operation causes what degree of movement of a shelf face can be determined as appropriate by a manufacturer. In a case where a dragging operation is carried out, the movement of the shelf face follows the dragging operation, and the shelf face stops moving when a finger is released from the touch panel.

Figure 19:
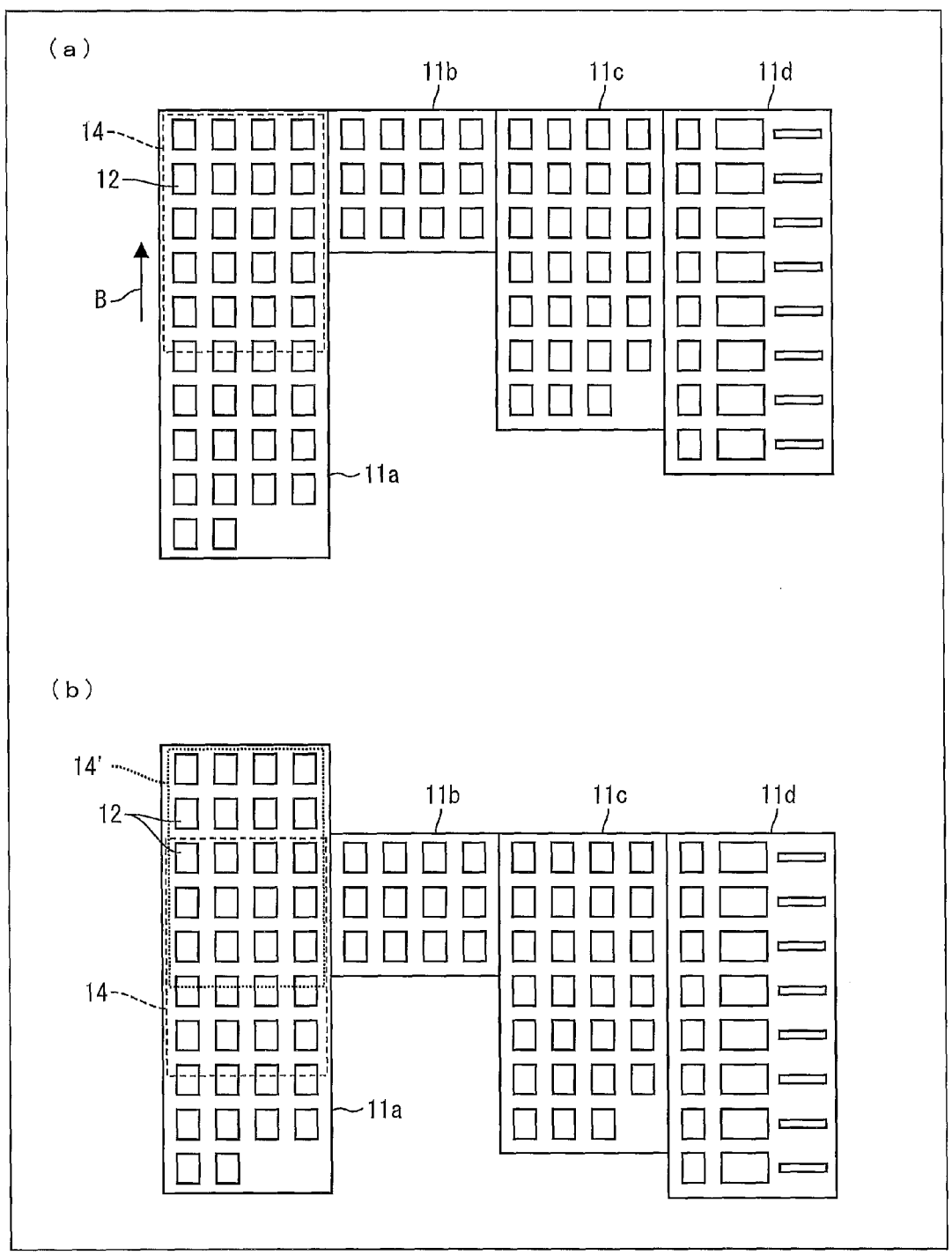
FIG. 19 is an exploded view, for the description purposes, illustrating shelf faces of the bookshelf object.

FIG. 19 is an exploded view, for the description purposes, illustrating the shelf faces 11 of the bookshelf object 10. A region 14 enclosed by a dotted line is actually displayed on the screen 20. (a) of FIG. 19 shows a state before a scrolling operation is carried out, in which state the uppermost part of the shelf face 11a is displayed. In a case where it is desired to display a lower part of the shelf face 11a, a scrolling operation is carried out upward (in the direction indicated by arrow B in FIG. 19) with respect to the shelf face 11a. This causes the shelf face 11a to move upward. As a result, the position of the region 14 displayed on the screen 20 moves downward relative to a region 14' which was displayed before the movement (see (b) of FIG. 19).

It should be noted that the movement in the upward/downward direction of each of the shelf faces 11 is controlled independently of the other shelf faces 11. That is, when a scrolling operation is carried out in the upward/downward direction, only a shelf face 11 that is on the front side and displayed on the screen 20 at that time is moved in the upward/downward direction. For example, assume that, under a condition where an uppermost part of the shelf face 11a, 11b, 11c or 11d is to be displayed when display of that shelf face is carried out (see (a) of FIG. 19), a scrolling operation is carried out with respect to the shelf face 11a to cause the shelf face 11a to move upward and thereby a display region of the shelf face 11a moves to a lower part of the shelf face 11a. In this case, only the shelf face 11a of the shelf faces 11 is moved upward, and the other shelf faces 11b to 11d are not moved in the upward/downward direction (see (b) of FIG. 19). Therefore, if a rotation operation is carried out here with respect to the bookshelf object 10 to display any of the other shelf faces 11b to 11d, the uppermost part of that shelf face is displayed as before. As such, even in a case where the shelf face 11a is moved in the upward/downward direction by a scrolling operation, the other shelf faces 11b to 11d remain unchanged from the last time they were viewed.

For example, assume that, under a condition where the uppermost part of the shelf face 11c corresponding to the category "My favorite" is displayed, a user (i) rotates the bookshelf object 10 to move to the shelf face 11a corresponding to the category "Unread/Recommended" and (ii) carries out a scrolling operation to thereby display a lower part of the shelf face 11a. Here, when the user rotates the bookshelf object 10 again to move back to the shelf face 11c, if a lower part of the shelf face 11c is displayed in the same manner as the shelf face 11a, the user has to carry out a scrolling operation again to cause the uppermost part of the shelf face 11c to be displayed. This is not user-friendly. In this regard, according to the content display device of the present embodiment, when a user rotates the bookshelf object 10 again and goes back to the shelf face 11c, the shelf face 11c is displayed as it was previously viewed, i.e., the uppermost part of the shelf face 11c is displayed. Accordingly, the user does not have to carry out many operations when the shelf face 11c is displayed again.

(Displaying Enlarged/Reduced Images)

Figure 20:
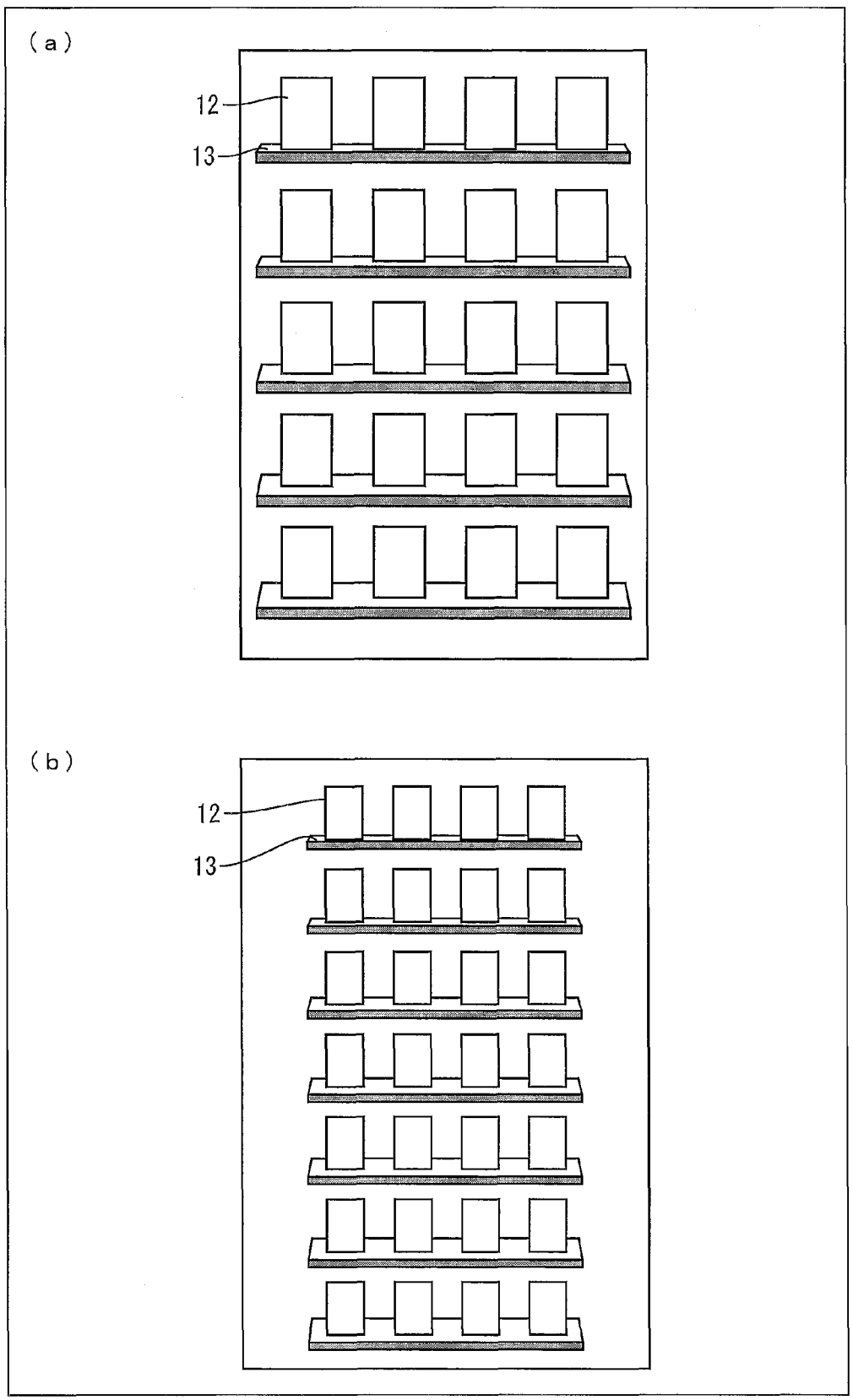
FIG. 20 is a view showing an example of how thumbnail images are displayed on the screen. (a) of FIG. 20 shows how twenty thumbnail images are displayed. (b) of FIG. 20 shows how twenty-eight thumbnail images are displayed.

The number of thumbnail images 12 to be displayed on one screen under a condition where a front shelf face 11 is displayed on the screen 20 is changeable. FIG. 20 is a view showing an example of how thumbnail images are displayed on the screen 20. (a) of FIG. 20 shows how twenty thumbnail images 12 are displayed. (b) of FIG. 20 shows how twenty-eight thumbnail images 12 are displayed. When enlarged thumbnail images 12 are displayed, each of the thumbnail images 12 is easy to view. However, the number of thumbnail images 12 that can be displayed on the screen 20 at a time (such number is related to the number of shelves 13 that can be displayed at a time) is small. On the other hand, displaying reduced thumbnail images 12 makes it possible to display many thumbnail images 12 at a time.

The number of thumbnail images 12 to be displayed on the screen 20 can be changed by input operation by a user. Specifically, a pinch-out operation on the touch panel enlarges a displayed shelf face 11 so that displayed thumbnail images 12 are enlarged. On the other hand, a pinch-in operation on the touch panel reduces the displayed shelf face 11 so that the displayed thumbnail images 12 are reduced. Note here that the "pinch-out operation" is made by a gesture such that two fingers of a user etc. simultaneously touch an operation surface and the two fingers open while in contact with the operation surface. Further, the "pinch-in operation" is made by a gesture such that two fingers of a user etc. simultaneously touch the operation surface and the two fingers close while in contact with the operation surface.

(Configuration of Content Display Device)

Figure 21:
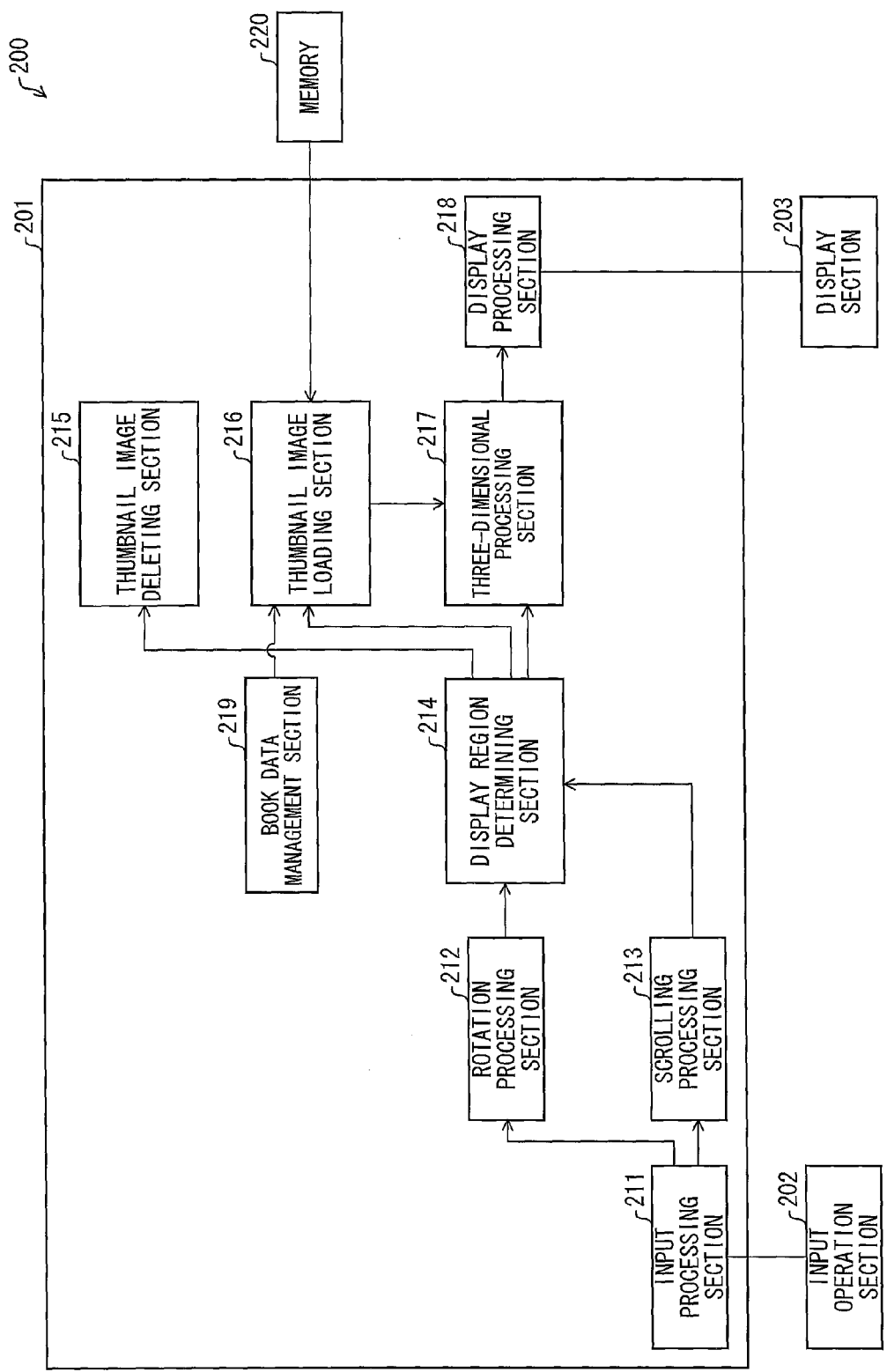
FIG. 21 is a block diagram schematically showing a configuration of the content display device of the present embodiment.

The following description discusses, with reference to FIG. 21, a configuration of a content display device 200 which displays a bookshelf object by the foregoing methods. FIG. 21 is a block diagram schematically showing a configuration of the content display device 200.

The content display device 200 includes a processing section 201, an input operation section 202, a display section 203 and a memory 220. These constituents work together to realize a process for displaying a bookshelf object.

The processing section 201 is means for displaying a bookshelf object 10 etc. on the display section 203 by executing a program(s) stored in the memory 220. The processing section 201 is constituted by a CPU (central processing unit), a GPU (graphics processing unit), and the like.

The input operation section 202 is means for outputting signals upon receiving operations from a user. In the present embodiment, the input operation section 202 is constituted by a touch panel. It should be noted that this does not imply any limitation on the present invention. The input operation section 202 can be constituted by a mouse, a keyboard or a button for operation etc.

The display section 203 is means for visually outputting an electronic book or a thumbnail image etc. The display section 203 is constituted by for example a display device such as an LCD (liquid crystal display).

The memory 220 is a recording medium in which thumbnail images of a plurality of electronic books etc. are to be stored. The memory 220 stores therein not only content but also a program(s) to be executed by the processing section 201.

Specifically, the processing section 201 includes an input processing section 211, a rotation processing section 212, a scrolling processing section 213, a display region determining section (determining means) 214, a thumbnail image deleting section (deleting means) 215, a thumbnail image loading section (image reading means) 216, a three-dimensional processing section 217, a display processing section (display control means) 218, and a book data management section 219.

The input processing section 211 receives an input signal from the input operation section 202, and, according to the input signal, sends user's operation information corresponding to the input signal to the rotation processing section 212 or to the scrolling processing section 213. For example, the input processing section 211 sends (i) operation information indicative of a rotating process such as horizontal dragging or horizontal flicking to the rotation processing section 212 and (ii) operation information indicative of a scrolling process such as upward/downward dragging or upward/downward flicking to the scrolling processing section 213.

The rotation processing section 212 receives the operation information, and, on the basis of the operation information, determines the amount of rotation corresponding to the amount of the operation by the user.

The scrolling processing section 213 receives the operation information, and, on the basis of the operation information, determines the amount of upward/downward scrolling corresponding to the amount of the operation by the user.

The display region determining section 214 determines, depending on the amount of rotation determined by the rotation processing section 212 or depending on the amount of scrolling determined by the scrolling processing section 213, which region of the bookshelf object 10 is to be displayed on the screen 20 (such a region is hereinafter referred to as a display region). Furthermore, the display region determining section 214 determines, depending on the position of a display region thus determined, priorities assigned to thumbnail images on the bookshelf object 10 (this is described later in detail). It should be noted that the priorities of the thumbnail images means priorities as to which thumbnail images are to be stored (to be loaded/to be retained after the loading) in a cache 221. A thumbnail image with the highest priority is an image to be loaded, whereas a thumbnail image with the lowest priority is an image to be deleted.

The thumbnail image deleting section 215 carries out a process for deleting (releasing), from the cache, a thumbnail image that is an image to be deleted.

The thumbnail image loading section 216 loads from the memory 220 a thumbnail image that is an image to be loaded, and sends the thumbnail image to the three-dimensional processing section 217. The thumbnail image loading section 216 further transfers the thumbnail image to the cache and causes the thumbnail image to be stored in the cache. The thumbnail image loading section 216 desirably constitutes a part of the CPU.

The three-dimensional processing section 217 carries out, in order to draw a thumbnail image, a series of graphics processings such as coordinate transformation, clipping, and texture mapping. The three-dimensional processing section 217 desirably constitutes a part of the GPU.

The display processing section 218 writes, to a frame buffer, pieces of drawing data that have been subjected to the graphics processings, and thereafter sequentially reads out the pieces of drawing data and transmits them to the display section 203 such as a display.

The book data management section 219 collectively manages data related to books, such as book IDs.

Besides the above constituents, the content display device 200 includes the cache 221 and a stack 222 between the thumbnail image loading section 216 and the three-dimensional processing section 217 (the cache 221 and the stack 222 are not illustrated in FIG. 21). The cache 221 is a small-capacity, high-speed storage region as compared to the memory 220. The cache 221 is desirably provided in the GPU. The stack 222 is a pushdown storage region that stores therein book IDs to be loaded. The stack 222 can be provided either inside or outside the CPU.

(Process for Displaying Bookshelf Object)

The following description discusses a process carried out by the content display device 200, which process is for displaying a bookshelf object.

It should be noted that, as to a method of displaying a bookshelf object on the content display device 200, those skilled in the art who have understood the foregoing descriptions can realize display of a bookshelf object 10 and of each shelf face 11, rotation of the bookshelf object 10 and display of the rotation, movement of a shelf face 11 by scrolling and display of the movement, and the like, by employing a known technique such as OpenGL (Open Graphics Library). Therefore, descriptions of specifically how data are processed and managed by each processing section and each management section for realizing these displays are omitted here.

Therefore, the following description mainly discusses how the content display device 200 reads (loads), when displaying a display region of the bookshelf object 10, a thumbnail image from the memory 220 in order to display the thumbnail image to be placed in the display region. Note here that the "load" means a process of transferring a thumbnail image from the memory 220 to the cache 221 of the GPU. The thumbnail image thus transferred to the cache 221 is usable in OpenGL.

For example, the content display device 200 checks, when having determined a display region of the bookshelf object 10, whether a thumbnail image to be placed on that display region (i.e., a thumbnail image to be displayed on the screen 20) is stored in the cache 221. If it is determined that the thumbnail image to be displayed is already stored in the cache 221, loading from the memory 220 is not carried out and the thumbnail image in the cache 221 is transferred. On the other hand, if it is determined that the thumbnail image to be displayed is not stored in the cache 221, the thumbnail image has to be loaded from the memory 220.

Note here that the cache 221 is a high-speed, small-capacity memory, and thus is able to transfer data to the processing section 201 at high speed. That is, if a thumbnail image to be displayed is stored in the cache 221, data is exchanged between the processing section 201 and the cache 221 at high speed, and a process for displaying a bookshelf object is carried out quickly.

Note, however, that there is a limitation on the number of thumbnail images that can be stored in the cache 221. Therefore, if pieces of content stored in the memory 220 are of high image quality or the number of the pieces of content is large, it is difficult to store the thumbnail images of all the pieces of content in the cache 221. In view of this, according to the content display device 200 in accordance with the present embodiment, at a time when a display region of the bookshelf object 10 is determined, priorities for storing to the cache 221 are assigned to thumbnail images depending on the structure of the bookshelf object 10.

(Priorities of Thumbnail Images)

Figure 22:
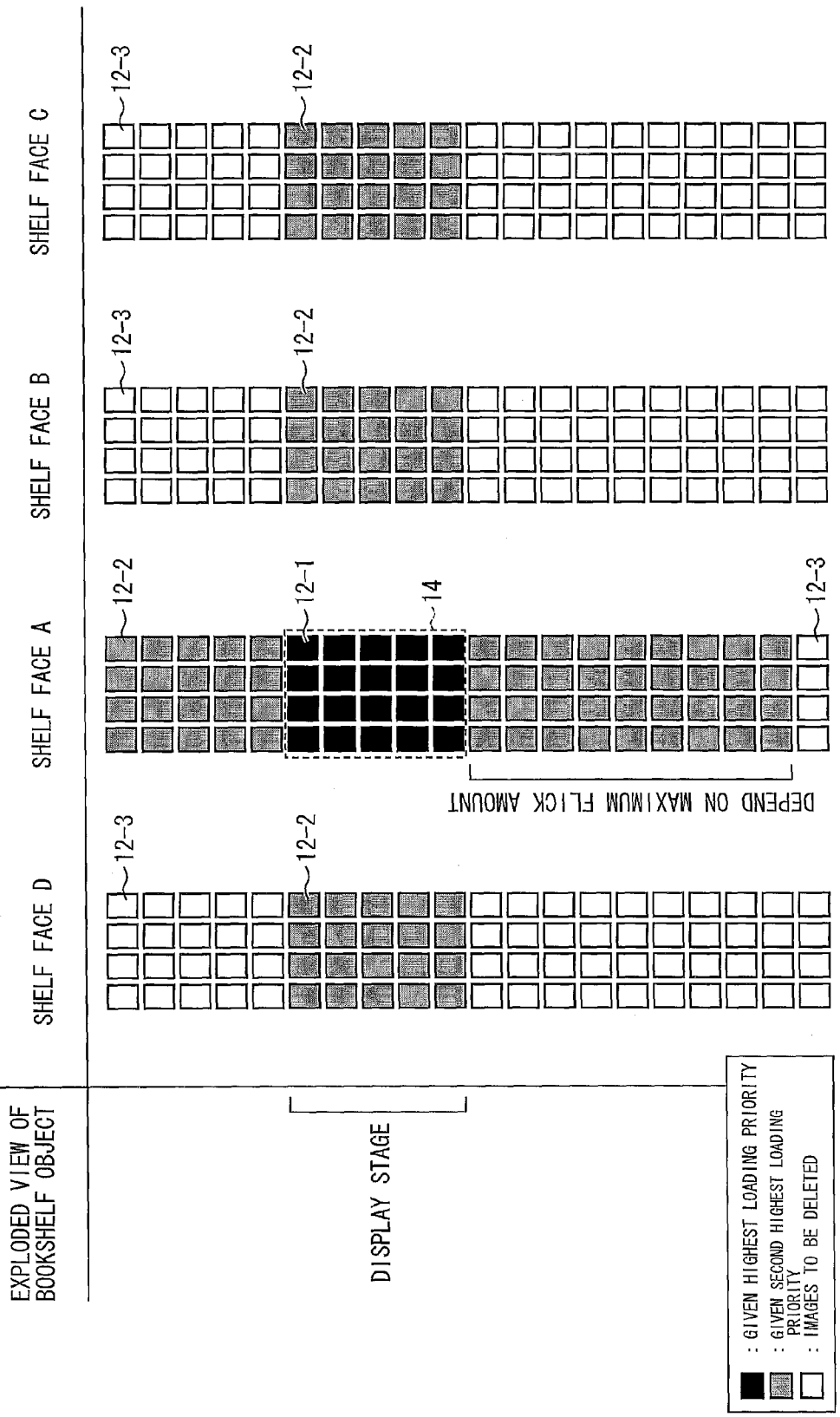
FIG. 22 is a development view, for the description purposes, of the shelf faces of the bookshelf object, which view shows priorities of thumbnail images.
Figure 23:
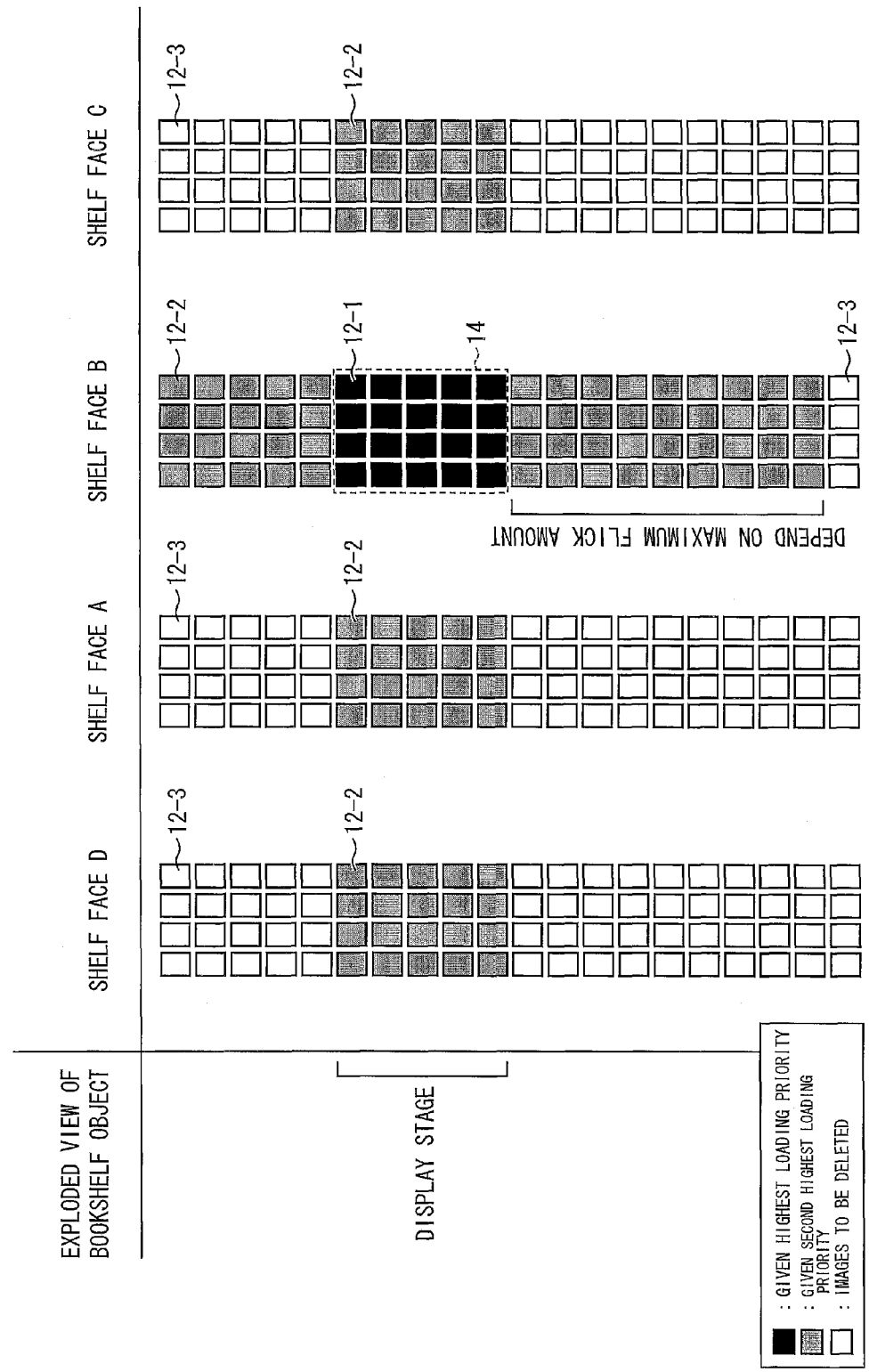
FIG. 23 is a development view, for the description purposes, of the shelf faces of the bookshelf object, which view shows priorities of thumbnail images.
Figure 24:
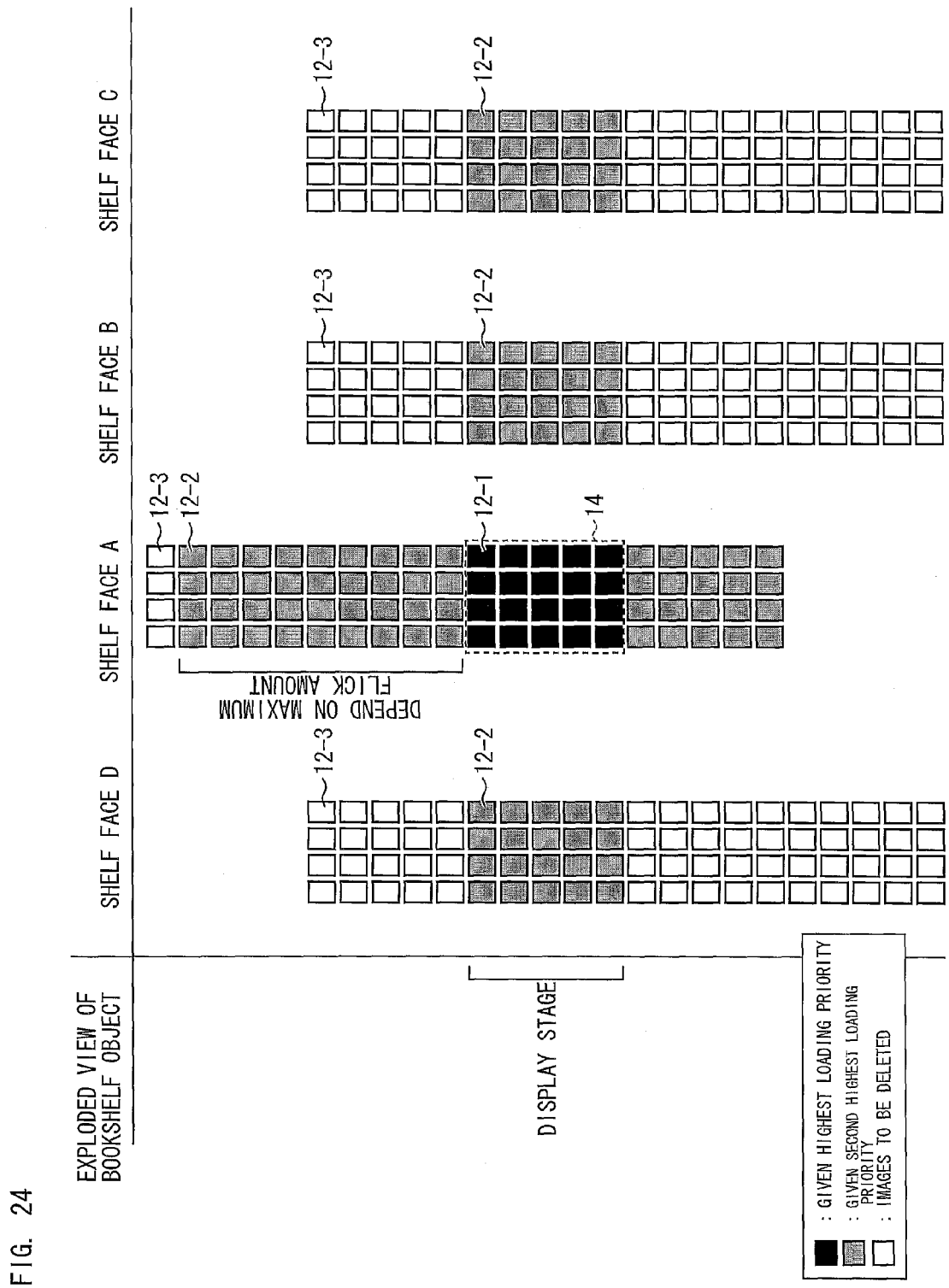
FIG. 24 is a development view, for the description purposes, of the shelf faces of the bookshelf object, which view shows priorities of thumbnail images.

The following description deals with priorities of thumbnail images which are to be stored in the cache 221, with reference to FIGS. 22 through 24. Each of FIGS. 22 through 24 is an exploded view of the bookshelf object 10. In the following description, the priorities as to which thumbnail images are to be stored (to be loaded/to be retained after the loading) are merely referred to as "priorities of thumbnail images". Further, the four shelf faces of the bookshelf object 10 are referred to as "shelf face A", "shelf face B", "shelf face C", and "shelf face D", respectively. For convenience of description, a large number of arbitrary thumbnail images are arranged on each of the shelf faces A through D such that the large number of arbitrary thumbnail images are similarly arranged, irrespective of what category each of the large number of arbitrary thumbnail images belongs to.

First, the following description deals with priorities of thumbnail images at a time when the region 14 illustrated in FIG. 22 is determined as a display region, as a result of rotation of the bookshelf object 10 or upward/downward scrolling of any one of the shelf faces A through D.

In FIG. 22, (i) each of the shelf faces A though D is in a state where scrolling is carried out in an upper direction and, as a result, an uppermost part of the shelf face is not displayed, and (ii) the region 14 is positioned in the shelf face A.

As illustrated in FIG. 22, in a case where the region 14 is determined as the display region, thumbnail images 12-1 arranged in the region 14 are determined as thumbnail images given the highest priority. As a result, in a case where the thumbnail images 12-1 are not stored in the cache 221, the thumbnail images 12-1 are preferentially loaded and stored in the cache 221. Hereinafter, the thumbnail images given the highest priority are referred to also as "images to be loaded".

Further, as illustrated in FIG. 22, in a case where the region 14 is determined as the display region, thumbnail images 12-2, which are likely to be arranged in a next display region to be determined, are determined as thumbnail images given the second highest priority. The "next display region to be determined" means a display region which is to be determined if a next operation (a scrolling operation or a rotating operation) is carried out while the region 14 determined is being displayed on a screen. With respect to the thumbnail images 12-2 given the second highest priority, neither a loading operation nor a deleting operation is carried out. That is, (i) in a case where the thumbnail images 12-2 have been already stored in the cache 221, it is unnecessary to delete them, and (ii) in a case where the thumbnail images 12-2 are not stored in the cache 221, it is unnecessary to load them.

Meanwhile, as illustrated in FIG. 22, in a case where the region 14 is determined as the display region, thumbnail images 12-3, which are not at all likely to be arranged in the next display region to be determined, are determined as thumbnail images given the lowest priority. As a result, (i) in a case where the thumbnail images 12-3 have been already stored in the cache 221, the thumbnail images 12-3 are deleted from the cache 221, and (ii) in a case where the thumbnail images 12-3 are not stored in the cache 221, the thumbnail images 12-3 are kept being not loaded in the cache 221. Hereinafter, the thumbnail images given the lowest priority are referred to also as "images to be deleted".

In FIG. 22, it is preferable that the number of thumbnail images 12-2 in the shelf face A depends on a maximum scrolling amount with one flicking operation. Specifically, thumbnail images located in the following range are determined as the thumbnail images 12-2, that is, the range from (i) thumbnail images located adjacent to the current region 14 to (ii) thumbnail images which will be arranged in the next display region if the shelf face A is scrolled at a maximum scrolling amount with next one flicking operation. In this context, the thumbnail images 12-3 in the shelf face A are thumbnail images which are located farther away from the current region 14 as compared with the "next display region".

In the present embodiment, the priorities of the thumbnail images dynamically change every time the display region of the bookshelf object 10 is determined, that is, every time the bookshelf object 10 is rotated or every time any one of the shelf faces A through D is scrolled in the upward/downward direction.

For example, in a case where the bookshelf object 10 in the state illustrated in FIG. 22 is rotated, and, as a result, the display region is shifted from the shelf face A to the shelf face B, the priorities of the thumbnail images are changed to a state illustrated in FIG. 23.

Further, in a case where the shelf face A of the bookshelf object 10 in the state illustrated in FIG. 22 is scrolled, and, as a result, the display region is relatively shifted downward, the priorities of the thumbnail images are changed to a state illustrated in FIG. 24.

As described above, the priorities of the thumbnail images are determined on the basis of the structure of the bookshelf object 10.

(One Example of Process for Displaying Bookshelf Object)

Figure 25:
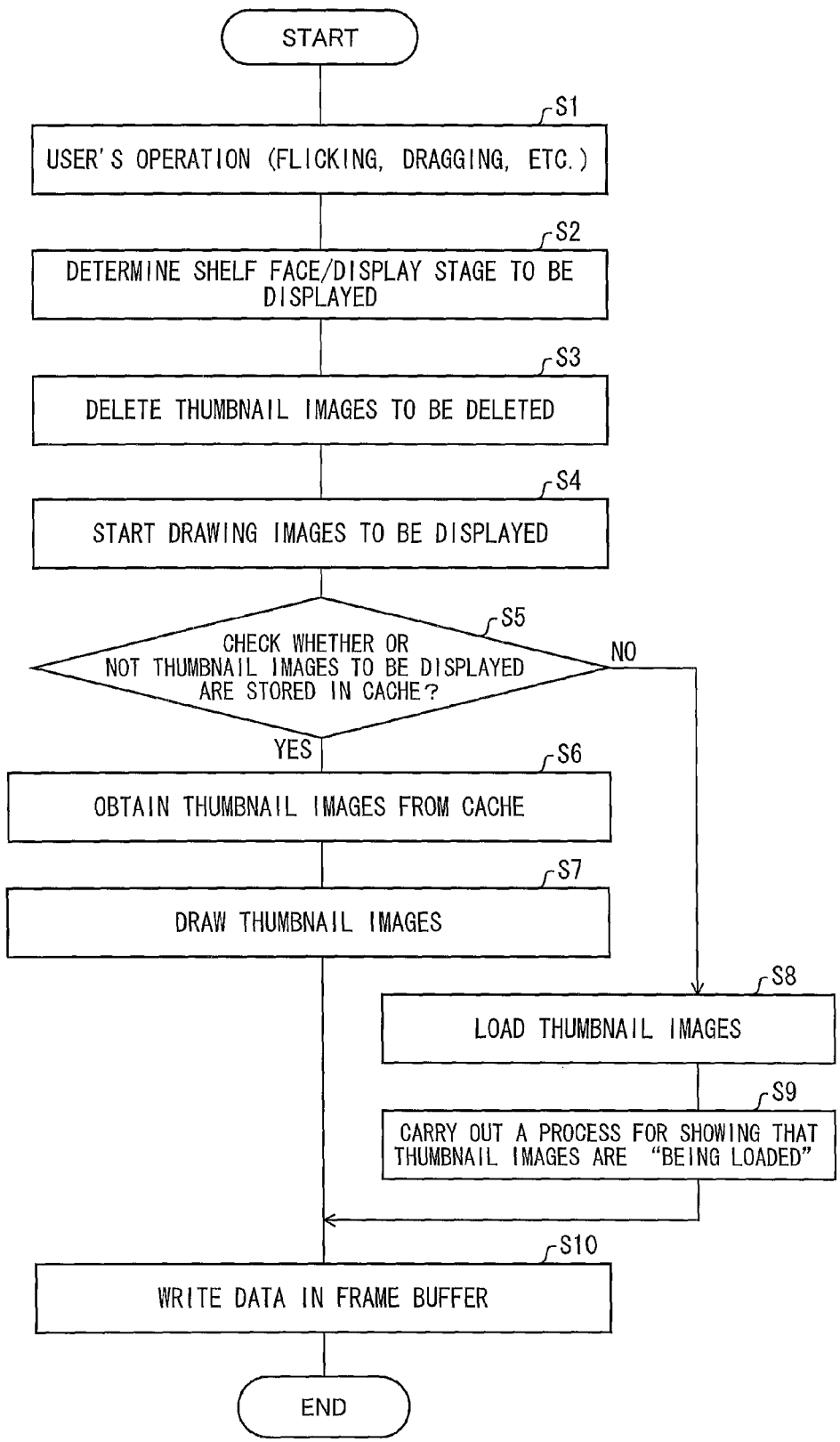
FIG. 25 is a flow chart showing a flow of processes for displaying thumbnail images in the content display device shown in FIG. 21.

Next, the following description deals with an example of a process for displaying the bookshelf object 10 with reference to FIG. 25, which process is carried out by the content display device 200.

FIG. 25 is a flow chart showing a flow of such a process that the content display device 200 causes a content displayed on a screen to be changed.

It is assumed that, first, a user carries out a rotating operation of the bookshelf object 10 via the input operation section 202. The input processing section 211 receives a signal from the input operation section 202, and supplies operation information corresponding to the signal to the rotation processing section 212 (Step S1).

The rotation processing section 212 carries out a process for determining a rotation amount in accordance with an amount of user's operation. Next, in accordance with the rotation amount determined by the rotation processing section 212, the display region determining section 214 determines, among the bookshelf object 10, a region (the display region) to be displayed on the screen 20 (Step S2). This causes, for example, the display region to be shifted from the region 14 of the shelf face A, illustrated in FIG. 22, to the region 14 of the shelf face B, illustrated in FIG. 23.

In Step S2 described above, the display region determining section 214 determines the display region, and simultaneously, determines (changes) priorities of thumbnail images automatically. Specifically, the display region determining section 214 (i) changes a priority of each of the thumbnail images in the region thus determined (each of which was previously given the second highest priority) to the highest priority, (ii) changes a priority of each of the thumbnail images in the previous display region (each of which was previously given the highest priority) to the second highest priority, and (iii) changes, to the lowest priority, a priority of each of the thumbnail images (each of which was previously given the second highest priority) outside the previous display region in the shelf face in which the previous display region was located.

After Step S2 is carried out, the thumbnail image deleting section 215 deletes thumbnail images from the cache 221 on the basis of the priorities of the thumbnail images thus determined. Specifically, in a case where the thumbnail images given the lowest priority are stored in the cache 221, the thumbnail image deleting section 215 deletes the thumbnail images given the lowest priority from the cache 221 (Step S3).

Then, the three-dimensional processing section 217 starts carrying out drawing so as to display the bookshelf object 10 (Step S4).

After the three-dimensional processing section 217 starts carrying out the drawing, the display region determining section 214 checks whether or not the thumbnail images given the highest priority are stored in the cache 221 (Step S5). For example, the display region determining section 214 can carry out the checking by use of book IDs managed by the book data management section 219.

In a case where the thumbnail images given the highest priority are stored in the cache 221 (YES in Step S5), the display region determining section 214 obtains the thumbnail images given the highest priority from the cache 221, and supplies the thumbnail images given the highest priority to the three-dimensional processing section 217 (Step S6). Then, the three-dimensional processing section 217 carries out drawing of the thumbnail images thus supplied, and supplies such thumbnail images to the display processing section 218 (Step S7).

On the other hand, in a case where the thumbnail images given the highest priority are not stored in the cache 221 (NO in Step S5), the display region determining section 214 (i) loads the thumbnail images given the highest priority from the memory 220 into the cache 221, (ii) causes the cache 221 to store the thumbnail images given the highest priority, and (iii) supplies the thumbnail images given the highest priority to the three-dimensional processing section 217 (Step S8). Note that a process for loading the thumbnail images will be described later.

For the thumbnail images which are being loaded, the three-dimensional processing section 217 carries out a process for showing, on the screen 20, that the thumbnail images are "being loaded", and supplies, to the display processing section 218, data which has been subjected to such a process (Step S9). Further, for the thumbnail images which have been loaded, the three-dimensional processing section 217 carries out drawing of these thumbnail images, and supplies such thumbnail images to the three-dimensional processing section 217.

Here, it is possible that, during a time period in which the bookshelf object 10 is being rotated, the three-dimensional processing section 217 carries out, on a single screen, drawing of both (i) the previous display region and (ii) the display region determined this time.

Next, the display processing section 218 writes the data thus supplied in a frame buffer (not illustrated), reads out the data sequentially, and supplies the data to the display section 203 (Step S10). This makes it possible for the display section 203 to change, in accordance with user's operation, a content displayed on the screen.

With the operations described above, at timing that the display region is determined, the content display device 200 can (i) change dynamically the priorities of the thumbnail images, (ii) load the thumbnail images (the display images) given the highest priority, and (iii) delete the thumbnail images (images to be deleted) given the lowest priority.

For example, once a thumbnail image is loaded, the thumbnail image thus loaded is stored in the cache 221 continuously unless the thumbnail image thus loaded is determined as an image to be deleted. For this reason, while the rotation of the bookshelf object 10 and/or the scrolling of the shelf face is repeated, thumbnail images which are likely to be arranged in the next display region are stored in the cache 221. Accordingly, the content display device 200 sends/receives data to/from the cache 221 when the next display region is determined. This makes it possible to improve a speed at which the process for displaying the thumbnail images is carried out. Further, the thumbnail images which are not at all likely to be arranged in the next display region are determined as images to be deleted and are deleted from the cache 221. Accordingly, it is possible to use the cache 221 efficiently.

The following description explains, with the use of specific examples, the aforementioned situation in which the thumbnail images are being loaded in the process for displaying the bookshelf object 10.

Figure 26:
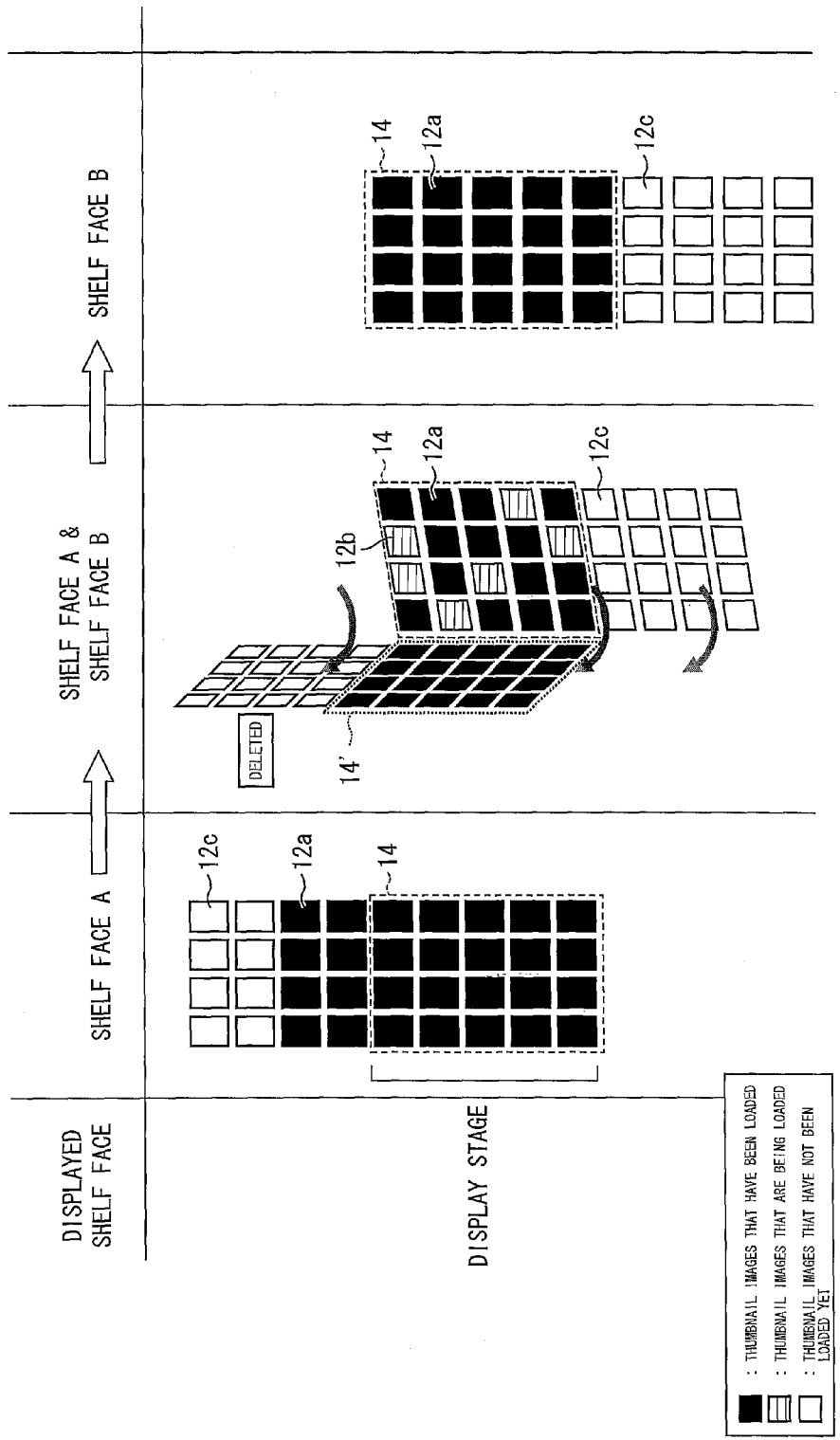
FIG. 26 is a view showing an example of a flow of processes for displaying thumbnail images in a case where the bookshelf object is rotated.

FIG. 26 is a view illustrating the situation in which the thumbnail mages are being loaded when the display region is relatively shifted from the shelf face A to the shelf face B. Note that, in FIG. 26, "12*a*" indicates the thumbnail images which have been already loaded, "12*b*" indicates the thumbnail images which are being loaded, and "12*c*" indicates the thumbnail images which have not been loaded or have been already deleted.

First, as illustrated in a left part of FIG. 26, the region 14, which has been determined as the display region, is located at an arbitrary position in the shelf face A, for example. Here, the thumbnail images located in 2 rows provided upward with respect to the region 14 have been already stored in the cache 221, for example.

Then, user's operation is carried out to rotate the bookshelf object 10, so that the region 14 displayed on the screen 20 is shifted relatively from the shelf face A to the shelf face B (as illustrated in a center part of FIG. 26). Here, the thumbnail images in the region 14 in the shelf face B are determined as images to be loaded, and are loaded. In a case where the loading has not been completed before the region 14 in the shelf face B is displayed, the screen 20 displays a content with which a viewer can know the thumbnail images are being loaded. Further, the thumbnail images located in the 2 rows provided upward with respect to a previous region 14' in the shelf face A are determined as images to be deleted, and are deleted from the cache 221.

Finally, as illustrated in a right part of FIG. 26, all the thumbnail images located in the region 14 in the shelf face B are loaded, and displayed on the screen.

(Loading Process)

Figure 27:
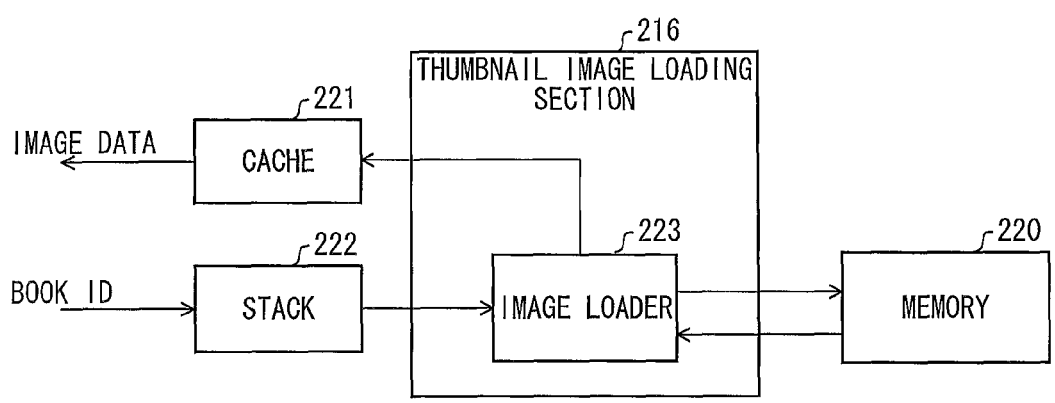
FIG. 27 is a block diagram showing a part of the content display device shown in FIG. 21.

Next, the following description deals with, more specifically, the aforementioned loading process (Step S8) in the process for displaying the bookshelf object 10, with reference to FIG. 27. FIG. 27 is a view illustrating a flow of a process in which the content display device 200 loads thumbnail images.

As illustrated in FIG. 27, in a case where the thumbnail images given the highest priority are not stored in the cache 221, the display region determining section 214 causes a stack 222 to store book IDs corresponding to the thumbnail images given the highest priority. The stack 222 manages hierarchically, in a stack format, the book IDs corresponding to the thumbnail images which wait to be loaded.

Next, an image loader 223 of the thumbnail image loading section 216 sequentially loads, from the memory 220, the thumbnail images corresponding to the book IDs stored in the stack 222. The thumbnail image loading section 216 causes the cache 221 to store the thumbnail images thus loaded, and also supplies the thumbnail images thus loaded to the three-dimensional processing section 217.

With the operations described above, it is possible to load preferentially thumbnail images given a high priority.

(Flow of Loading Process and Flow of Deleting Process)

Figure 28:
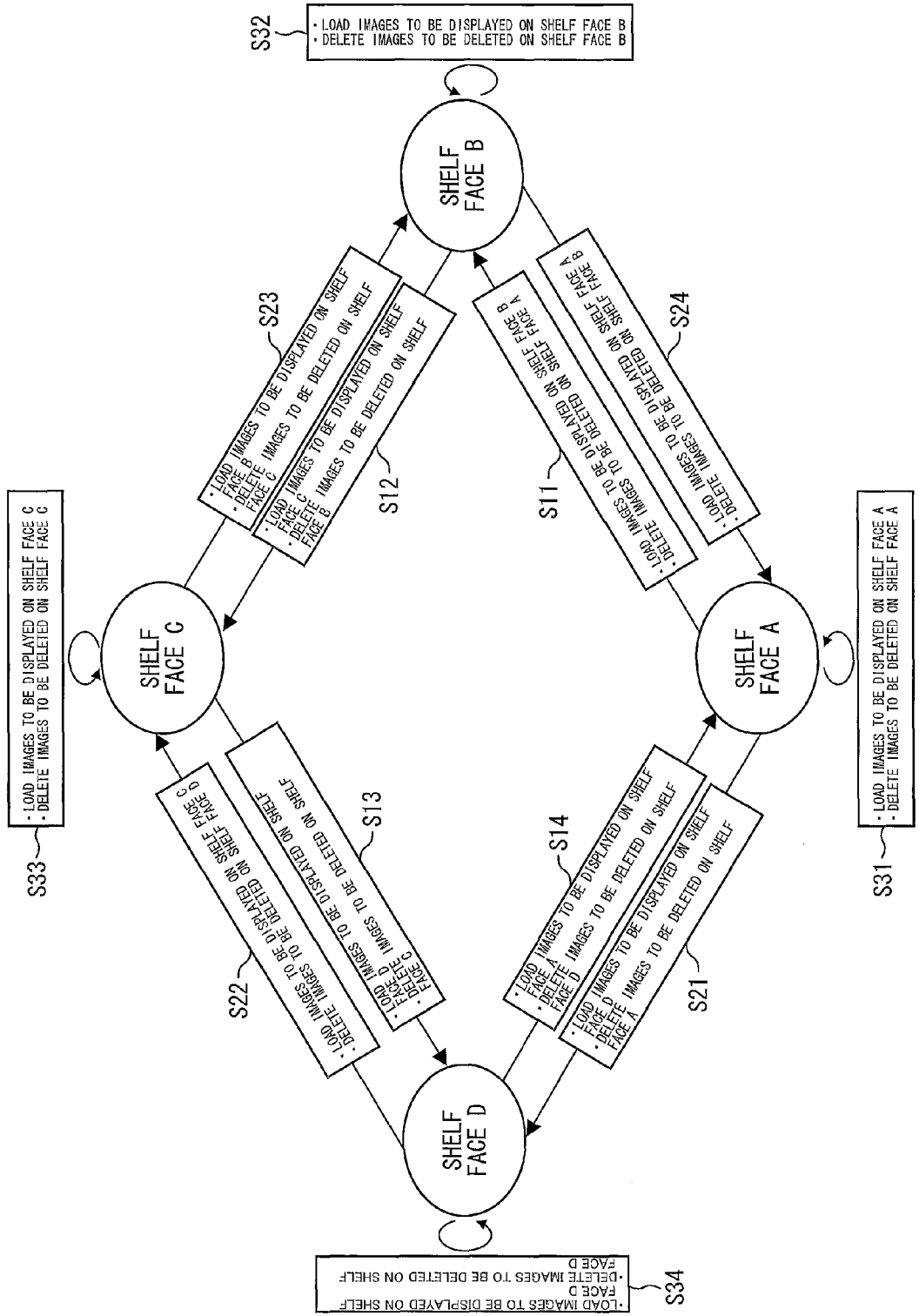
FIG. 28 is a view showing a thumbnail image reading process and a thumbnail image deleting process that are carried out as a result of rotation or scrolling of the bookshelf object.

FIG. 28 is a view illustrating, in block, (i) a flow of a loading process for loading thumbnail images in the display process at each timing when a display region is determined, and (ii) a flow of a deleting process for deleting thumbnail images in the display process at each timing when the display region is determined.

In FIG. 28, Steps S11 through S14 indicate a loading process and a deleting process, carried out in a case where the bookshelf object 10 is rotated counterclockwise. Further, Steps S21 through S24 indicate a loading process and deleting process, carried out in a case where the bookshelf object 10 is rotated clockwise. Furthermore, Steps S31 through S34 indicate a loading process and a deleting process, carried out in a case where the shelf faces A through D are scrolled. Note that each of these steps is carried out in the aforementioned process for displaying the bookshelf object 10.

Accordingly, the content display device 200 of the present embodiment can suitably realize a real-time display process even if any one of regions of the bookshelf object is determined as the display region.

(Modification)

In the aforementioned display process of the bookshelf object 10, neither a loading process nor a deleting process is carried out with respect to the thumbnail images given the second highest priority. Note, however, that the present invention is not limited to this. For example, it is possible to set, in accordance with a total number of thumbnail images or a capacity of the cache 221, the thumbnail images given the second highest priority as images to be loaded after the thumbnail images given the highest priority are loaded. With the arrangement, it becomes possible to realize a process achieving higher real-time performance.

Further, the content display device 200 is connectable to an external storage device (an external memory) via an input/output interface, and is also connectable to an external network (such as the Internet) via a network communication device. The content display device 200 can obtain data (such as data of an electronic book and data of a thumbnail image) from the external memory or the external network into the memory 220.

The content display device of the present embodiment is intended to be realized as an electronic book terminal with which an electronic book can be viewed. Note, however, that the content display device of the present embodiment is not limited to this. For example, the content display device of the present embodiment can be a portable terminal (such as a mobile phone, a smart phone, and an electronic dictionary), or a terminal device (such as a personal computer having a monitor).

Moreover, a thumbnail image of an electronic book is used in the explanation of the present embodiment. Note, however, that the present invention is not limited to this, and it is possible to use, for example, a thumbnail image, an icon, or the like, which indicates a content of another medium.

Further, in the present embodiment, a thumbnail image is a planar object. Note, however, that the present invention is not limited to this, and it is possible to use, for example, a 3D object in place of the planar object. For example, it is possible to use such a 3D object that a thickness of a book is expressed. In this case, the aforementioned priorities are applicable not only to the loading of thumbnail images but also to loading of data unique to the objects, such as 3 dimensional information.

(Summary of Embodiment)

As described above, the content display device of the present invention is preferably arranged such that the priorities are classified into three stages, and the determining means gives the highest priority to images arranged in the display part having been determined, gives the lowest priority to images that are not at all likely to be arranged in a next display part to be determined, and gives a second highest priority to images other than the images given the highest priority and the images given the lowest priority.

According to the arrangement, priorities of the images are determined in consideration of the display part having been determined and the next display part to be determined in the three-dimensional object. That is, images arranged in the display part having been determined are preferentially read. Meanwhile, images that are not at all likely to be arranged in the next display part to be determined are deleted from the second memory. Accordingly, even in a case where a large number of images are arranged on the three-dimensional object, it is possible to suitably achieve real-time processing without causing a decline in user response. In addition, a capacity of the second memory can be efficiently used.

As described above, the content display device of the present invention is preferably arranged such that the deleting means does not delete the images given the second highest priority.

According to the arrangement, images once read are stored in the second memory unless the images are given the lowest priority. As a result of repeatedly determining a display part of the three-dimensional object, thumbnail images that are likely to be arranged in a next display part to be determined are stored in the second memory. Since there are more opportunities of using the thumbnail images stored in the second memory when a next display region is determined, the content display device of the present invention can be improved in overall processing speed for displaying images.

As described above, the content display device of the present invention is preferably arranged such that the plurality of images are arranged on each side face of a polygonal column which the three-dimensional object forms, so as to be aligned in columns and rows that extend in a longitudinal direction of the each side face and a direction orthogonal to the longitudinal direction, respectively, and the images that are not at all likely to be arranged in the next display part to be determined include an image disposed in different column and row from the image arranged in the display part having been determined.

According to the arrangement, the priorities of the images suitably correspond to a structure of the three-dimensional object. Accordingly, even in a case where a large number of images are arranged on the three-dimensional object, it is possible to suitably achieve real-time processing without causing a decline in user response.

As described above, the content display device of the present invention is preferably arranged such that the next display part to be determined is a display region to be determined by the determining means as a result of a user's single operation, and the images that are not at all likely to be arranged in the next display part to be determined further include an image that is disposed, on the side face having the display part having been determined, farther away from the display part having been determined than images that are likely to be arranged in the next display part to be determined.

According to the arrangement, the capacity of the second memory can be efficiently used.

As described above, the content display device of the present invention is preferably arranged such that the pieces of content are electronic books and the images are thumbnail images of the electronic books.

According to the arrangement, the present invention can be suitably applied to an electronic book reader in which a thumbnail image is necessary for each book.

[Third Embodiment]

The following description will discuss, with reference to FIGS. 29 to 36, a third embodiment of a content display device in accordance with the present invention.

(Brief Overview of a Content Display Device)

First, a brief overview of a content display device in accordance with the present embodiment is provided.

The content display device of the present embodiment is configured so that a three-dimensional object in the shape of a polygonal column is placed in a virtual three-dimensional space and part of the three-dimensional object is displayed. The three-dimensional object has side faces on each of which a plurality of images representing their corresponding pieces of content are arranged along column-wise and row-wise directions, so that by carrying out an input operation of rotating the three-dimensional object or scrolling the three-dimensional object in a longitudinal direction of the polygonal column, a user can move a display region that is displayed on a screen.

The user's moving the display region by carrying out the input operation is controlled so that there is no discontinuity of an image that is displayed on the screen after the user has moved the display region. Accordingly, when the user searches for a desired piece of content from among the plural pieces of content arranged on the three-dimensional object, an image that is displayed on the screen has no missing part when the scrolling or rotating has stopped. This allows the user to easily find the target image.

(Three-dimensional Object)

The following description discusses a three-dimensional object to be displayed by a content display device in accordance with the present embodiment.

Figure 30:
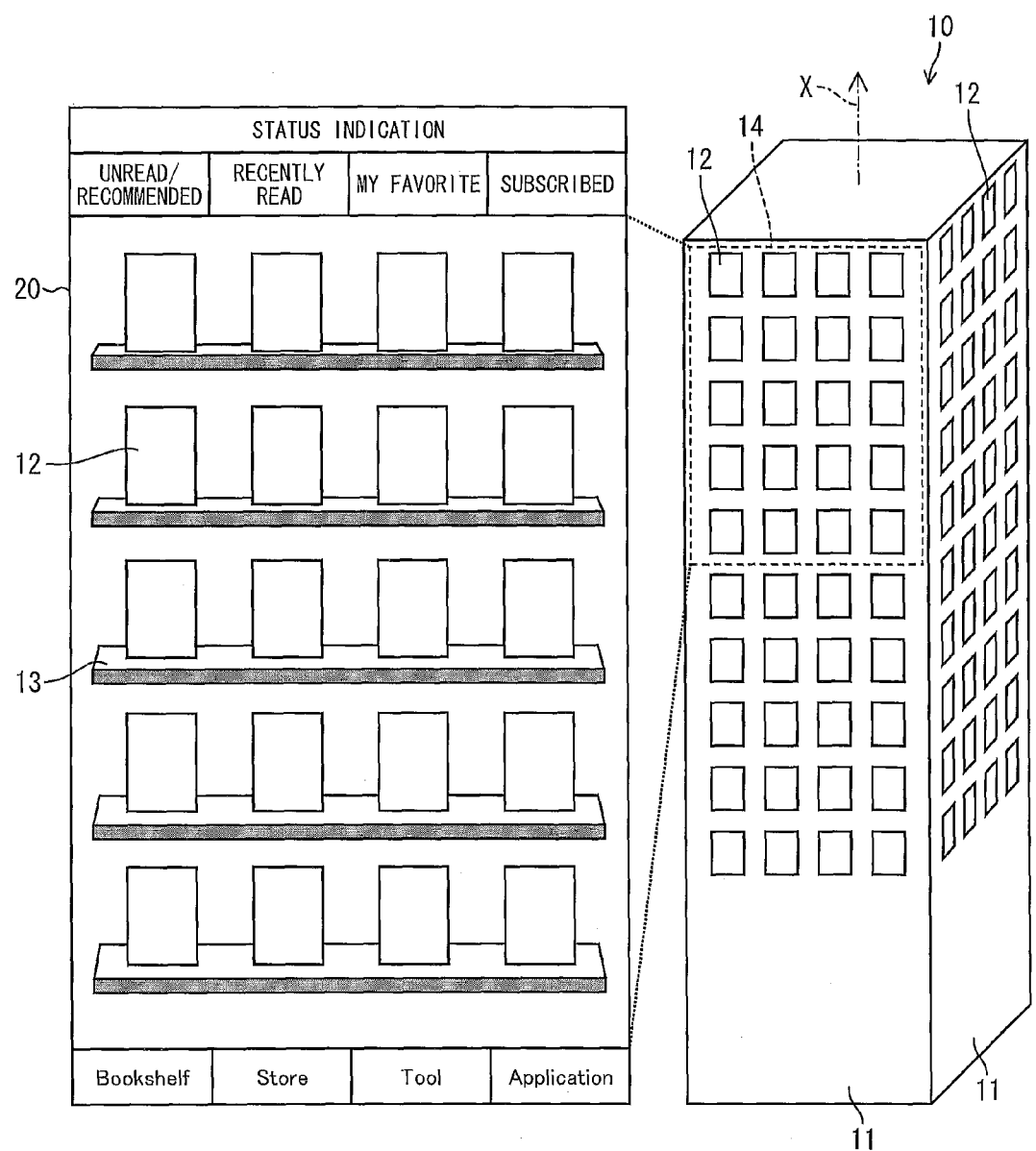
FIG. 30 is a view showing (i) a three-dimensional object displayed on a display section of the content display device shown in FIG. 29 and (ii) a screen, of the content display device, which displays thereon a part of the three-dimensional object.

FIG. 30 is a view showing a three-dimensional object and a screen of a content display device displaying part of the three-dimensional object. The right-hand part of FIG. 30 shows the appearance of a three-dimensional object 10, and the left-hand part of FIG. 30 shows a screen 20 of a content display device displaying part of the three-dimensional object 10. In FIG. 30, a region enclosed by a dotted line, which region is part of the three-dimensional object 10, is a region 14 which is actually displayed on the screen 20.

In the present embodiment, the three-dimensional object 10 is a rectangular parallelepiped having four side faces 11, and has a structure of a bookshelf having a plurality of electronic books (pieces of content) arranged on each of the side faces. In the following, the three-dimensional object is sometimes referred to as "bookshelf object," and the side face is sometimes referred to as "shelf face".

As shown in FIG. 30, the bookshelf object 10 has four shelf faces 11. Each of the shelf faces 11 is provided with a plurality of shelves. On each of the plurality of shelves 13, thumbnail images (also referred to simply as "images") 12 representing the book covers of a plurality of electronic books are displayed as if they were placed on a shelf. By carrying out an operation of selecting any of the thumbnail images 12, the user can view the contents of an electronic book corresponding to the thumbnail image 12 selected.

The user carries out an input operation for example either by directly touching the display screen or through input keys provided on the content display device. That is, the content display device of the present embodiment includes a touch panel so that the user can carry out various operations by touching the touch panel (screen).

Examples of methods for carrying out an input operation on the touch panel include a tapping operation, a dragging operation, a flicking operation, a pinching operation, etc. A tapping operation refers to striking the screen lightly with a finger, and allows the user to execute the start-up of a viewer, the pressing of a button being displayed, or the like. A dragging operation refers to sliding a finger on the screen, and allows the user to execute rotating, scrolling, or the like of the bookshelf object 10. A flicking operation refers to hitting the screen with a sudden quick movement using a finger, and allows the user to execute rotating, scrolling, or the like of the bookshelf object 10. A pinching operation is gripping between two fingers on the screen, and allows the user to execute enlarging, reducing, or the like of the bookshelf object 10.

By thus scrolling up or down a display region to be displayed or rotating the bookshelf object 10 by directly touching the screen, the user can change from displaying one image 12 on the screen 20 to displaying another image 12 on the screen 20.

The three-dimensional object is not limited in shape to a rectangular parallelepiped, but may be in the shape of another polygonal column. Further, although the configuration shown in FIG. 30 has five shelves 13 on each of which four electronic books have been placed, the number of pieces of content to be placed is not limited, but may be appropriately set by the manufacturer. A display example of the bookshelf object 10 will be discussed later.

Next, each component of a content display device in accordance with the present embodiment is described in detail.

(Components of a Content Display Device)

Figure 29:
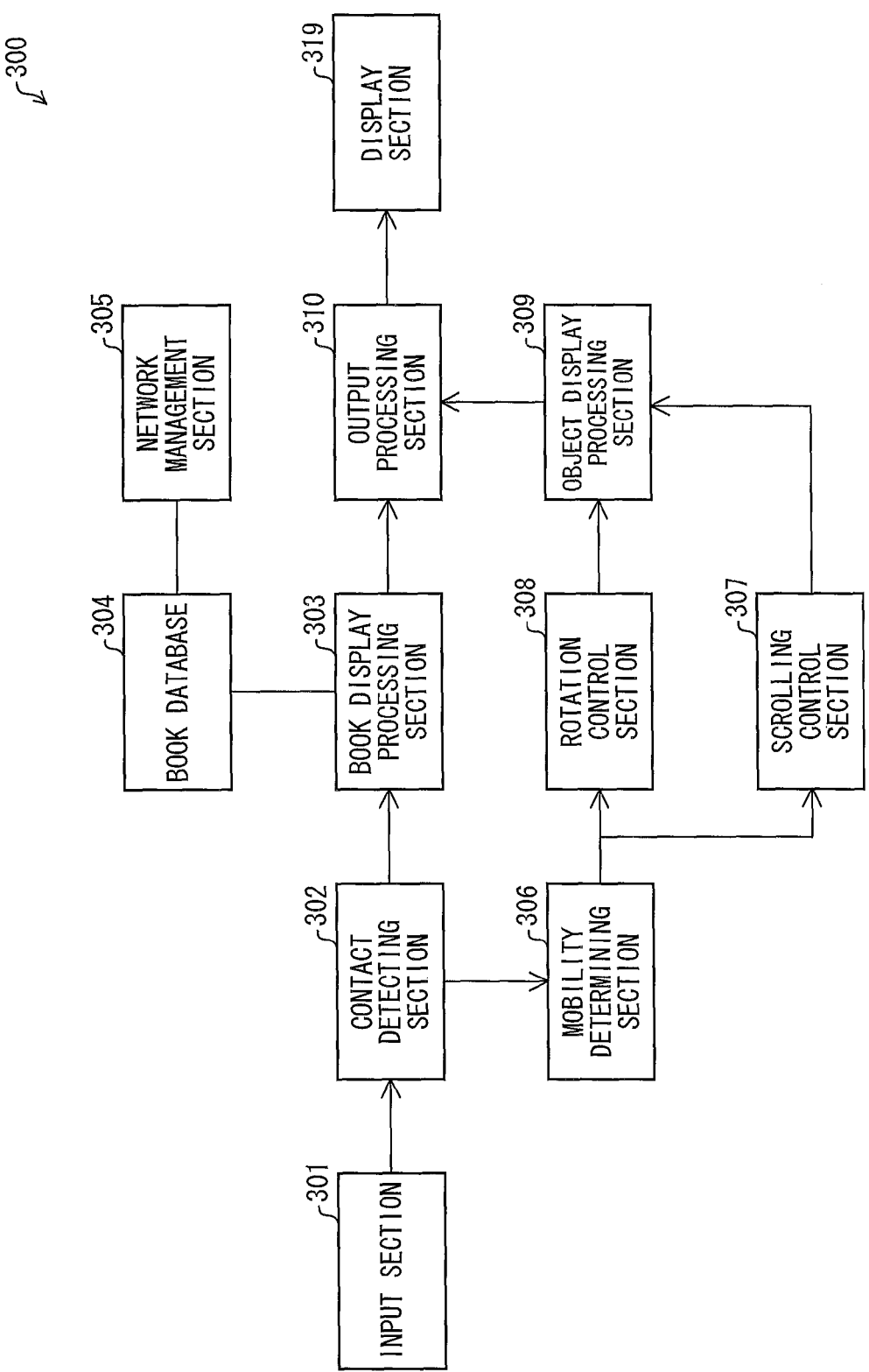
FIG. 29 is a block diagram showing a configuration of a content display device of an embodiment of the present invention.

FIG. 29 is a block diagram showing a configuration of a content display device in accordance with an embodiment of the present invention. As shown in FIG. 29, a content display device 300 includes an input section 301, a contact detecting section 302 (contact detecting means), a book display processing section 303, a book database 304, a network management section 305, a mobility determining section 306 (mobility determining means), a scrolling control section 307 (first display control means), a rotation control section 308 (second display control means), an object display processing section 309, an output processing section 10, and a display section 319.

The input section 301, placed on the display section 319, receives a user input by contact. That is, in the present embodiment, the input section 301 and the display section 319 constitute an integrated touch panel.

The contact detecting section 302 detects a user input received by the input section 301, i.e., detects input information from contact. The input information that the contact detecting section 302 detects is motion information such as the position, speed, distance, or the like of the contact, and the input information thus detected is sent to the book display processing section 303 or the mobility determining section 306.

The book display processing section 303 obtains, from the book database 304, book data to be displayed, generates a thumbnail image 12 in displaying the book cover of the book thus obtained, and sends the thumbnail image 12 to the output processing section 10. Further, the book display processing section 303 can send the book being displayed to the book database 304 so as to delete it from the bookshelf object 10. The placement of a book on or the deletion of a book from the bookshelf object 10 may be carried out in accordance with a user input to the input section 301, or may be carried out automatically in accordance with a preset criterion (e.g., a display period).

The book database 304 causes book data obtained by the network management section 305 to be stored in a storage device, and manages the book data obtained. Further, upon request of the book display processing section 303 to obtain book data, the book database 304 sends the book data to the book display processing section 303.

The network management section 305 obtains book data serving as content data from a server on a network via communication means (not illustrated).

The mobility determining section 306 determines, on the basis of motion information detected by the contact detecting section 302, the mobility with which to move a display region of the bookshelf object 10 that is displayed on the screen 20. Specifically, in a case where the contact detecting section 302 has detected a motion in a longitudinal direction (lengthwise direction) of the bookshelf object 10, the mobility determining section 306 determines, from the speed of the motion, the number of lines (mobility) by which to scroll the display region of the bookshelf object 10 in a longitudinal direction, and sends information on the mobility thus determined to the scrolling control section 307. Meanwhile, in a case where the contact detecting section 302 has detected a motion in a direction orthogonal to the longitudinal direction of the bookshelf object 10, the mobility determining section 306 determines, from the speed of the motion, the number of faces (mobility) by which to move the display region in such a manner as to rotate the bookshelf object 10, and sends information on the mobility thus determined to the rotation control section 308.

In so doing, the mobility determining section 306 determines the mobility so that when moving the display region while a screen image is being displayed has caused another screen image to be displayed, i.e., when the display region of the bookshelf object 10 has moved, an image 12 of an electronic book that is displayed as part of the another screen image has no missing part. Such mobility determination is carried out especially when contact is made by a flicking operation.

That is, by changing the speed of a user input to the input section 301, the distance by which the display region is moved by scrolling or moved by rotating can be changed. Therefore, even with a single operation, it is possible to move through one or two, for example, rows of images in accordance with the speed of the input operation. This allows the user to carry out an operation more comfortably.

The criterion for determining the mobility is not particularly limited, but for example the mobility may be determined by using a predetermined parameter prepared in advance.

Further, it is preferable that the mobility determining section 306 determine, in accordance with the speed of the motion, the speed at which to move the display region. For example, the mobility determining section 306 determines the moving speed so that the moving speed is (i) high in a case where the speed of a flicking operation is high and (ii) low in a case where the speed of a flicking operation is low.

This makes it possible to, by raising the speed of contact for example in a case where the user would like to quickly find a pre-targeted piece of content, cause the desired piece of content to be displayed in a short period of time. Meanwhile, in a case where the user (i) has not particularly decided on the content that he/she would like to view and (ii) would like to display pieces of content while searching for what piece of content is available, a search through the pieces of content can be performed comfortably by lowering the speed of contact.

The scrolling control section 307 creates, in accordance with the mobility determined by the mobility determining section 306, animation information for displaying another screen image by scrolling the display region of the bookshelf object 10 in a longitudinal direction.

The term "another screen image" here means a separate region of the side face 11 that had been a target of display before scrolling. This scrolling movement is an upward/downward movement within a shelf face 11 designated as a display region. The scrolling control section 307 sends the animation information to the object display processing section 309.

The term "animation" here in the present embodiment refers to a function of changing displays by rotating the bookshelf object 10 or moving a shelf face 11 in a virtual three-dimensional space.

The rotation control section 308 creates, in accordance with the mobility determined by the mobility determining section 306, animation information for displaying another screen image by rotating the display region of the bookshelf object 10 around the central axis (longitudinal axis) of the rectangular parallelepiped as indicated by "X" in FIG. 30 in a direction orthogonal to the central axis.

The term "another screen image" here means a separate side face that is different from a side face that had been a target of display before rotating. Note, however, that it is possible to go back to the original side face after rotating. The central axis of the rectangular parallelepiped in this specification refers to an axis which passes through the barycenter of the bottom face of the rectangular parallelepiped and which is orthogonal to the bottom face of the rectangular parallelepiped.

Further, the rotation control section 308 causes the bookshelf object 10 to move so that the shelf face 11 to be displayed on the screen 20 faces the front when the rotating movement stops. The "front" here means a face as obtained when the shelf face 11 to be a display region and the display surface of the display section 319 are displayed in parallel with each other. The rotation control section 308 sends the animation information thus created to the object display processing section 309.

The object display processing section 309 generates, from the animation information created by the scrolling control section 307 or the rotation control section 308, an image of the bookshelf object 10 that is to be displayed by the display section 319, and outputs the image to the output processing section 10.

The animation information that the object display processing section 309 uses in generating an image of the bookshelf object 10 is not limited to that which relates to a scrolling movement or a rotating movement, and for example, it is possible to use such animation information that another visual effect is added. Examples of another visual effect include enlarging or reducing a shelf face 11, rendering the bookshelf object 10 transparent, changing background images, etc.

The output processing section 10 combines (i) the thumbnail image 12 of the book as generated by the book display processing section 303 and (ii) the image of the bookshelf object 10 as generated by the object display processing section 309 so that the thumbnail image 12 is placed on a shelf face 11 of the bookshelf object 10, and causes the composite image to be displayed on the display section 319.

It should be noted that those skilled in the art who have understood the aforementioned display content on the screen 20 of the content display device 300 can realize display of a bookshelf object 10 and of each shelf face 11, rotation of the bookshelf object 10 and display of the rotation, movement of a shelf face 11 by scrolling and display of the movement, and the like, by employing a known technique such as OpenGL (Open Graphics Library). Therefore, descriptions of specifically how data are processed and managed by each processing section and each management section for realizing these displays are omitted here.

The display section 319 can be constituted by a liquid crystal panel or the like.

Thus, in the content display device 300 of the present embodiment, when a different region of the bookshelf object 10 is to be displayed on the screen 20, the virtual viewpoint is not moved; instead the bookshelf 10 is rotated or the shelf faces 11 of the bookshelf object 10 are moved without moving the virtual viewpoint. This causes a different region to be seen from the virtual viewpoint, whereby the position of the region 14 to be displayed on the screen 20 is changed.

(Displaying the Bookshelf Object)

Figure 31:
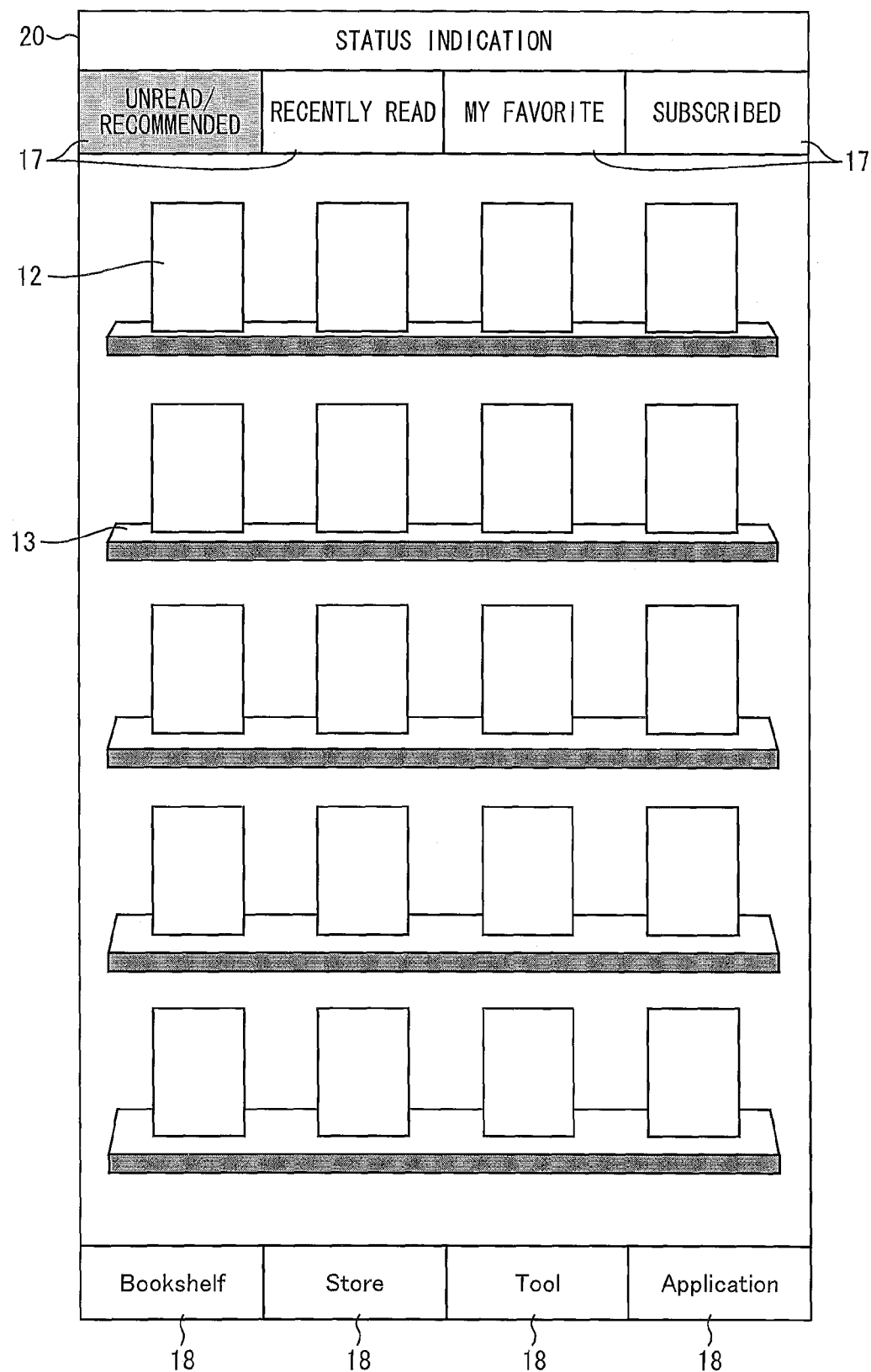
FIG. 31 is a view showing an example of a display on the screen of the content display device shown in FIG. 29.

The following description discusses how to display the bookshelf object 10 on the screen 20 of the content display device 300. FIG. 31 is a view showing an example of a display on the screen of the content display device 300.

In the present embodiment, the four shelf faces 11 are assigned respective different categories. On each of the shelf faces 11, thumbnail images 12 of electronic books that belong to a category assigned to that shelf face are arranged. The categories to be assigned are not limited. In the present embodiment, categories are divided into the following four categories: "Unread/Recommended", "Recently read", "My favorite" and "Subscribed", and the four categories are assigned to the respective four shelf faces 11.

Since each of the side faces 11 contains pieces of content belonging to the same category, it becomes easier to manage the pieces of content and to search for a desired piece of content. Further, as mentioned above, the content display device 300 allows the bookshelf object 10, on which the plurality of images 12 are arranged, to be rotated or scrolled so that different regions 14 of the bookshelf object 10 can be displayed on the screen 20. This makes it easy to view the images 12 of a large number of pieces of content. This allows the user to visually search for various books as if he/she were in a bookstore.

As mentioned above, the bookshelf object 10 is not limited in shape to a rectangular parallelepiped, but may be in the shape of another polygonal column. Accordingly, the number of side faces 11 is not limited to four, and the number of categories that respective different shelf faces 11 are assigned is not limited to four, either.

In the absence of a movement of the display region by a user operation, the content display device 300 displays the front part of the bookshelf object 10 on the screen 20 as shown in FIG. 31. In this example, shelves 13 and thumbnail images 12 of books are displayed as if the thumbnail images 12 were placed on the shelves 13.

At the top of the screen 20, there are indicators which indicate categories of the respective shelf faces 11 of the bookshelf object 10 so that the user can recognize the category of a currently-displayed shelf face 11.

For example, in FIG. 31, an indicator of "Unread/Recommended" is illuminated. This means that a shelf face 11 that belongs to the "Unread/Recommended" is currently displayed. It should be noted that the indicators also serve as shelf face selecting buttons 17 that allows the user to, by selecting the indicator of the category that the user would like to be displayed, change from displaying one shelf face 11 to displaying another shelf face 11. Furthermore, at the bottom of the screen 20, operation input buttons 18 for carrying out the functions of the content display device are displayed.

Further, on the screen 20, the shelf face 11 is displayed as if it were viewed from slightly above. Therefore, the shelf face 11 is displayed on the screen 20 so that the top surfaces of the shelves 13 on the shelf face 11 can be seen. Further, in the real world, when the shelf face 11 is viewed slightly from above, a shelf 13 placed on a lower side shows more of its top surface. Accordingly, the bookshelf object 10 is displayed so that a shelf 13 placed on a lower side shows more of its top surface.

The following description discusses how to change the pieces of content displayed on the screen 20 by moving the bookshelf object 10 in a virtual three-dimensional space.

(Scrolling of a Shelf Face)

The length of each of the shelf faces 11 in the longitudinal direction of the bookshelf object 10 is greater than a length that can be displayed at one time on the screen 20 of the content display device 300. Therefore, in the shelf face 11 to be displayed, a region that is actually displayed on the screen 20 is part of the shelf face 11 as shown in FIG. 30.

That is, in FIG. 30, a region enclosed by a dotted line is a region 14 which is actually displayed on the screen 20, and the other region is not displayed on the screen 20. Therefore, by moving the shelf face 11 displayed on the screen 20 in the longitudinal direction, the region 14 to be displayed on the screen 20 is changed so that a region which was not displayed is displayed on the screen 20. This makes it possible to view the images 12 of books arranged in the region which was not displayed.

In the content display device 300, by the user's carrying out a flicking operation on the touch panel (input section 301) in a desired direction, a shelf face 11 is moved by scrolling in the same direction as that of the flicking and a region which was not displayed is displayed. In this case, the distance (number of lines) that the shelf face 11 is to be moved is determined depending on the speed of the flicking, and the shelf face 11 is moved according to the determination.

What speed of flicking causes what degree of movement of a shelf face 11 can be determined as appropriate by a manufacturer, provided that the images 12 to be displayed on the screen 20 after the movement of the shelf face 11 have no missing part. For example, as mentioned above, the distance that the shelf face 11 is moved by scrolling may be obtained by using a prepared parameter for determining the mobility.

Figure 32:
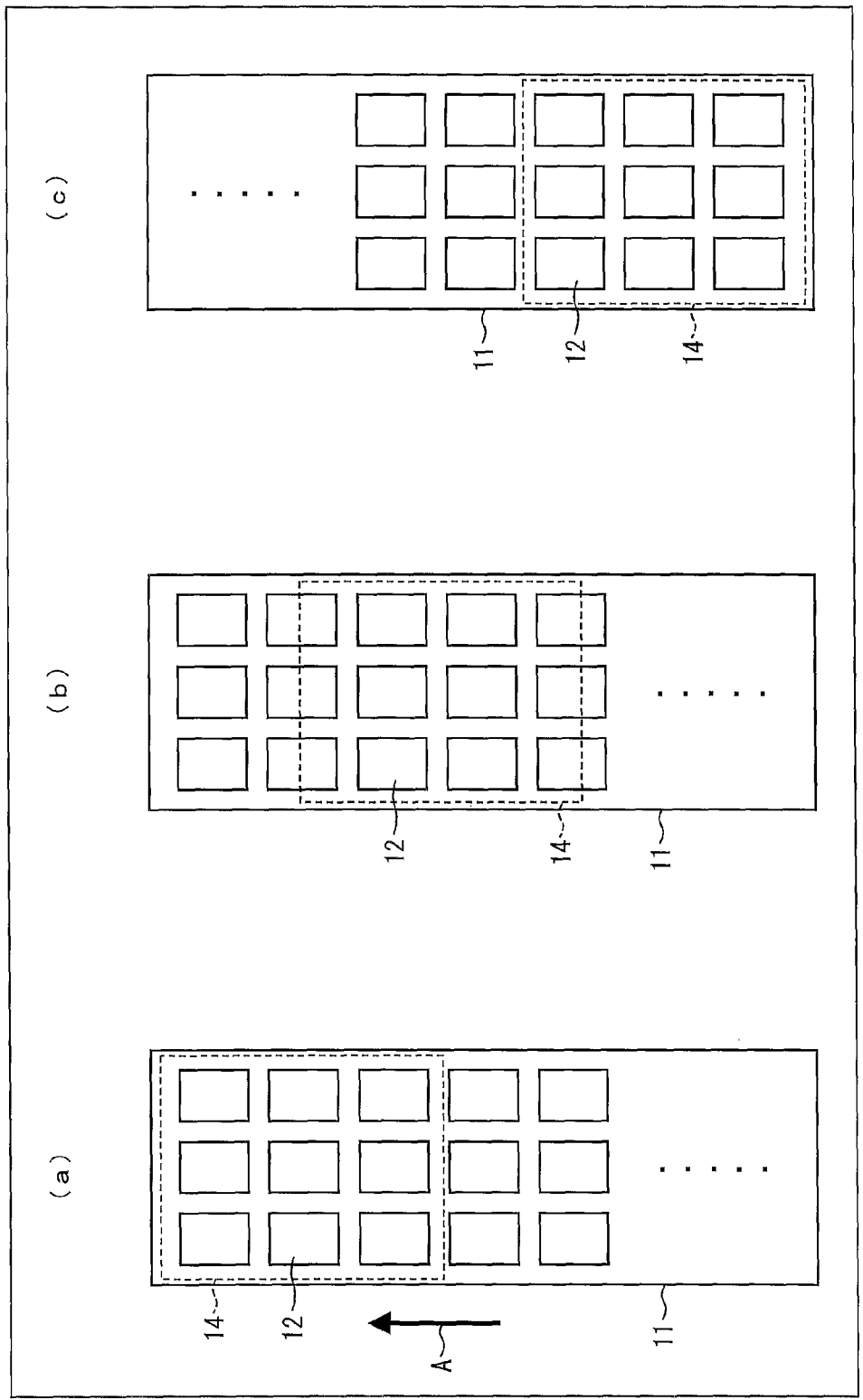
FIG. 32 is a view for explaining the way in which a display region of the three-dimensional object shown in FIG. 30 is moved.

FIG. 32 is a view for explaining the way in which that region 14 of the bookshelf object 10 which is displayed on the screen 20 is moved. (a) of FIG. 32 shows a shelf face 11 before movement. In a case where flicking is carried out in the direction of the arrow A, the shelf face 11 is moved upward so that the region 14 is moved to a lower part of the shelf face 11 (see (b) of FIG. 32). After that, the movement of the region 14 stops at the lower part of the shelf face 11, and different images 12 are displayed in such a manner as not to have missing parts(see (c) of FIG. 32).

It should be noted that the movement in a longitudinal (lengthwise) direction of each of the shelf faces 11 is controlled independently of the other shelf faces 11. That is, when a scrolling operation is carried out in the lengthwise direction, only a shelf face 11 that is displayed on the screen 20 at that time is moved in the lengthwise direction.

For example, when the region 14 in the uppermost part of each of the shelf faces 11 is designated as a display region, a flicking operation is carried out while any one of the shelf faces 11 is being displayed, so that the region 14 that is displayed on the screen 20 is moved to a lower part of that shelf face 11. At this point in time, only the shelf face 11 under operation is a shelf face 11 on which the region 14 is moved. On each of the other shelf faces 11, the region 14 to be displayed on the screen 20 stays in the uppermost part. As such, even in a case where a different shelf face 11 is displayed by rotating the bookshelf object 10 after moving the region 14 to be displayed on the screen 20, the other shelf faces 11 remain unchanged from the last time they were viewed.

For example, assume that, under a condition where the uppermost part of the shelf face 11 corresponding to the category "My favorite" is displayed, a user rotates the bookshelf object 10 to move to the shelf face 11 corresponding to the category "Unread/Recommended" to thereby display a lower part of the shelf face 11 by a scrolling operation. Here, when the user rotates the bookshelf object 10 again to move back to the shelf face 11 corresponding to the category "My favorite", if the region 14 to be displayed on the screen 20 is also moved on this shelf face 11, the user has to carry out a scrolling operation again to move the region 14. This is not user-friendly.

In this regard, according to the content display device 300, when a user rotates the bookshelf object 10 again and moves to a different shelf face, the shelf face 11 is displayed as it was previously viewed. This saves the user the trouble.

(Rotation of the Bookshelf Object)

The content display device 300 allows the user to carry out an input operation of rotating the bookshelf object 10 around the central axis X in the virtual three-dimensional space on the screen 20. By rotating the bookshelf object 10, the shelf face 11 that is displayed on the front face, i.e., that is an object to be displayed can be changed.

The content display device 300 of the present embodiment allows the user to rotate the bookshelf object 10 by carrying out a flicking operation on the touch panel (input section 301) in a direction substantially orthogonal to the axis of rotation (crosswise direction on the screen 20). By thus rotating the bookshelf object 10, the shelf face 11 that comes to the front face, i.e., that is an object to be displayed can be changed.

Specifically, a flicking operation causes the bookshelf object 10 to rotate in the same direction as that of the flicking, so that the adjacent shelf face 11 or the shelf face 11 next to the adjacent shelf face 11 comes to the front face to be displayed on the screen 20.

Figure 33:
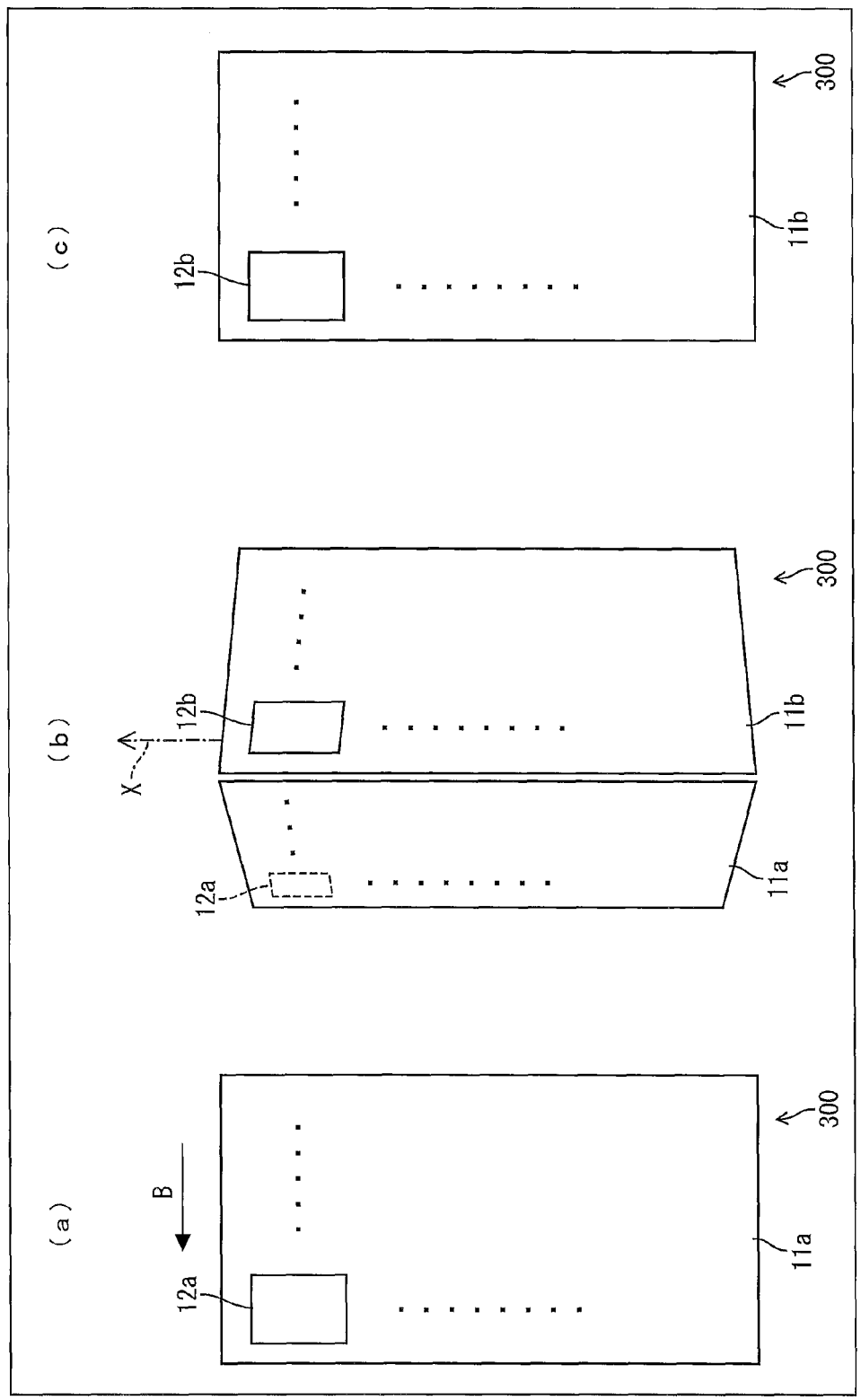
FIG. 33 is a view for explaining the way in which the three-dimensional object shown in FIG. 30 is rotated.

FIG. 33 is a view for explaining the way in which the bookshelf object 10 is rotated. (a) of FIG. 33 shows the bookshelf object 10 before rotation. In a case where a flicking operation is carried out in the direction of the arrow B, the shelf face 11a is rotated rightward (see (b) of FIG. 33) so that the front face of the adjacent shelf face 11b is displayed (see (c) of FIG. 33). This effects a change from displaying images 12a of books belonging to one category to displaying images 12b of books belonging to another category, thus making it possible to select from among the images 12b. This rotating movement is further explained with reference to FIG. 34.

Figure 34:
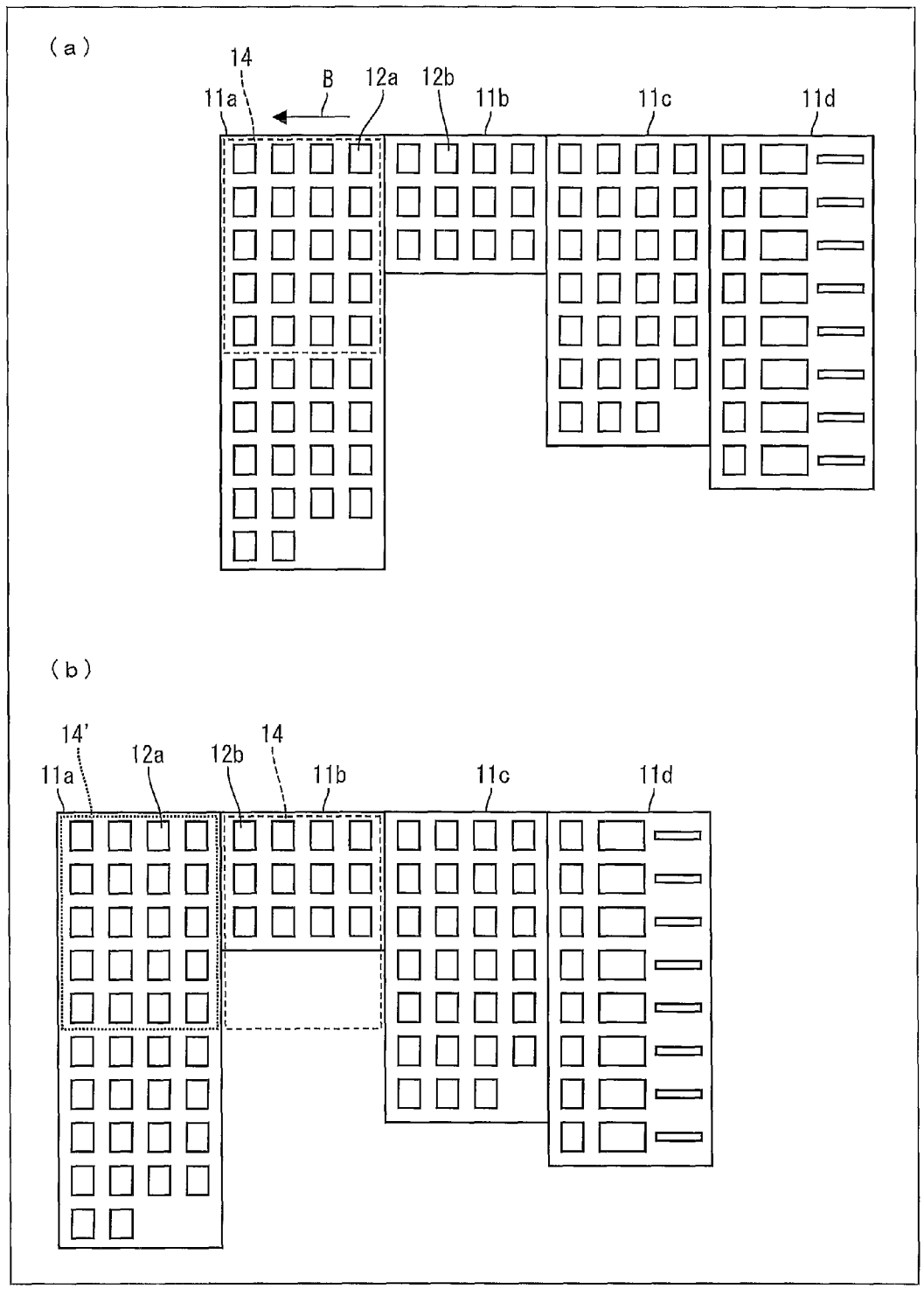
FIG. 34 is an exploded view, for the description purposes, illustrating the three-dimensional object shown in FIG. 30.

FIG. 34 is an exploded view, for the description purposes, illustrating the bookshelf object 10. Note, however, that FIG. 34 omits to illustrate the top and bottom surfaces.

(a) of FIG. 34 shows the bookshelf object 10 before rotation, and the front face of a shelf face 11a, which corresponds to the category "Unread/Recommended", is displayed on the screen 20. In this situation, if it is desired to display a shelf face 11b which is adjacent to the shelf face 11a and corresponds to the category "Recently read", a flicking operation is carried out in a direction toward a side of the shelf face 11a which side is opposite to the shelf face 11b (i.e., the direction of the arrow B). This causes the bookshelf object 10 to rotate so that the shelf face 11a moves in the direction of the arrow B, and brings the shelf face 11b to the front, whereby the region 14 to be displayed on the screen 20 moves to the shelf face 11b so that the shelf face 11b is displayed on the screen (see (b) of FIG. 34).

It should be noted that the rotation of the bookshelf object 10 is not to be limited to one rotation. The distance that a shelf face 11 moves, i.e., the number of rotations is determined depending on the speed of the flicking, and the shelf face 11 is moved according to the determination. For example, in a case where the speed of the flicking is low, the adjacent shelf face 11 may be displayed by moving one face, whereas, in a case where speed of the flicking is high, the shelf face 11 next to the adjacent shelf face 11, i.e., a shelf face 11 opposite to the shelf face 11 which is displayed before the rotation, is displayed.

What speed of flicking causes what degree of rotation of a shelf face 11 can be determined as appropriate by a manufacturer, provided that the images 12 to be displayed on the screen 20 after the rotation of the shelf face 11 have no missing part and that the rotating movement causes the shelf face 11, which is an object to be displayed, and the display surface to be parallel to each other. For example, as mentioned above, the number of faces to be moved by rotation may be obtained by using a prepared parameter for determining the mobility.

Further, the aforementioned scrolling movement or rotating movement can be made by carrying out a dragging operation, for example, instead of carrying out a flicking operation. Note here that the dragging operation is made by a gesture such that a user's finger touches the touch panel and moves in a desired direction while in contact with the touch panel. By rotating the bookshelf object 10 or scrolling a shelf face 11 by a dragging operation and releasing a finger from the touch panel when the image 12 of a desired book has been displayed on the screen, it is possible to display a different shelf face 11 or region.

For example, when a dragging operation for displaying the adjacent shelf face 11 is stopped in the middle of it, whether the rotation is to be continued further or is to be canceled is determined depending on a rotation angle of the bookshelf object 10 at the time when the dragging operation is stopped, and either of the currently displayed shelf face 11 or the adjacent shelf face 11 can be displayed. Further, in the case where an image 12 being displayed when a dragging operation has stopped during scrolling movement within a shelf face 11 has a missing part, scrolling up or down the shelf face 11 allows the image 12 to be displayed without any missing part.

A displayed shelf face 11 can be changed not only by the above methods, but also by pressing a shelf face selecting button 17 which allows direct selection of a shelf face 11 to be displayed. The shelf face selecting button 17 is displayed as an object at the top of the screen 20, and is to be selected by an operation via a touch panel. Also in this case, the rotation of the bookshelf object 10 is displayed on the screen 20 until a selected shelf face 11 is displayed. A direction in which the bookshelf object 10 rotates in this case can be determined depending on a previous operation by a user, previous rotation angle, setting by a manufacturer and/or the like.

Such an action of operating the bookshelf object 10 and a shelf face 11 being displayed on the screen 20 reminds a user of an action of operating a rotary bookshelf placed in a bookstore or the like. This allows a person who makes the first contact with the content display device 300 or a person unaccustomed to operating equipment to easily understand how to operate the content display device 300. That is, the content display device 300 can be said to have a user interface that is easy for the user to operate.

Unlike a revolving bookshelf placed in a bookstore or the like, for example when the user would like to see a lower part of the shelf face 11, the user can move, in an upward direction, only the shelf face 11 that he/she is looking at. Furthermore, the user can rotate the bookshelf object 10 with the shelf face 11 moved in the upward direction. Therefore, without bringing the viewpoint back to a former height when having rotated the bookshelf object 10 after looking a shelf face 11 at a different height, the user can see any of the other shelf faces 11 at the height at which the user previously saw the shelf faces 11.

(Other Animations)

In addition to rotating the bookshelf object 10 or scrolling a shelf face 11, the content display device 300 of the present embodiment is capable, for example, of enlarging or reducing a shelf face 11, rendering the bookshelf object 10 transparent, or the like.

(Displaying Enlarged/Reduced Images)

The content display device 300 is configured such that the number of images 12 that are displayed on the screen 20 can be changed by adjusting the size of a shelf face 11 with the shelf face 11 being displayed on the screen 20.

Figure 35:
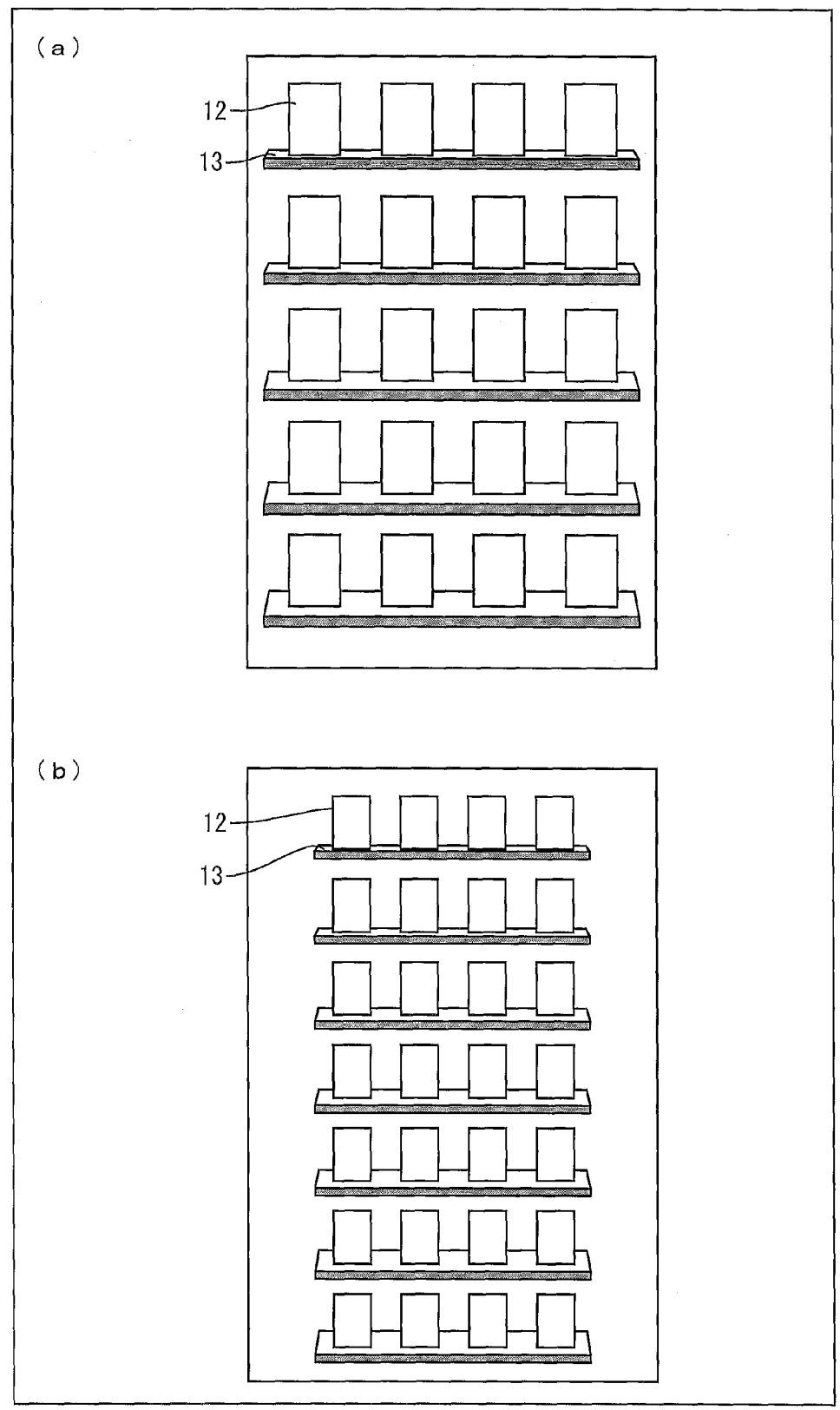
FIG. 35 is a view showing an example of a display pattern of thumbnail images that are displayed on the screen of the content display device shown in FIG. 29.

FIG. 35 is a view showing an example of a display pattern of thumbnail images 12 that are displayed on the screen 20. (a) of FIG. 35 shows how twenty thumbnail images 12 are displayed. (b) of FIG. 35 shows how twenty-eight thumbnail images 12 are displayed.

When an enlarged shelf face 11 is displayed, each of the thumbnail images 12 is easy to view. However, the number of thumbnail images 12 that can be displayed on the screen 20 at a time (such number is related to the number of shelves 13 that can be displayed at a time) is small. On the other hand, displaying a reduced shelf face 11 makes it possible to display many thumbnail images 12 at a time. Thus, the content display device 300 can change the scale ratio of a shelf face 11 as needed.

The number of thumbnail images 12 to be displayed on the screen 20 can be changed by input operation by a user. Specifically, a pinch-out operation on the touch panel enlarges a displayed shelf face 11 so that displayed thumbnail images 12 are enlarged. On the other hand, a pinch-in operation on the touch panel reduces the displayed shelf face 11 so that the displayed thumbnail images 12 are reduced.

Note here that the "pinch-out operation" is made by a gesture such that two fingers of a user etc. simultaneously touch an operation surface and the two fingers open while in contact with the operation surface. Further, the "pinch-in operation" is made by a gesture such that two fingers of a user etc. simultaneously touch the operation surface and the two fingers close while in contact with the operation surface.

(Process of Rendering Images Transparent)

In displaying on the screen 20 a rotation of the bookshelf object 10 and a scrolling of a shelf face 11, the content display device can carry out a process of rendering a shelf face 11 and a thumbnail image 12 partially semitransparent.

For example, when the transparency of a thumbnail image 12 on a shelf face 11 being displayed is 0%, the adjacent shelf faces 11 and the thumbnail images 12 attached thereto are not displayed on the screen 20.

Meanwhile, an increase in the transparency of a shelf face 11 causes the thumbnail images 12 arranged on the adjacent shelf faces 11 to seem transparent even when that shelf face 11 is on the front face. Furthermore, an increase in the transparency of a thumbnail image 12 causes the images 12 arranged on the adjacent shelf faces 11 to be better seen.

By thus rendering a shelf face 11 partially semitransparent or changing its semitransparency, the user can obtain an actual feeling of operating a three-dimensional object. Further, displaying an adjacent shelf face 11 allows the user to know what category the adjacent shelf face 11 is assigned or what books (thumbnail images) are placed on that shelf face 11, thus allowing the user to more easily find his/her desired book.

(Displaying a Subscribed Shelf)

Figure 36:
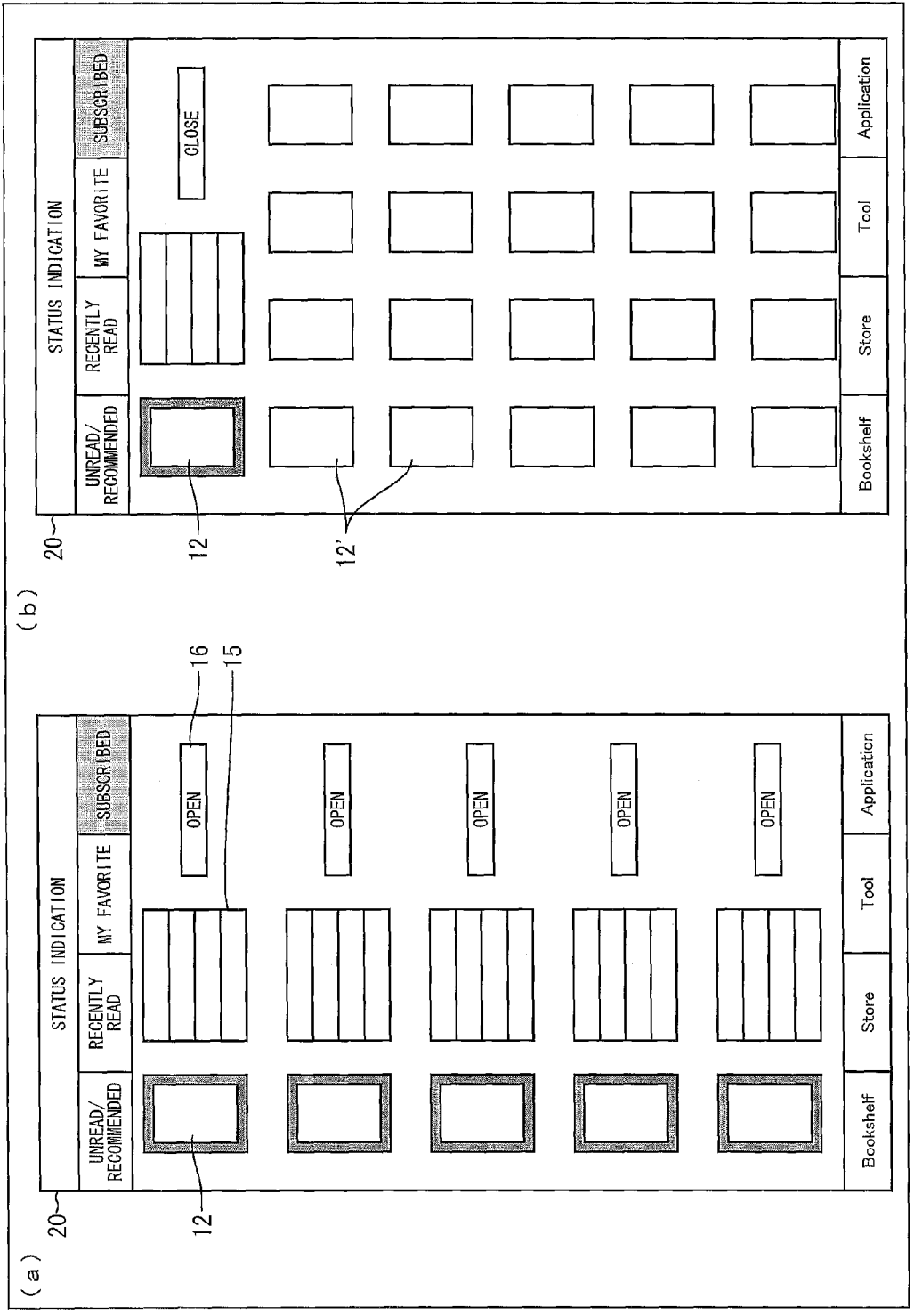
FIG. 36 is a view showing a display state of the screen displaying a shelf face assigned the category "Subscribed" in the three-dimensional object shown in FIG. 30.

The following description discusses, with reference to FIG. 36, how a shelf face 11 that corresponds to the category "Subscribed" is displayed.

FIG. 36 is a view showing a display state of the screen 20 displaying a shelf face assigned the category "Subscribed". The subscribed shelf face 11 is a shelf face in which periodicals such as weekly or monthly magazines are managed together with the back numbers.

As shown in (a) of FIG. 36, the subscribed shelf face 11 has a column of thumbnail images 12 arranged in a lengthwise direction on the left side of the shelf face 11. These thumbnail images 12 are thumbnail images 12 of the current numbers of subscribed magazines as if the latest issues were placed in a magazine rack. That is, this state is similar to a state in which magazines are arranged in a lengthwise direction on an actual bookshelf.

Displayed beside each of the thumbnail images 12 is a text display of information 15 on the corresponding subscribed magazine, such as the title of the magazine and the number of the latest issue. Provided beside the information 15 is a select button 16 for displaying back numbers of the magazine.

(b) of FIG. 36 is a view showing the screen 20 displaying a list of back numbers as a result of pressing of a select button 16 for a subscribed magazine on the screen 20 shown in (a) of FIG. 36.

When an input operation is done on a select button 16 for displaying back numbers, such a state transition is made that the display of those magazine racks other than the selected magazine rack disappears, that the display of the selected magazine rack moves to the top of the screen 20, and that a list of back numbers of the magazine is displayed by arranging thumbnail images 12' of the back numbers below the display of the selected magazine rack. This allows the user to select his/her desired back number from the list.

This action is similar to an actual action of opening a magazine rack on a bookshelf, taking out back numbers, and selecting the desired back number from among them. This allows the user to easily select his/her desired magazine even if the total number of magazines reaches into several hundreds.

(Summary of Embodiment)

As described above, the content display device of the present invention is preferably arranged such that the display section displays the plurality of images so that the plurality of images are arranged in column-wise and row-wise directions on each of the side faces.

Since the images are arranged in column-wise and row-wise directions on the three-dimensional object, the images each having no missing part can be displayed within the screen.

The content display device of the present invention is preferably arranged such that the contact detecting means detects a speed of the motion, and the mobility determining means determines the mobility on a basis of the speed thus detected by the contact detecting means.

According to the arrangement, by changing the speed of a user input to the input section, the distance by which the display region is moved by scrolling or moved by rotating can be changed. Therefore, even with a single operation, it is possible to move through one or two, for example, rows of images in accordance with the speed of the input operation. This allows the user to carry out an operation more comfortably.

The content display device of the present invention is preferably arranged such that the mobility determining means determines a moving speed of the display region on a basis of the speed of the motion.

According to the arrangement, a speed at which the display region is moved by scrolling or rotation can be changed by changing the speed of the user input on the input section. This makes it possible to, by raising the speed of contact for example in a case where the user would like to quickly find a pre-targeted piece of content, cause the desired piece of content to be displayed in a short period of time.

Meanwhile, in a case where the user (i) has not particularly decided on the content that he/she would like to view and (ii) would like to display pieces of content while searching for what piece of content is available, a search through the pieces of content can be performed comfortably by lowering the speed of contact.

The content display device of the present invention is preferably arranged such that the mobility determining means determines, on a basis of the speed of the motion, the number of rows which the display region moves by the scrolling carried out by the first display control means.

According to the arrangement, in a case where the display region is moved by scrolling in the longitudinal direction of the three-dimensional object, the content display device determines, on the basis of the speed of the motion, the number of rows by which the display region is moved. Furthermore, the plurality of images are arranged in the column-wise and row-wise directions, as described above. Consequently, images each having no missing part can be displayed within the screen even by moving the display region.

The content display device of the present invention is preferably arranged such that the mobility determining means determines, on a basis of the speed of the motion, the number of faces which the display region moves by the rotation carried out by the second display control means, and the second display control means causes the another screen image to be displayed so that a side face to be displayed as a result of the rotation is parallel to a display surface of the display section.

According to the arrangement, in a case where the display region is moved by rotation on a longitudinal axis of the three-dimensional object, the content display device determines, on the basis of the speed of the motion, the number of faces by which the display region is moved. That is, in a case where a user carries out an input operation in the direction orthogonal to the longitudinal direction of the three-dimensional object, a rotation movement is controlled at a face level.

Further, the side face to be displayed as a result of the rotation movement is displayed so as to be parallel to a display surface of the display section. That is, the side face to be displayed faces the front. Consequently, images each having no missing part can be displayed within the screen even by moving the display region.

The content display device of the present invention is preferably arranged such that respective different categories are assigned to the side faces, and the respective pieces of content represented by the plurality of images arranged on each of the side faces belong to a category assigned to the each of the side faces.

According to the arrangement, since each of the side faces contains pieces of content belonging to the same category, it becomes easier to manage the pieces of content and to search for a desired piece of content.

The content display device of the present invention may be arranged such that the pieces of content are electronic books and the plurality of images are thumbnail images of the electronic books.

As described above, according to the content display device of the present invention, a display region of a three-dimensional object on which a plurality of images are arranged can be changed by scrolling or rotation. This makes it possible to easily view a large number of content images. In a case where the images arranged on the three-dimensional object are ones corresponding to electronic books, a user can visually search for various books as if the user were at a bookstore.

[Program and Recording Medium]

The objective of the present invention can also be achieved by mounting to the content display device of any of First through Third Embodiments a computer-readable storage medium containing control program code, in order for the content display device to retrieve and execute the program code contained in the storage medium.

The storage medium may be, for example, a tape, such as a magnetic tape or a cassette tape; a magnetic disk, such as a floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The program code may be delivered to the content display device over a communications network connected to a network communication device. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth (Registered Trademark), 802.11 wireless, HDR, mobile telephone network, satellite line, or terrestrial digital network. The present invention encompasses a computer data signal embedded in a carrier wave in which the program code is embodied electronically.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

EXAMPLES

The following examples deals with a parameter for calculating a mobility of a display region on a content display device 300 of Embodiment 3, which display region is moved by a flicking operation. In the following examples, in order to find such a parameter, a user evaluated, for each of mobilities calculated based on a plurality of patterns of a parameter, how comfortable the flicking operation was.

In the following examples, expressions of "strong flicking operation" and "weak flicking operation" are used as terms indicating how strongly the flicking operation was carried out. In other words, these expressions indicate how quickly the flicking operation was carried out. That is, "strong flicking operation" indicates a fast flicking operation, and "weak flicking operation" indicates a slow flicking operation. A speed (a strength) at which the flicking operation was carried out was obtained by use of a value of an argument "velocityX" of an "onFling" method which is called in an "OnGestureListener" interface.

Example 1

Evaluation Experiment with Horizontal Flicking Operation

First, an optimum parameter for a horizontal flicking operation was evaluated, which horizontal flicking operation was carried out to rotate a bookshelf object. The optimum parameter for the horizontal flicking operation was obtained on the basis of the following 3 sorts of experiment.

Example 1-1

Research for Maximum Number of Faces Rotated with Strong Flicking Operation)

Example 1-1 deals with a case where the bookshelf object was rotated with a strong flicking operation. In Example 1-1, research was carried out to find a preferable number of faces rotated with the strong flicking operation, which number allows a user to feel comfortable when the user carries out the strong flicking operation.

Specifically, different numbers were set as the number of faces rotated with the strong flicking operation (a speed of not less than 3000 (pixel/sec)), and the bookshelf object was rotated with the strong flicking operation for each of the different numbers thus set. As to how comfortable the strong flicking operation was, 7 subjects carried out (i) five-grade evaluation and (ii) ranking. Note that the five-grade evaluation was such that "5" indicated evaluation of the most comfortable operation, "4" indicated evaluation of the second most comfortable operation, . . . and "1" indicated evaluation of the least comfortable operation.

The bookshelf object had a rectangular parallelepiped shape having 4 side faces. A time period that was necessary to rotate the bookshelf object was not considered in the evaluation. The strong flicking operation was carried out with an index finger of a right hand, while a terminal was held with a left hand. As the parameter determining the number of faces rotated with the strong flicking operation, 4 sorts of parameter, shown in (a) of FIG. 37, were prepared. A frame rate was set to 30 fps. (a) of FIG. 37 is a table showing, for each of the parameters, (i) the number of faces rotated with the strong flicking operation and (ii) a time period during which the bookshelf object was rotated with the strong flicking operation.

Figure 37:
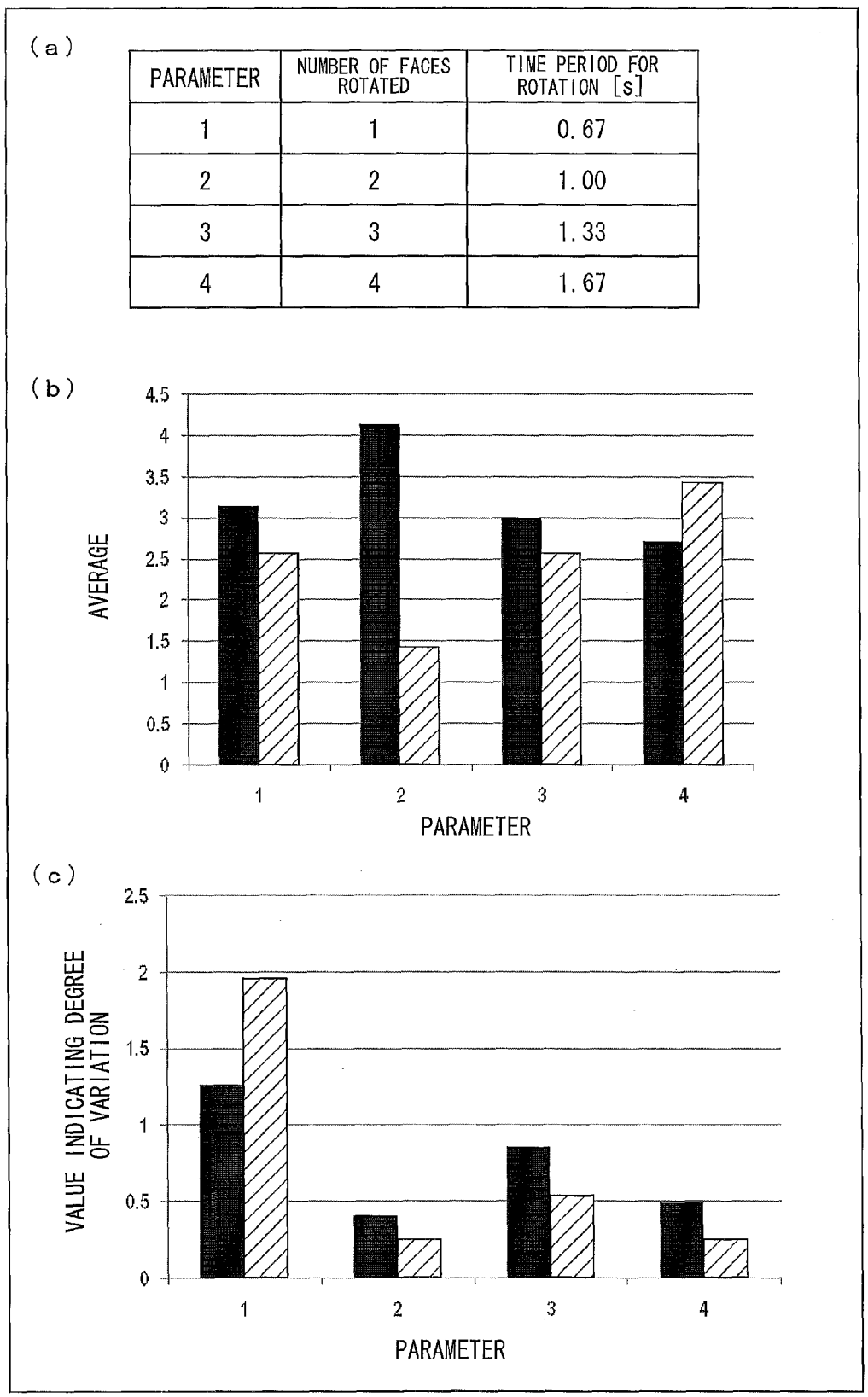
FIG. 37 is a view for explaining an experiment for evaluating an optimum parameter for a horizontal flicking operation in an Example of the present invention.

As a result, Parameter 2, with which the number of faces rotated with the strong flicking operation was 2, had the highest evaluation and the highest rank, and has less variation in evaluation and less variation in the ranking (see (b) and (c) of FIG. 37). (b) of FIG. 37 shows, for each of the parameters, (i) an average (a left black bar) of five-grade evaluation carried out by the subjects and (ii) an average (a right bar with diagonal lines) of the ranking carried out by the subjects. (c) of FIG. 37 shows, for each of the parameters, (i) a value (a left black bar) indicating a degree of variation in the five-grade evaluation carried out by the subjects and (ii) a value (a right bar with diagonal lines) indicating a degree of variation in the ranking carried out by the subjects.

Example 1-2

Research for Threshold Value of Speed for Strong Flicking Operation and Weak Flicking Operation Example 1-2 deals with a case where the same bookshelf object having a rectangular parallelepiped shape as that of Example 1-1 was rotated with a strong flicking operation and a weak flicking operation. In Example 1-2, research was carried out to find a preferable threshold value of a speed for the strong flicking operation and the weak flicking operation, which threshold value allows a user to feel comfortable when the user rotates the bookshelf object with the strong flicking operation or the weak flicking operation.

Specifically, different values were set as the threshold value of the speed for (i) the strong flicking operation with which the bookshelf was rotated by 2 faces and (ii) the weak flicking operation with which the bookshelf was rotated by 1 face, and the bookshelf object was rotated with a flicking operation for each of the different values thus set. As to how comfortable the flicking operation was, 6 subjects carried out (i) five-grade evaluation and (ii) ranking. The five-grade evaluation was such that "5" indicated evaluation of the most comfortable operation, "4" indicated evaluation of the second most comfortable operation, . . . and "1" indicated evaluation of the least comfortable operation.

Note that a time period which was necessary to rotate the bookshelf object was not considered in the evaluation. The flicking operation was carried out with an index finger of a right hand while a terminal was held with a left hand. As the parameter determining the threshold value (pixel/sec) of the speed for the strong flicking operation and the weak flicking operation, 4 sorts of parameter, shown in (a) of FIG. 38, were prepared. A frame rate was set to 30 fps. A time period during which the bookshelf object was rotated by 1 face was set to 0.67 (s), and a time period during which the bookshelf object was rotated by 2 faces was set to 1 (s). (a) of FIG. 38 is a table showing, for each of the parameters, the threshold value of the speed for the strong flicking operation and the weak flicking operation.

Figure 38:
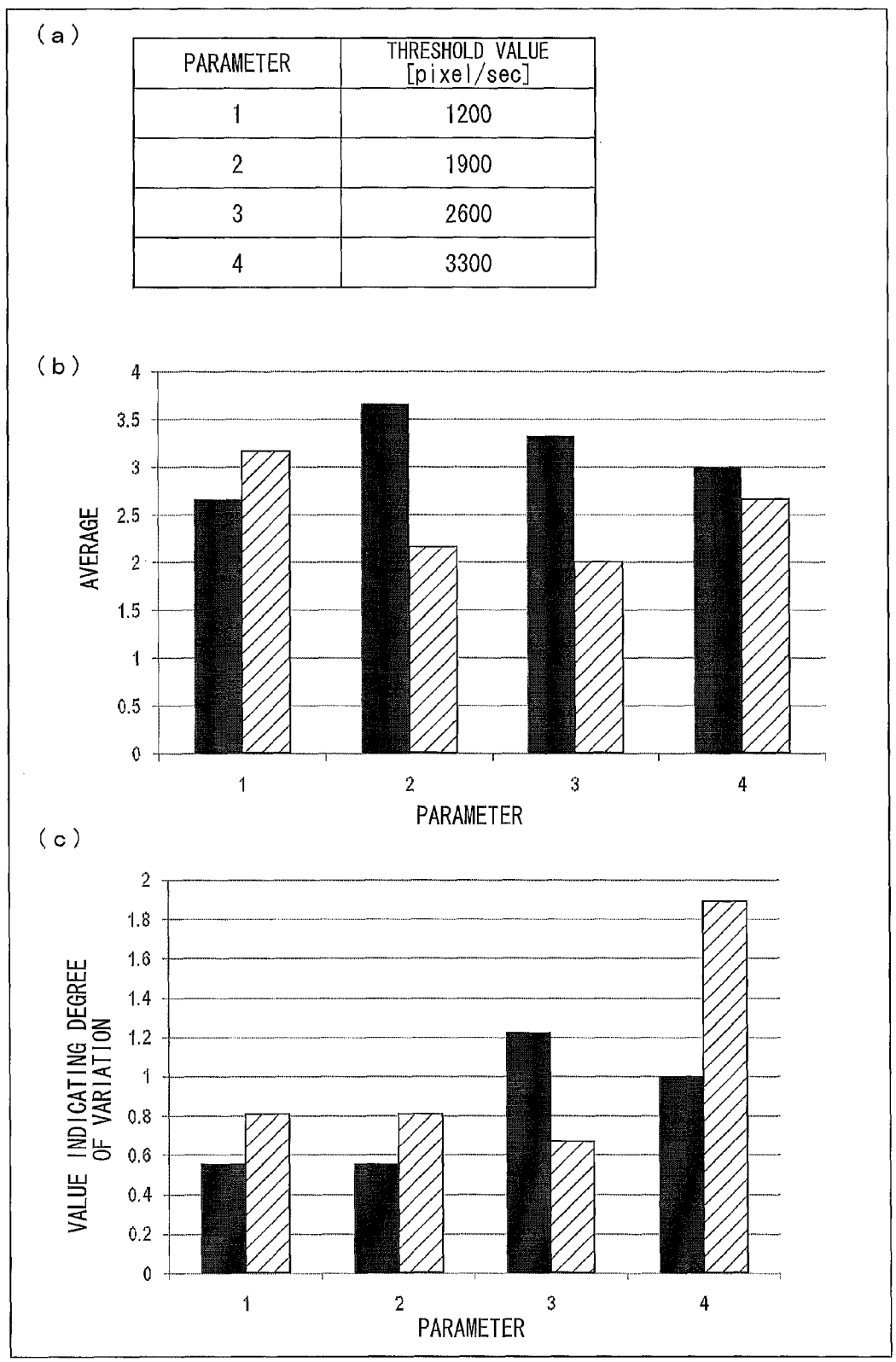
FIG. 38 is a view for explaining an experiment for evaluating an optimum parameter for a horizontal flicking operation in an Example of the present invention.

As a result, Parameter 2 had high evaluation as to the threshold of the speed for the strong flicking operation and the weak flicking operation (see (b) and (c) of FIG. 38). (b) of FIG. 38 shows, for each of the parameters, (i) an average (a left black bar) of the five-grade evaluation carried out by the subjects and (ii) an average (a right bar with diagonal lines) of the ranking carried out by the subjects. (c) of FIG. 38 shows, for each of the parameters, (i) a value (a left black bar) indicating a degree of variation in the five-grade evaluation carried out by the subjects and (ii) a value (a right bar with diagonal lines) indicating a degree of variation in the ranking carried out by the subjects.

Example 1-3

Research for Time Period for Rotation Animation)

Example 1-3 deals with a case where the same bookshelf object having a rectangular parallelepiped shape as that of Example 1-1 was rotated. In Example 1-3, research was carried out to find a preferable time period for rotation animation, which time period allows a user to feel comfortable.

Specifically, different values were set as the time period for rotation animation, and the bookshelf object was rotated with a flicking operation for each of the different values thus set. As to how comfortable the flicking operation was, 6 subjects carried out (i) five-grade evaluation and (ii) ranking. The five-grade evaluation was such that "5" indicated evaluation of the most comfortable operation, "4" indicated evaluation of the second most comfortable operation, . . . and "1" indicated evaluation of the least comfortable operation.

The flicking operation was carried out with an index finger of a right hand while a terminal was held with a left hand. As the parameter determining the time period for rotation animation, 9 sorts of parameter, shown in (a) of FIG. 39, were prepared. A frame rate was set to 30 fps. The number of faces rotated with a strong flicking operation was set to 2. A threshold value of a speed for the strong flicking operation and a weak flicking operation was set to 1900 (pixel/sec). (a) of FIG. 39 is a table showing a relationship between a time period for rotation animation and a parameter number.

Figure 39:
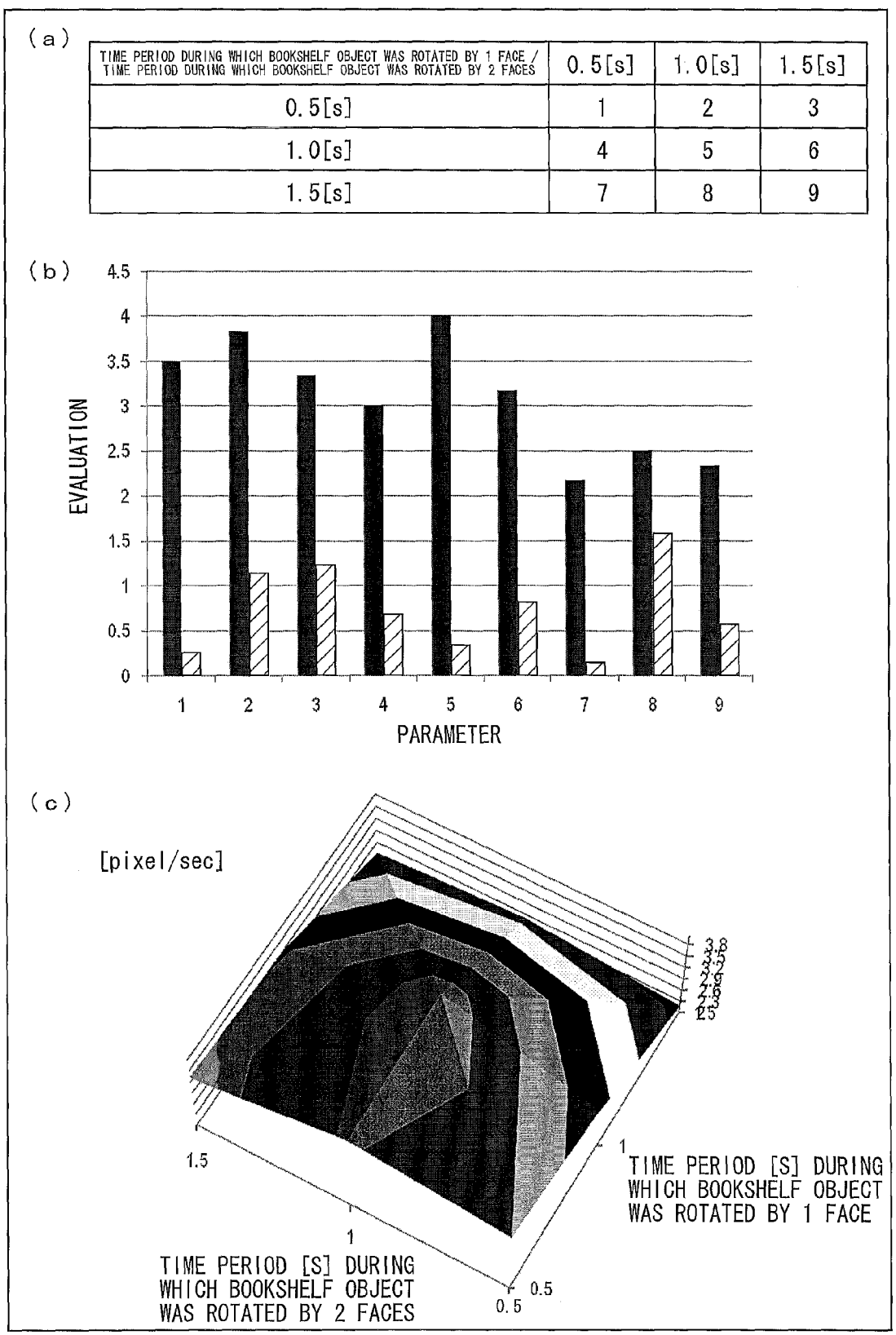
FIG. 39 is a view for explaining an experiment for evaluating an optimum parameter for a horizontal flicking operation in an Example of the present invention.

As a result, for both the time period during which the bookshelf object was rotated by 1 face and the time period during which the bookshelf object was rotated by 2 faces, a time period of 1 second had high evaluation (see (b) and (c) of FIG. 39). (b) of FIG. 39 shows, for each of the parameters, (i) an average (a left black bar) of the five-grade evaluation carried out by the subjects and (ii) an average (a right bar with diagonal lines) of the ranking carried out by the subjects. (c) of FIG. 39 shows, for each of the parameters, (i) an average (s) of evaluation for the time period during which the bookshelf object was rotated by 1 face, and (ii) an average (s) of evaluation for the time period during which the bookshelf object was rotated by 2 faces.

Example 1-4

Research for Time Period for Rotation Animation

In Example 1-4, research was carried out to find, more specifically (as compared with Example 1-3), a preferable time period for rotation animation, which time period allows a user to feel comfortable.

Specifically, in the same manner as Example 1-3, different values were set as the time period for rotation animation, and a bookshelf object was rotated with a flicking operation for each of the different values thus set. As to how comfortable the flicking operation was, 7 subjects carried out (i) five-grade evaluation and (ii) ranking. The five-grade evaluation was such that "5" indicated evaluation of the most comfortable operation, "4" indicated evaluation of the second most comfortable operation, . . . and "1" indicated the least comfortable operation.

The flicking operation was carried out with an index finger of a right hand while a terminal was held with a left hand. As the parameter determining the time period for rotation animation, 6 sorts of parameter, shown in (a) of FIG. 40, were prepared. A frame rate was set to 30 fps. The number of faces rotated with a strong flicking operation was set to 2. A threshold value of a speed for the strong flicking operation and a weak flicking operation was set to 1900 (pixel/sec). (a) of FIG. 40 is a table showing a relationship between a time period for rotation animation and a parameter number.

Further, each of Parameters 5 and 6 was such that the time period for rotation animation was linearly changed in accordance with a strength of the flicking operation. (b) of FIG. 40 is a graph showing a relationship between a strength of a flicking operation with the use of Parameter 5 and a time period during which the bookshelf o bject was rotated with the flicking operation with the use of Parameter 5. Line 32 indicates a relationship between a time period during which the bookshelf object was rotated by 1 face, and a strength of the flicking operation. Line 33 indicates a relationship between a time period during which the bookshelf object was rotated by 2 faces, and a strength of the flicking operation.

Figure 40:
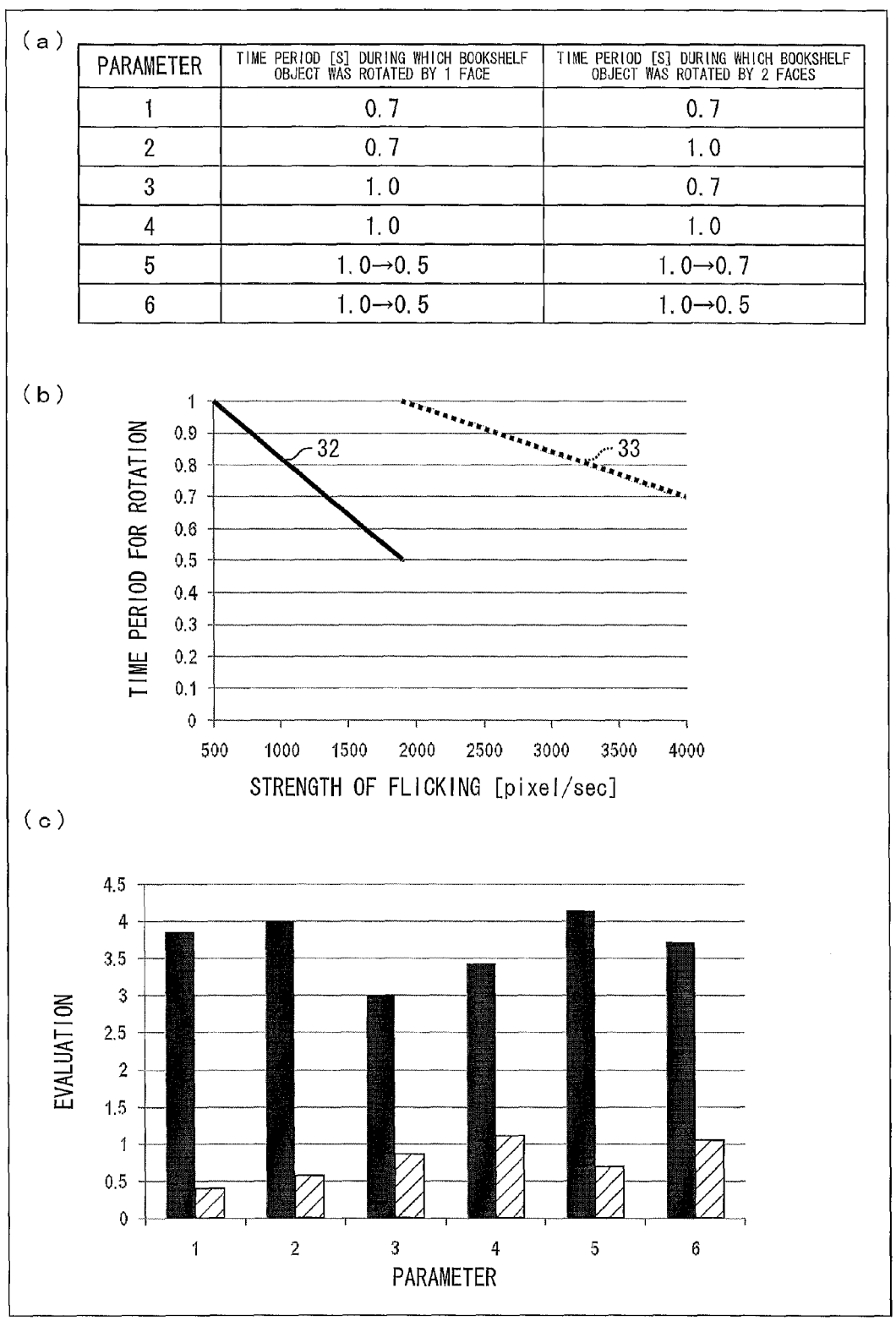
FIG. 40 is a view for explaining an experiment for evaluating an optimum parameter for a horizontal flicking operation in an Example of the present invention.

As a result, evaluation was high for Parameter 5 which was such that (i) the time period during which the bookshelf object was rotated by 1 face was changed linearly from 1.0 second to 0.5 second in accordance with a strength of the flicking operation, and (ii) the time period during which the bookshelf object was rotated by 2 faces was changed linearly from 1.0 second to 0.7 second in accordance with a strength of the flicking operation (see (c) of FIG. 40). (c) of FIG. 40 shows, for each of the parameters, (i) an average (a left black bar) of the five-grade evaluation carried out by the subjects and (ii) a value (a right bar with diagonal lines) indicating a degree of variation in the five-grade evaluation carried out by the subjects.

Figure 41:
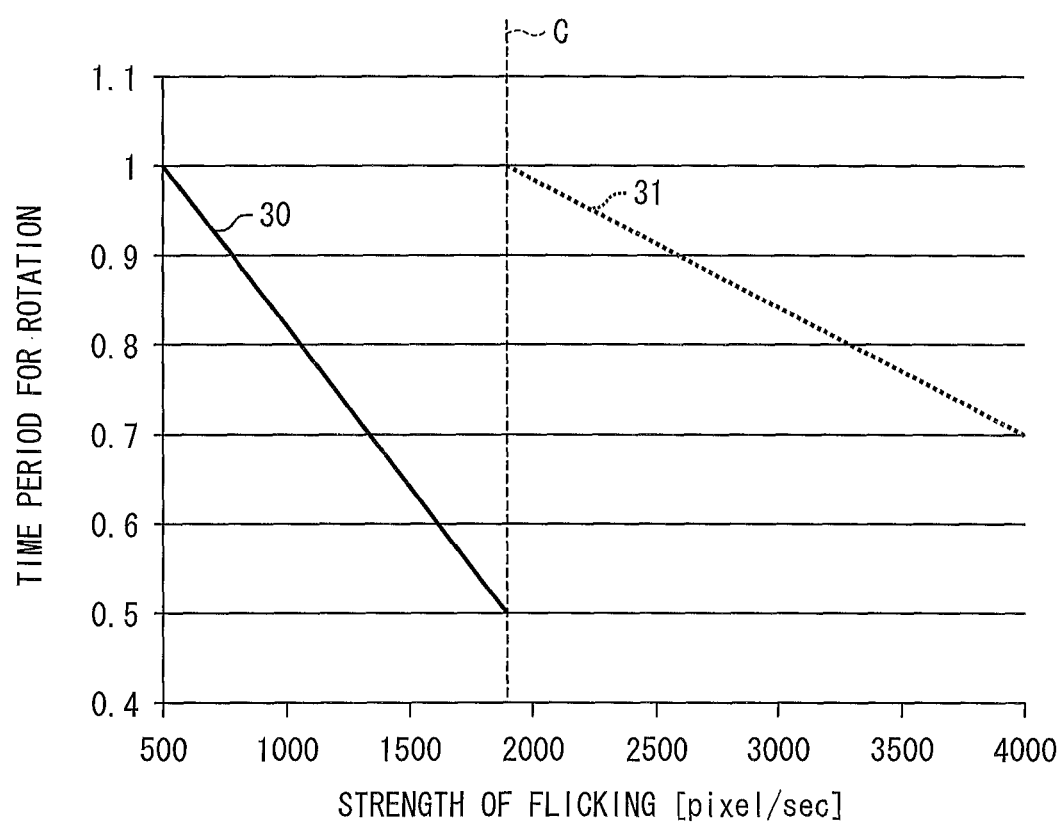
FIG. 41 is a view for explaining an experiment for evaluating an optimum parameter for a horizontal flicking operation in an Example of the present invention.

On the basis of the results described above, it was found, for the horizontal flicking operation, that a user felt comfortable in a case where (i) the maximum number of faces rotated with the strong flicking operation was set to 2, (ii) the threshold value of the speed for the strong flicking operation (with which the bookshelf object was rotated by 2 faces) and the weak flicking operation (with which the bookshelf object was rotated by 1 face) was set to 1900 (pixel/sec), and (iii) the time period during which the bookshelf object was rotated was determined by use of such a parameter that the time period during which the bookshelf object was rotated was changed linearly in accordance with a strength of the flicking operation. FIG. 41 is a graph showing a relationship between (i) a strength of the flicking operation, (ii) the number of planes rotated with the flicking operation, and (iii) a time period during which the bookshelf object was rotated. In FIG. 41, (i) Line 30 indicates a relationship between a strength of the weak flicking operation with which the bookshelf object was rotated by 1 face, and a time period during which the bookshelf object was rotated with the weak flicking operation, (ii) Line 31 indicates a relationship between a strength of the strong flicking operation with which the bookshelf object was rotated by 2 faces, and a time period during which the bookshelf object was rotated with the strong flicking operation, and (iii) Line Segment C indicates a threshold value.

Example 2

Evaluation Experiment with Lengthwise Flicking Operation

Next, an optimum parameter for a lengthwise flicking operation was evaluated, which lengthwise flicking operation was carried out to comfortably search a bookshelf object for a target book. The optimum parameter for the lengthwise flicking operation was obtained on the basis of the following 4 sorts of experiment.

Example 2-1

In Example 2-1, 9 parameters for the lengthwise flicking operation were prepared, and each of the parameters was evaluated in five grades as to how comfortable a user felt as in Example 1.

Specifically, 100 books were arranged on a bookshelf object, and 7 subjects evaluated how comfortable they felt when scrolling by a flicking operation to search for a target book. Note that 3 (in a horizontal direction)×3 (in a vertical direction) books were displayed on the screen and that the flicking operation was carried out with an index finger of a right hand while a terminal was held with a left hand.

Three parameters were prepared for each of an initial speed and an attenuation rate. A value of a slow initial speed was set to 0.00252v, a value of a middle initial speed was set to 0.0042v, and a value of a fast initial speed was set to 0.00588v. Note that "v" is a flicking speed. (pixel/sec). The attenuation ratio was applied to each frame speed. A value of a low attenuation rate was set to 0.9, a value of a middle attenuation rate was set to 0.7, and a value of a slow attenuation rate was set to 0.5. Note that the frame rate was not fixed.

Figure 42:
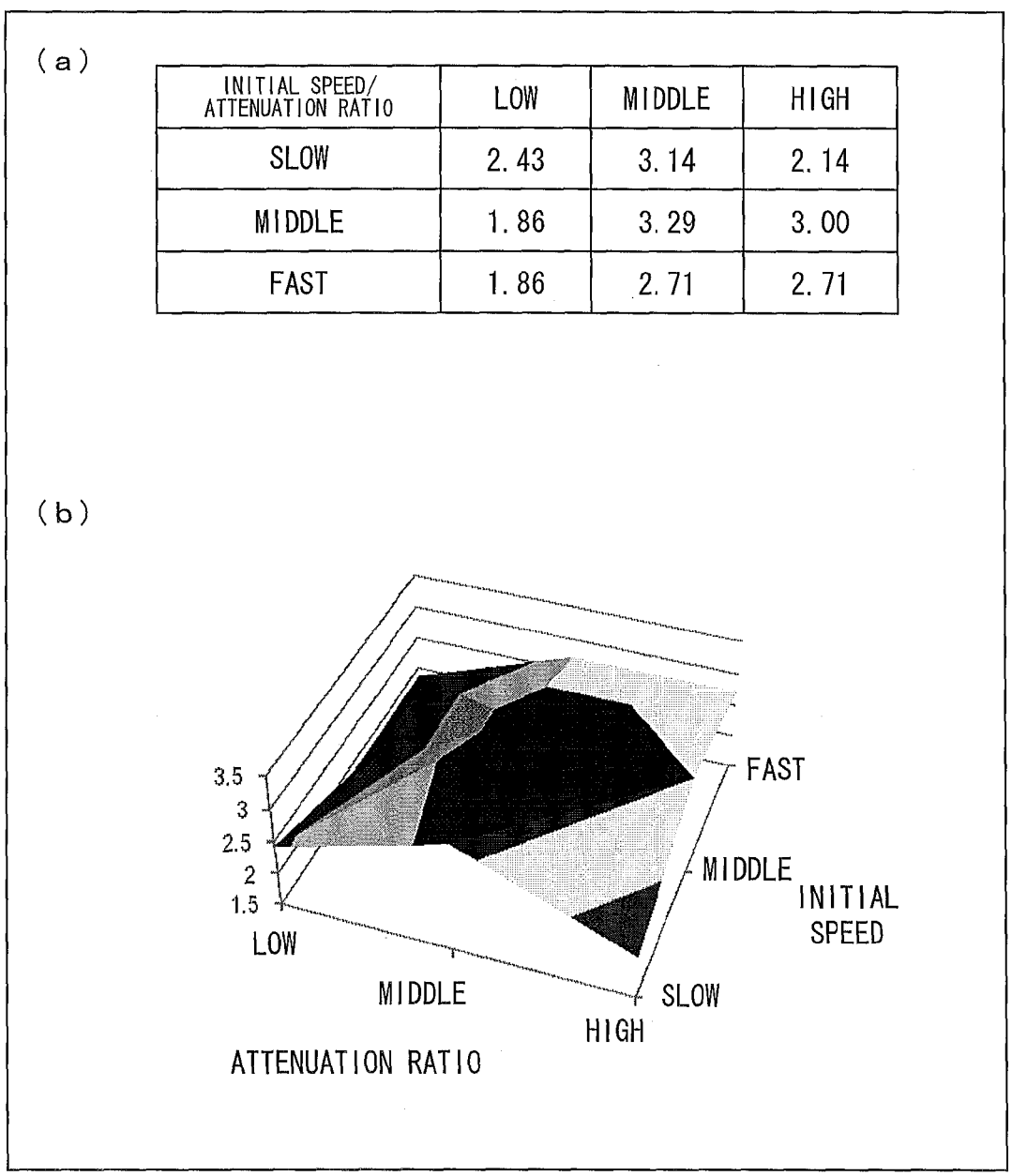
FIG. 42 is a view for explaining an experiment for evaluating an optimum parameter for a lengthwise flicking operation in an Example of the present invention.

As a result, as to both the initial speed and the attenuation ratio, the middle one got the highest evaluation, as shown in FIG. 42. (a) of FIG. 42 is a table showing, for each of the parameters, an average of the five-grade evaluation carried out by the subjects, and (b) of FIG. 42 is a diagram showing, for each of the parameters, an average of the five-grade evaluation carried out by the subjects.

Example 2-2

In Example 2-2, 9 parameters were prepared as in Example 2-1. For each of these parameters, a time period taken for a user to find out a target book was measured. Further, each of the parameters was evaluated in five grades as to how comfortable the user felt.

Specifically, 100 books were arranged on a bookshelf object, and (i) time periods taken for 7 subjects to find out a target book placed on the 20th shelf of 34 shelves by scrolling with a flicking operation and (ii) how comfortable they felt were examined. Note that 3 (in the horizontal direction)×3 (in the vertical direction) books were displayed on the screen and that the flicking operation was carried out with an index finger of a right hand while a terminal was held with a left hand. The frame rate was not fixed.

Figure 43:
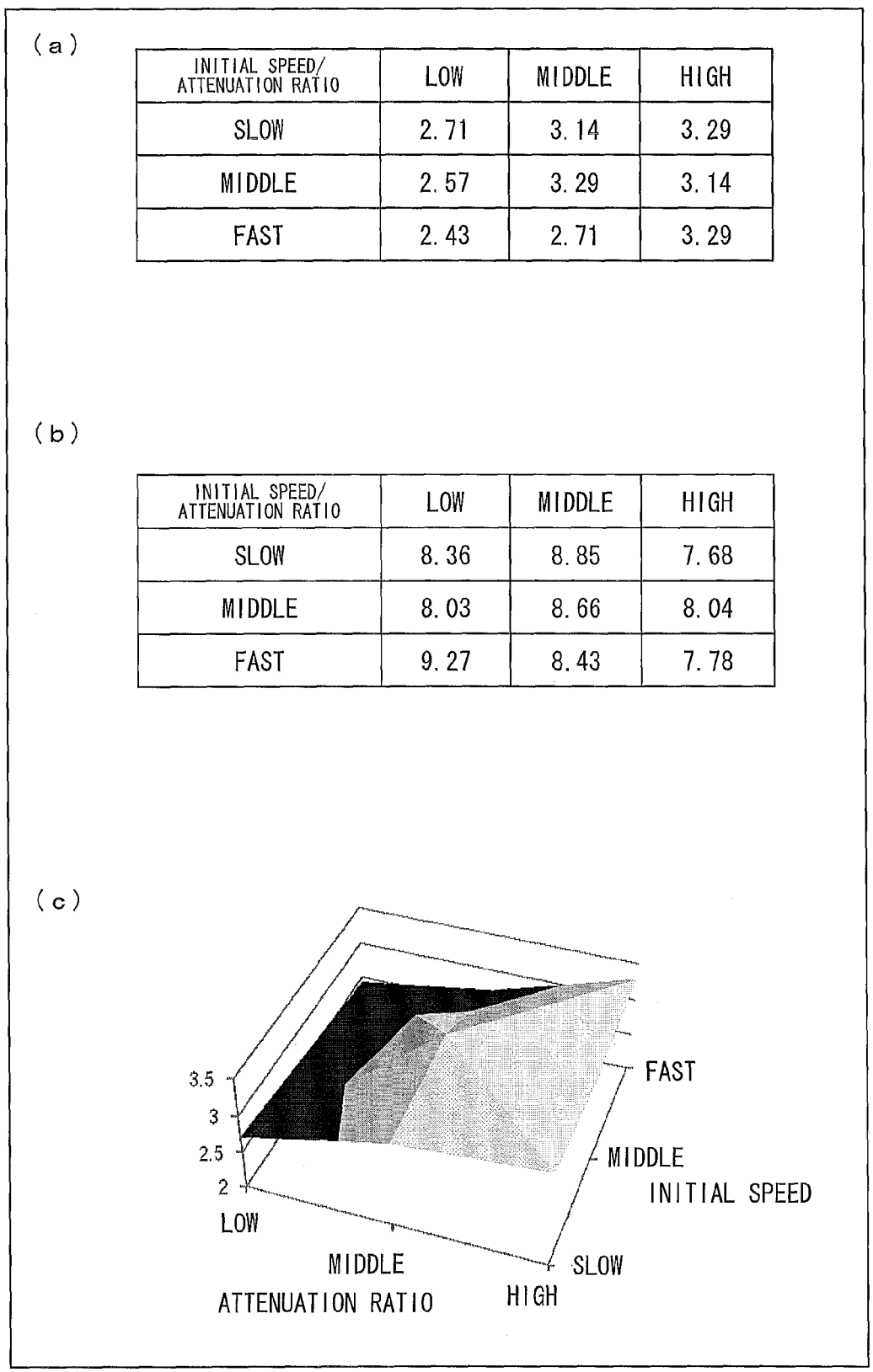
FIG. 43 is a view for explaining an experiment for evaluating an optimum parameter for a lengthwise flicking operation in an Example of the present invention.

As a result, three parameters of (initial speed: middle, attenuation ratio: middle), (initial speed: slow, attenuation ratio:high), and (initial speed: fast, attenuation ratio:high) got high evaluation, as shown in FIG. 43. (a) of FIG. 43 is a table showing, for each of the parameters, an average of the five-grade evaluation carried out by the subjects, (b) of FIG. 43 is a table showing, for each of the parameters, a time period taken for the subjects to find out the target book, and (c) of FIG. 43 is a diagram showing, for each of the parameters, an average of the five-grade evaluation carried out by the subjects.

Example 2-3

In Example 2-3, the three parameters that got high evaluation in Example 2-2 were prepared. For each of these three parameters, a time period taken for a user to find out a target book was measured and how comfortably the user felt was evaluated in five grades.

Specifically, 100 books were arranged on a bookshelf object, and (i) time periods taken for 7 subjects to find out a target book placed on the 20th shelf of 34 shelves by scrolling with a flicking operation and (ii) how comfortable they felt were examined. Note that 3 (in the horizontal direction)×3 (in the vertical direction) books were displayed on the screen and that the flicking operation was carried out with an index finger of a right hand while a terminal was held with a left hand. The frame rate was not fixed.

The initial speed and the attenuation ratio of the parameters were converted into the number of shelves to be moved through and the number of frames taken for the movement. The conversion was made by visually evaluating actual animation and selecting the closest values.

Specifically, as to a parameter 1, the number of shelves to be moved through was set to 0.00245v and the number of frames taken for the movement was set to 15+0.002v. As to a parameter 2, the number of shelves to be moved through was set to 0.00065v and the number of frames taken for the movement was set to 7+0.001v. As to a parameter 3, the number of shelves to be moved through was set to 0.00145v and the number of frames taken for the movement was set to 9+0.001v. Note that "v" is a flicking speed (pixel/sec).

Figure 44:
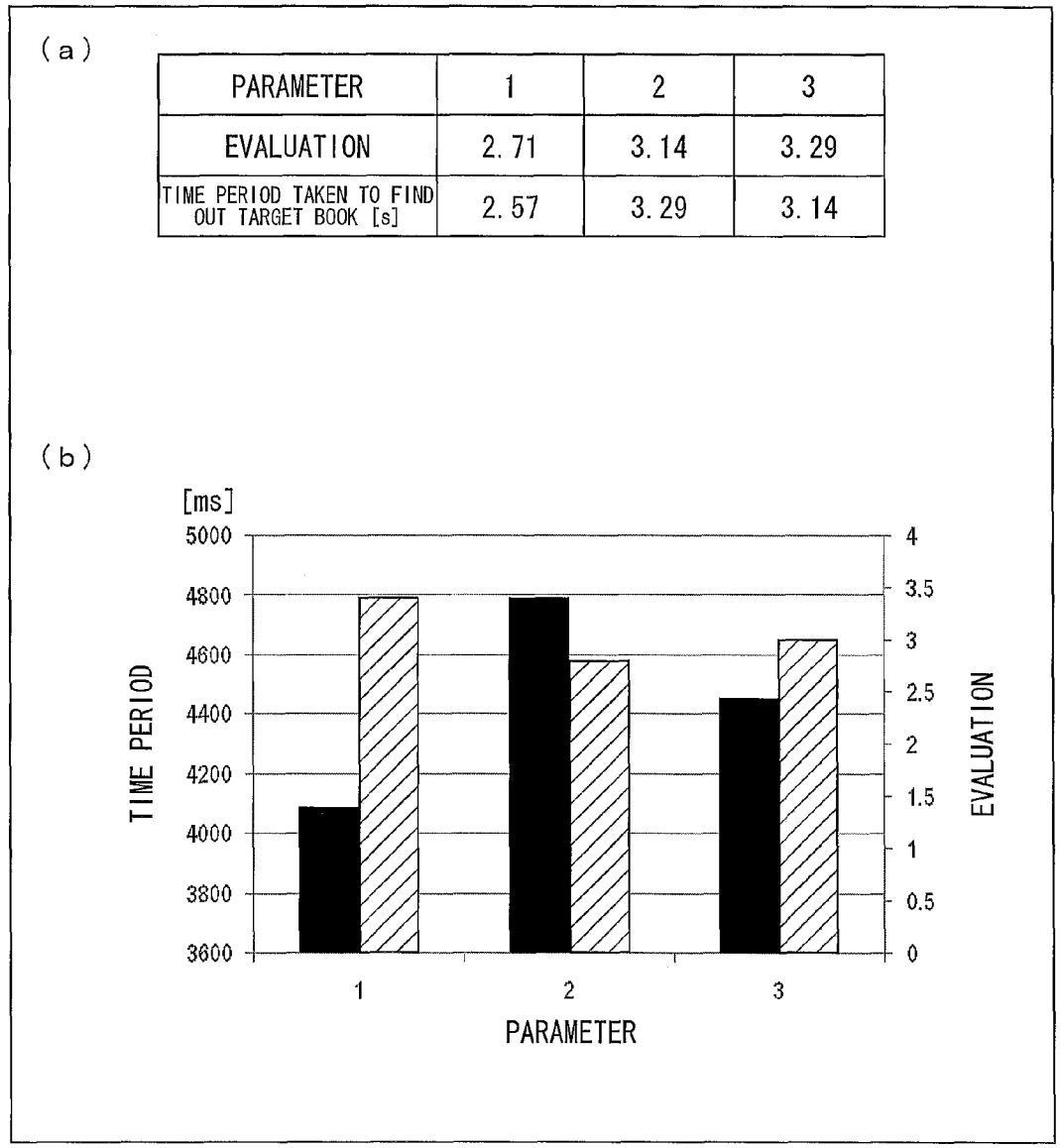
FIG. 44 is a view for explaining an experiment for evaluating an optimum parameter for a lengthwise flicking operation in an Example of the present invention.

As a result, the parameter 1 got the highest evaluation from the subjects and was shortest in time period taken for the subjects to find out the target book, as shown in FIG. 44. (a) of FIG. 44 is a table showing, for each of the parameters, (i) an average of time periods taken for the subjects to find out the target book and (ii) the five-grade evaluation carried out by the subjects, and (b) of FIG. 44 is a graph showing, for each of the parameters, (i) an average (a left black bar) of time periods taken for the subjects to find out the target book and (ii) a value (a right bar with diagonal lines) of the five-grade evaluation carried out by the subjects.

Example 2-4

In Example 2-4, the number of frames taken for the movement was converted into a time period taken for the movement. As such, for each of the three parameters used in Example 2-3, a time period taken for a user to find out a target book was measured and how comfortably the user felt was evaluated in five grades.

Specifically, 100 books were arranged on a bookshelf object, and (i) time periods taken for 7 subjects to find out a target book placed on the 18th shelf of 25 shelves by scrolling with a flicking operation and (ii) how comfortable they felt were examined. Note that 4 (in the horizontal direction)×5 (in the vertical direction) books were displayed on the screen and that the flicking operation was carried out with an index finger of a right hand while a terminal was held with a left hand. The frame rate was fixed to 30 fps.

As for the values of the parameters, the number of frames taken for the movement in the parameters used in Example 2-3 was converted into a time period taken for the movement by fixing the frame rate to 30 fps. Specifically, as to a parameter 1, the number of shelves to be moved through was set to 0.00065v, and a time period (s) taken for the movement was set to 0.23+0.000033v. As to a parameter 2, the number of shelves to be moved through was set to 0.00245v, and a time period (s) taken for the movement was set to 0.5+0.000067v. As to a parameter 3, the number of shelves to be moved through was set to 0.00145v, and a time period (s) taken for the movement was set to 0.3+0.000033v. Note that "v" is a flicking speed (pixel/sec).

Figure 45:
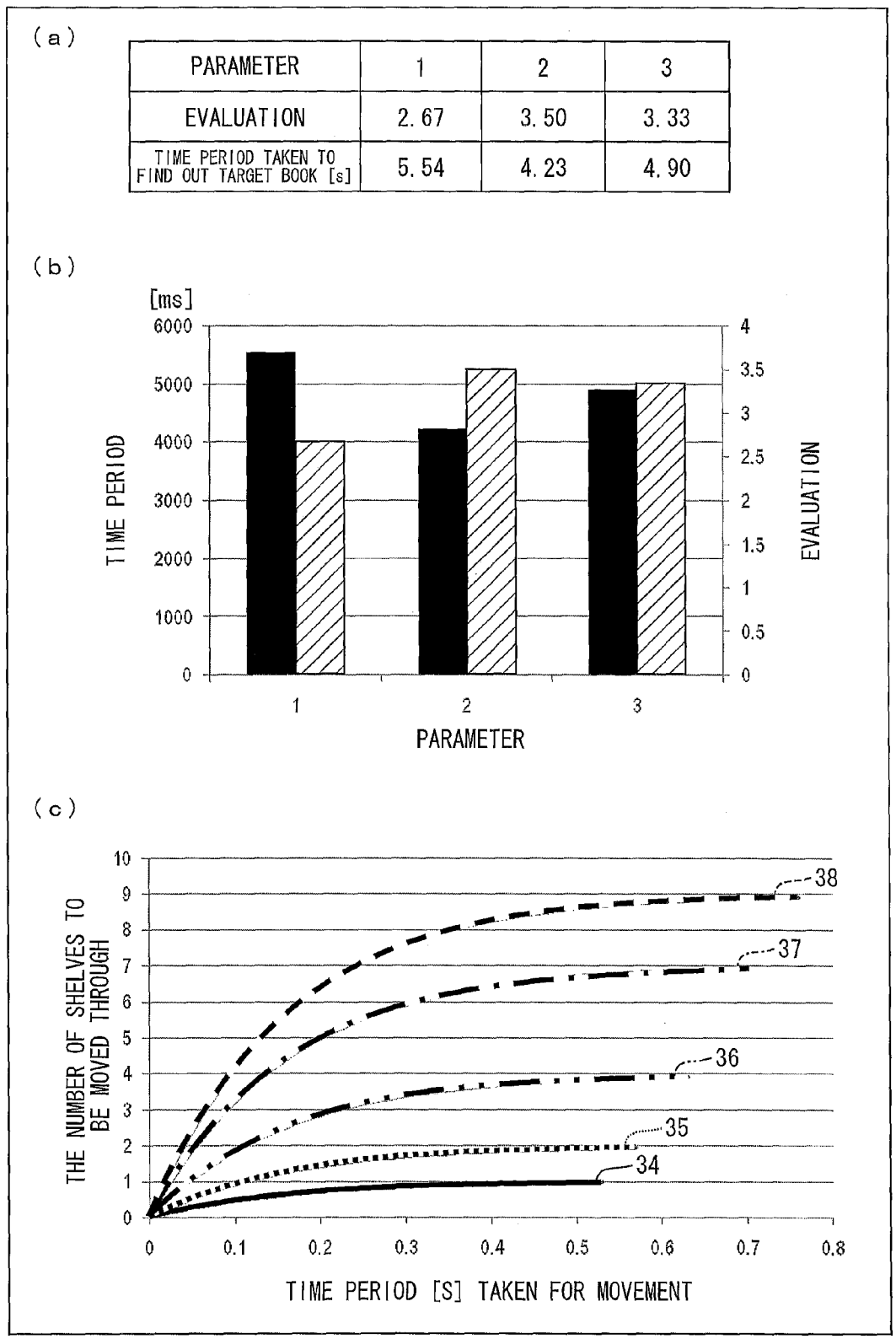
FIG. 45 is a view for explaining an experiment for evaluating an optimum parameter for a lengthwise flicking operation in an Example of the present invention.

As a result, the parameter 2 got the highest evaluation from the subjects and was shortest in time period taken for the subjects to find out the book. (a) of FIG. 45 is a table showing, for each of the parameters, (i) an average of time periods taken for the subjects to find out the target book and (ii) a value of the five-grade evaluation carried out by the subjects, and (b) of FIG. 45 is a graph showing, for each of the parameters, (i) an average (a left black bar) of time periods taken for the subjects to find out the target book and (ii) a value (a right bar with diagonal lines) of the five-grade evaluation carried out by the subjects. (c) of FIG. 45 is a graph showing a relationship between (i) a time period taken for the movement and (ii) the number of shelves to be moved through, for each flicking speed of the parameter 2. In (c) of FIG. 45, (i) Line 34 indicates a flicking speed of 4000 (pixel/sec), (ii) line 35 indicates a flicking speed of 3000 (pixel/sec), (iii) line 36 indicates a flicking speed of 2000 (pixel/sec), (iv) line 37 indicates a flicking speed of 1000 (pixel/sec), and (v) line 38 indicates a flicking speed of 500 (pixel/ sec).

INDUSTRIAL APPLICABILITY

The present invention is applicable to a terminal that displays, on a screen, thumbnail images of a plurality of pieces of content, icons, and the like. The present invention is suitably applicable especially to a mobile electronic book terminal such as an electronic book viewer.

REFERENCE SIGNS LIST

1: Content display device
10: Bookshelf object (three-dimensional object)
11, 11a-11d: Shelf face (side face)
12, 12', 12a-12c, 11e, 11f: Thumbnail image (image)
13: Shelf
14: Region (display part)
17: Shelf face selecting button
18: Operation input button
19: Close button
20: Screen
21: Status indication
101: Input processing section
102: Network processing section
103: Activation processing section
104: Book data management section
105: Display information management section
106: Rotation processing section (rotation processing means)
107: Scrolling processing section (scrolling processing means)
108: Book list display processing section (display processing means)
109: Book content display processing section
110: Output processing section (display processing means)
111: Input operation section (input section)
112: Display section (screen)
113: Communication section
200: Content display device
201: Processing section
202: Input operation section
203: Display section
211: Input processing section
212: Rotation processing section
213: Scrolling processing section
214: Display region determining section (determining means)
215: Thumbnail image deleting section (deleting means)
216: Thumbnail image loading section (image reading means)
217: Three-dimensional processing section
218: Display processing section (display control means)
219: Book data management section
220: Memory (first memory)
221: Cache (second memory)
222: Stack
223: Image loader
300: Content display device
301: Input section

302: Contact detecting section (contact detecting means)
303: Book display processing section
304: Book database
305: Network management section
306: Mobility determining section (mobility determining means)
307: Scrolling control section (first display control means)
308: Rotation control section (second display control means)
309: Object display processing section
310: Output processing section
319: Display section

The invention claimed is:

1. A content display device comprising:
a screen;
a display processing unit configured to cause a part of a virtual three-dimensional object to be displayed on the screen, the virtual three-ditliensional object being a polygonal column having side faces on each of which a plurality of images representing respective piece of content are arranged;
an input section;
a rotation processing unit configured to control, in a case where a first input operation instructing a display of a side face different from a currently-displayed side the is carried out via the input section, the display processing unit to display (i) rotation of the virtual three-dimensional object on a central axis of the polygonal column and (ii) the side face to he displayed as a result of the rotation; and
a scrolling processing unit configured to control, in a case where a second input operation instructing a display of the ourrently-displayed side face in a different position in a direction parallel to the central axis is carried out via the input section, the display processing unit to display (i) a scrolling movement of the currently-displayed side face in the direction and (ii) a part of the currentty-diplayed side face which part is to be displayed as a result of the scrolling movement, wherein
the scrolling processing unit controls a display position of each of the side faces in the direction independently of the other side faces, and
the rotation processing unit controls the display processing unit so that a side which is to be displys as a result of rotation of the virtual three-dimensional object is displayed at a position in the direction at which position the side face was previously displayed as a result of the scrolling movement in the direction.

2. The content display device according to claim 1, wherein:
respective different categories are assigned to the side faces, and
the respective pieces of content represented by the plurality of image arranged on each of the side faces belong to a category assigned to the each of the side faces.

3. The content display device according to claim 1, wherein:
at least one of the side lace is provided with a shelf, and
the display processing unit (i) causes the plurality of images on said at least one of the side face to he displayed so as to be placed on the shelf and (ii) changes a display angle of the shelf in accordance with a display position of the shelf on the screen.

4. The content display device according to claim 1, wherein the display processing unit decreases opacity of at least one of the side faces and at least one of the plurality of images so that the side faces other than the currently-displayed side face and the plurality of images arranged on the side faces are also allowed to be displayed.

5. The content display device according to claim 4, wherein the disptay processing unit changes opacity of the at least one of the side races in accordance with a rotation angle of the polygonal column.

6. The content display device according to claim 1, wherein the input section is a touch panel superimposed on the screen.

7. The content display device according to claim 6, wherein:
the first input operation is an operation of selecting the side face to he displayed, and
the rotation processing unit rotates the polygonal column in accordance with the selection made by the first input operation on the touch panel so that the side face thus selected is displayed.

8. The content display device according to claim 6, wherein:
at least one of the side faces has a column of images arranged along the direction, and
in a case where an input operation for moving one of the images in an upward direction on the screen is carried out on the touch panel while the at least one of the side faces which has the column of images arranged along the direction is being displayed, a list of images representing respective pieces of content relevant to a piece of content represented by the one of the images is displayed on the screen.

9. The content display device according to claim 1, wherein the pieces of content are electronic books and the plurality of images are thumbnail images of the electronic books.

10. A portable terminal comprising a content display device as set forth in claim 1.

11. A non-transitory computer readable storage medium comprising a program for causing a computer including a content display device as set forth in claim 1 to operate, the program causing the computer to function as each of the units of the content display device.

12. The content display device according to claim 7, wherein
in a case where a speed of the selection made by the first input operation on the touch panel is lower than a predetermined threshold, the rotation processing unit controls the display processing unit to display a side face adjacent to the currently-displayed side face, and
in a case where the speed of the selection made by the first input operation on the touch panel is equal to or higher than the predetermined threshold, the rotation processing unit controls the display processing unit to display a side face next to the side face adjacent to the currently-displayed side face.

13. The content display device according to claim 2, wherein the scrolling processing unit controls the display processing unit to display the scrolling movement with mobility which is determined so that the image to be positioned on the part of the currently-displayed side face which part is to be displayed as a result of the scrolling movement has no missing part.

14. A content display method for displaying a part of a virtual three-dimensional object which is a polygonal column on a screen of a content display device including an input section, the polygonal column having side faces on each of which a plurality of images representing respective pieces of content are arranged,
the content display method comprising the step of (a) changing a display part of the virtual three-dimensional object which display part is displayed on the screen,
in the step (a), in a case where a first input operation instructing a display of a side face different from a currently-displayed side face is carried out via the input section, processing for displaying (i) rotation of the virtual three-dimensional object on a central axis of the polygonal column and (ii) the side face to be diplayed as a result of the rotation is carried out, and
in the step (a), in a case where a second input operation instructing a display of the currently-displayed side face in a different position in a direction parallel to the central axis is carried out via the input section, processing for displaying (i) a scrolling movement of the currently-displayed side face in the direction and (ii) a part of the currently-displayed side face which part is to be displayed as a result of the scrolling movement is carried out, wherein the processing includes controlling a display position of each of the side faces in the direction independently of the other side faces, and
wherein the side face which is to be displayed as a result of the rotation of the virtual three-dimensional object is displayed at a position in the direction at which position the side face was previously displayed as a result of the scrolling movement in the direction.

* * * * *